US008786925B2

(12) United States Patent
Hart et al.

(10) Patent No.: US 8,786,925 B2
(45) Date of Patent: Jul. 22, 2014

(54) SYSTEM AND METHOD FOR COLOR MOTION HOLOGRAPHY

(75) Inventors: Stephen J. Hart, Salt Lake City, UT (US); Daniel L. Burman, Salt Lake City, UT (US); Dinesh D. Padiyar, San Marcos, CA (US); Joyce A. Padiyar, San Marcos, CA (US)

(73) Assignee: Holorad, LLC, Salt Lake City, UT (US)

( * ) Notice: Subject to any disclaimer, the term of this patent is extended or adjusted under 35 U.S.C. 154(b) by 297 days.

(21) Appl. No.: 13/133,440

(22) PCT Filed: Dec. 10, 2009

(86) PCT No.: PCT/US2009/067588
§ 371 (c)(1),
(2), (4) Date: Jul. 15, 2011

(87) PCT Pub. No.: WO2010/068820
PCT Pub. Date: Jun. 17, 2010

(65) Prior Publication Data
US 2011/0261427 A1 Oct. 27, 2011

Related U.S. Application Data

(60) Provisional application No. 61/121,509, filed on Dec. 10, 2008, provisional application No. 61/144,535, filed on Jan. 14, 2009.

(51) Int. Cl.
*G03H 1/26* (2006.01)
*G03H 1/24* (2006.01)
*G03H 1/22* (2006.01)

(52) U.S. Cl.
CPC . *G03H 1/24* (2013.01); *G03H 1/26* (2013.01); *G03H 1/2249* (2013.01); *G03H 1/2286* (2013.01); *G03H 2001/2263* (2013.01); *G03H 2001/2271* (2013.01); *G03H 2001/2273* (2013.01); *G03H 2001/2615* (2013.01); *G03H 2001/263* (2013.01); *G03H 2222/18* (2013.01); *G03H 2222/34* (2013.01); *G03H 2222/46* (2013.01); *G03H 2222/52* (2013.01); *G03H 2222/53* (2013.01); *G03H 2227/06* (2013.01); *G03H 2250/34* (2013.01); *G03H 2260/16* (2013.01)
USPC .................................................. 359/22

(58) Field of Classification Search
None
See application file for complete search history.

(56) References Cited

U.S. PATENT DOCUMENTS

2002/0001110 A1   1/2002   Metz et al.

OTHER PUBLICATIONS

The International Search Report and Written Opinion from corresponding International Application No. PCT/US09/67588 dated Feb. 19, 2010.
The International Preliminary Report on Patentability from corresponding International Application No. PCT/US09/67588 dated Apr. 28, 2011.

*Primary Examiner* — Derek S Chapel
(74) *Attorney, Agent, or Firm* — Snell & Wilmer L.L.P.

(57) ABSTRACT

A method for producing and replaying a color holographic image. The method includes multiple hologram films, each film containing content replayed at a viewing angle or range of viewing angle in primarily one or more replay color(s), replay being caused by reference beam(s) of substantially the film's replay color(s) incident upon the film at reference angle(s) outside the viewing angle(s). The method also includes angularly-dependent color filters between the hologram films. Each filter substantially transmits the replay color(s) of preceding hologram film(s) within the viewing angles, blocks the replay color(s) of succeeding hologram film(s) within the viewing angles, transmits the replay color(s) of succeeding hologram film(s) at angle(s) close to the replay angle(s) of succeeding hologram film(s), and blocks the replay color(s) of the immediately preceding hologram film at angle(s) close to the replay angle(s) of the immediately preceding hologram film.

13 Claims, 44 Drawing Sheets

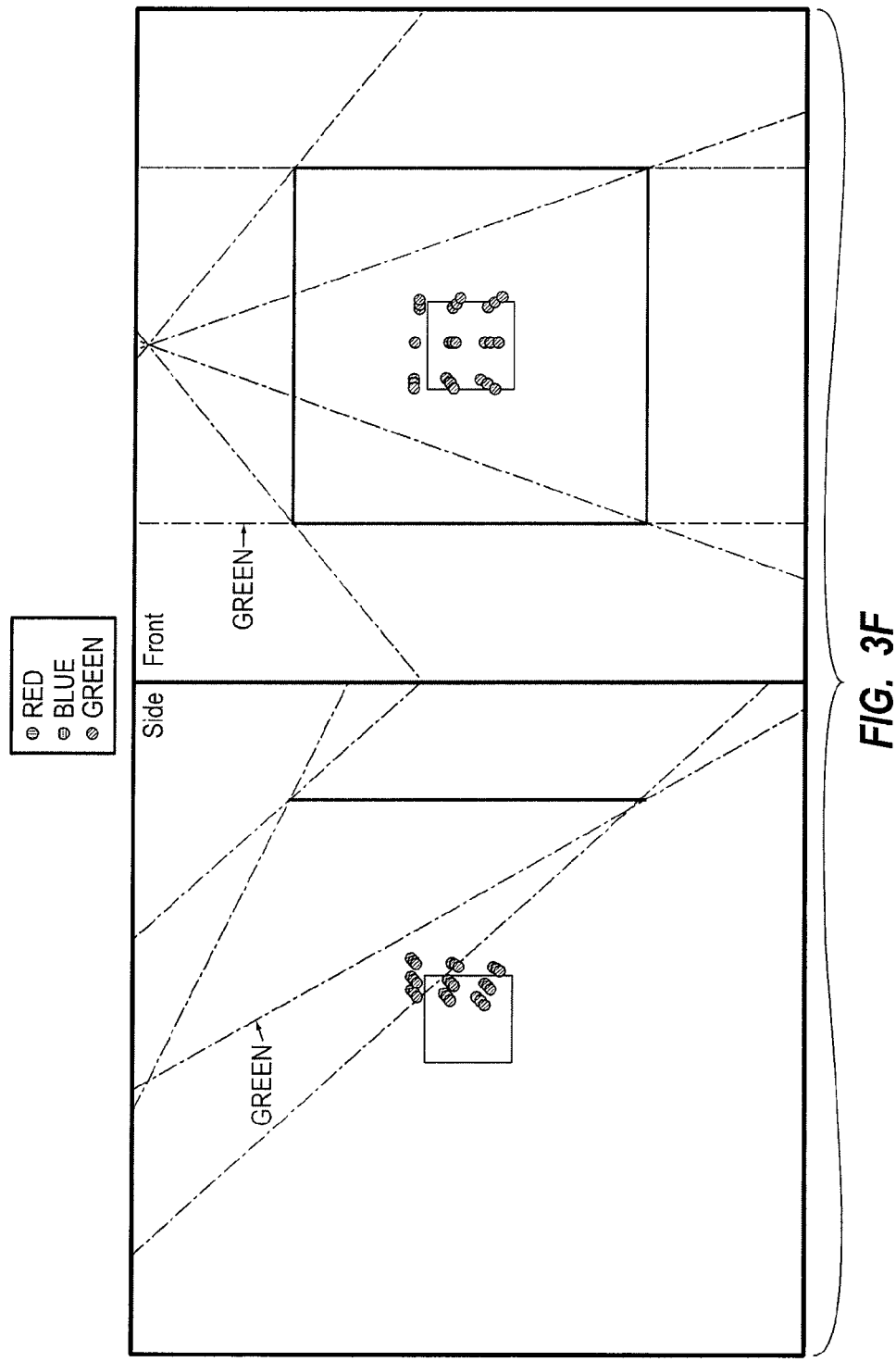

SYSTEM AND METHOD FOR COLOR MOTION HOLOGRAPHY

CROSS-REFERENCE TO RELATED APPLICATIONS

This application is a U.S. national phase filing under 35 U.S.C. §371 of PCT/US09/67588 filed Dec. 10, 2009 and is incorporated herein by reference. Application No. PCT/US09/67588 claims priority to and the benefit of, U.S. Ser. Nos. 61/121,509 filed Dec. 10, 2008 and 61/144,535 filed Jan. 14, 2009.

DETAILED DESCRIPTION OF EXEMPLARY EMBODIMENTS

Figure 1A:
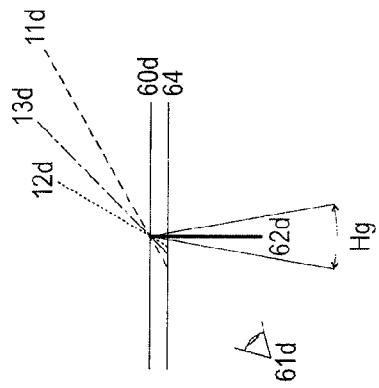
FIG. 1A through FIG. 21 depict various embodiments of the present invention.

The present invention includes systems and methods for creating and using color moving holographic images portraying arbitrary objects and/or scenes. As used herein, color may include full or partial color or any individual color combinations. For convenient description, exemplary embodiments may be broken down into three primary interrelated aspects, namely color, motion, and occlusion. However, each feature can also be practiced advantageously individually or in combination with either or both of the other features.

The detailed description of embodiments describes embodiments by way of illustration and its best mode. While these embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

Most previous work in the field of color holography has assumed the availability of an actual colored object, and has set out to record said object holographically using several (typically three) laser beams of different, carefully chosen colors, using a holographic recording material with panchromatic response. Generally, such approaches yield holograms in which accurate color rendition is hard to achieve because of spectral-response limitations of the available recording materials, and the limited color-space sampling provided with a small set of specific laser wavelengths, and because they have been used for holographic replay techniques which do not adequately reconstruct sharp accurate color images of significant depth and with adequate angle-independent color. A "dispersion compensation" holographic technique has been available which can provide matched geometry in two-dimensions of a reconstructed color hologram, but this technique suffers from a residual longitudinal color dependence which limits it to fairly shallow holograms and fairly small viewing angles.

The present invention solves these problems by providing systems, methods and techniques to produce and use deep color holograms of arbitrary subject matters (including computer or other data), wherein the recording of the holograms may be achieved using a single color of laser light and a recording material which may only be sensitive at this wavelength. The recording and replay of such holograms disclosed herein overcomes the problem of residual longitudinal color and further provides for accurate color registration and geometric fidelity, even for close and off-axis observers and even for replay reference beams which are not well matched (in angle, vergence, or wavelength) to the recording reference beams.

Most previous work in motion holography has generally either assumed the availability of an actual moving object, and has set out to record the object holographically using pulsed lasers recording a linear series of holograms on a rather narrow strip of film, or has used holographic techniques to record and replay stereoscopic images (not true holograms in the sense of Gabor, Denisyuk, and Leith) in which the motion is present in the form of a series of stereo pairs. The present invention solves these problems by providing systems, methods and techniques to produce and use true holograms (i.e., with actual extent in all three dimensions) without significant size restrictions and of arbitrary subject matters (including computer or other data), wherein multiple holographic images are recorded within a single holographic material such that they may be replayed one at a time in series, random, or non-sequential order, via the rotation of the replay reference beam relative to the recording material.

Most previous work in multiple-slice holography has generally concentrated on recording and replaying radiological data such as CT and MR scans in which spatially distinct slices of information are already available, and in which transparency is desirable during replay, so as to see interior details within the data. The present invention addresses these issues by providing means and techniques to produce and use holograms using arbitrary data (e.g., computer animations originally produced for cinematic display) with controllable occlusion, such that holographic content may be seen to be fully or partially opaque.

Color

In various embodiments, the systems and methods achieve full-color holographic imagery by combining multiple single-color holograms and angle-dependent color filters. For example, a full-color transmission hologram may be achieved which replays its image content in red, green, blue and/or any of a wide range of other colors and shades of color. The shades of color may be achieved by combining two or more colors in different proportions, including for example white and a range of grays, which are balanced combinations of red, green, and blue, yellow, which is a balanced combination of predominantly green and red, and black, which is the substantial absence of all colors.

By way of an introductory example to the present invention, a first holographic film is prepared as a transmission hologram in which the recorded light represents the degree to which each image point in three dimensions is to replay as red. For convenience, this is referred to as film R (or the R film) and the image it replays is referred to as the R image (or R hologram). Similarly, a second holographic film is prepared as a transmission hologram in which the recorded light represents the degree to which each image point in three dimensions is to replay as blue. For convenience, it is referred to as film B (or the B film) and the image it replays is referred to as the B image (or B hologram). And similarly, a third holographic film is prepared as a transmission hologram in which the recorded light represents the degree to which each image point in three dimensions is to replay as green. For convenience, this is referred as film G (or the G film) and the image it replays is referred to as the G image (or G hologram).

For this example, each of the R B and G films is recorded with a substantially collimated off-axis monochromatic reference beam at substantially a particular reference beam angle. The reference beam angle for the R film is referred to as REFr, the reference beam angle for the B film as REFb, and the reference beam angle for the G film as REFg.

In this example, each of the three films records a representation of what it itself is to replay, and each said representation is visible upon replay through a viewing volume which may conveniently be described as having an angular width which for the R film is referred to as angle Wr and an angular height which for the R film is referred to as angle Hr. Similarly the B and the G films each record a representation which is visible upon replay through viewing volumes described respectively by width and height angles Wb, Hb, Wg, and Hg.

Of these three holographic films, each one in effect records, and hence is able to replay, a representation of their shared subject matter such that it may be replayed in one of three primary colors, red, green, and blue. Our goal now is to replay these three films in combination such that for any replay point within said replay region which is visible between the overlap (if any) of Wr Wb and Wg and between the overlap (if any) of Hr Hb and Hg, the net color of said point is determined by the combination of a proportion of red light from the R film with a proportion of blue light from the B film and a proportion of green light from the G film in relative ratios suitable to obtain any color or shade which may be produced by the additive combination of these primary colors.

To achieve this goal in our example, and with reference to FIG. 1A, three holographic films R (10) B (30) and G (50) are stacked with two interposed dichroic filters (20 and 40). In FIG. 1A these films and filters are shown as seen from their edges with their planes extending out of the page, and the various light paths through them are shown for light travelling in the plane of the page. Gaps have been left between the films and filters in FIG. 1A so that the light paths may be seen more clearly. These gaps are eliminated in FIG. 1B, FIG. 1C, and FIG. 1D.

The first of the two filters (20) is placed between the R film (10) and the B film (30). This filter is referred to as the Pi filter. It substantially or completely transmits red light incident upon it within the intended Hr by Wr viewing angles of the R hologram (21) but it substantially or completely blocks blue light incident upon it within the intended Hb by Wb viewing angles of the B hologram (22) and it substantially or completely blocks green light incident upon it within the intended Hg by Wg viewing angles of the G hologram (23). Furthermore, this Pi filter (20) substantially or completely blocks red light incident upon it at or near the reference angle REFr (24) and it substantially or completely transmits blue light incident upon it at or near the reference angle REFb (25) and it substantially or completely transmits green light incident upon it at or near the reference angle REFg (26).

The second filter (40) is placed between the B film (30) and the G film (50). This filter is referred to as the St filter. It substantially or completely transmits red light incident upon it within the intended Hr by Wr viewing angles of the R hologram (21) and it substantially or completely transmits blue light incident upon it within the intended Hb by Wb viewing angles of the B hologram (31), but it substantially or completely blocks green light incident upon it within the intended Hg by Wg viewing angle of the G hologram (32). Furthermore, this St filter (40) substantially or completely blocks red light incident upon it at or near the reference angle REFr (33) and it substantially or completely blocks blue light incident upon it at or near the reference angle REFb (25) and it substantially or completely transmits green light incident upon it at or near the reference angle REFg (26).

The combined effect of these three films and two filters so disposed in a stack is as follows.

Upon transmission illumination at or near the red reference angle REFr (11), the R film (10) replays the red content (21) for the final image and this red content (21) is substantially or perfectly visible in transmission through the stack because it is replayed at or near angles which are substantially or completely transmitted by each in turn of the Pi filter (20), the B film (30), the St filter (40), and the G film (50).

Upon transmission-illumination at or near the blue reference angle REFb (12), the B film (30) replays the blue content (31) for the final image and this blue content (31) is substantially or perfectly visible in transmission through the stack because it is replayed at or near angles which are substantially or completely transmitted by each in turn of the St filter (40) and the G film (50).

Upon transmission-illumination at or near the green reference angle REFg (13), the G film (50) replays the green content (27) for the final image and this green content (27) is substantially or perfectly visible because the G film is the final component of this example stack.

Figure 1B:
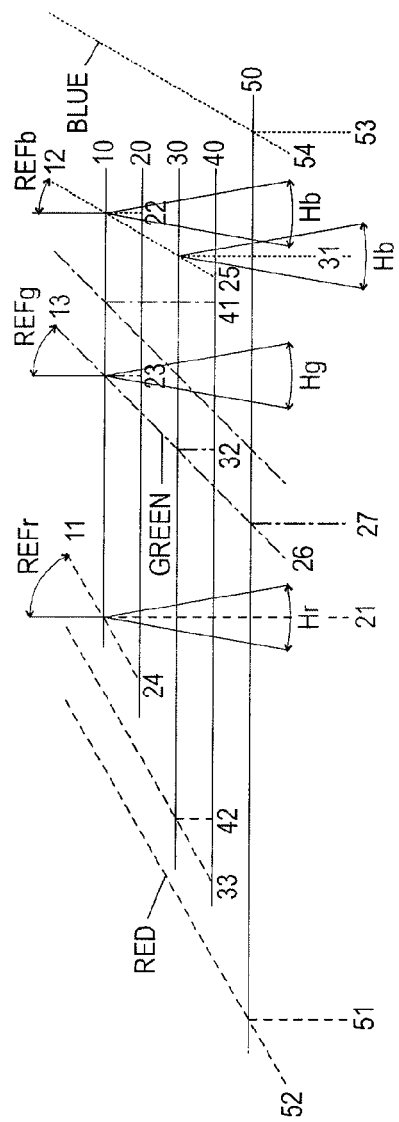

FIG. 1B shows a gapless stack (60) comprising in sequence the R film (10), Pi filter (20), B film (30), St filter (40), and G film (50) of FIG. 1A, and shows only those light paths which exit such a stack, specifically, a blue image (31b) originating from the diffraction of the blue replay reference (12b) by film B (30), a green image (27b) originating from the diffraction of the green replay reference (13b) by film G (50), and a red image (21b) originating from the diffraction of the red replay reference (11b) by film R (10).

Figure 1C:
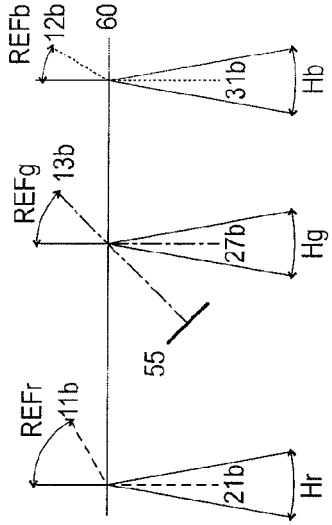

FIG. 1C shows a gapless stack (60c) comprising in sequence the R film (10), Pi filter (20), B film (30), St filter (40), and G film (50) of FIG. 1A, with red replay reference beam (11c), green replay reference beam (13c), and blue replay reference beam (12c) all incident upon the same region of the stack (60c). An observer (61) viewing the illuminated assembled stack (60c) sees the three-dimensional holographic image (62) with red content produced from the red replay reference beam (11c) in shades of red as diffracted by the R film (10) and with negligible or no red imagery from the B film (30) or the G film (50), combined with blue content produced from the blue replay reference beam (12c) in shades of blue as diffracted by the B film (30) and with negligible or no blue imagery from the R film (10) or the G film (50), combined with green content produced from the green replay reference beam (13c) in shades of green as diffracted by the G film (50) and with negligible or no green imagery from the R film (10) or the B film (30). The combined effect is that observer (61) viewing the stack (60c) sees a full-color three-dimensional holographic image (62), wherein the shades of red are produced solely or almost entirely by the R film (10), the shades of blue are produced solely or almost entirely by the B film (30), and the shades of green are produced solely or almost entirely by the G film (50).

Referring again to FIG. 1A, the R film (10) may have a broadband response, such that in addition to replaying the red image (21) upon illumination by red light (11) at or near angle REFr, it may also replay to some visually significant degree a blue image (22) upon illumination by blue light (12) at or near angle REFb and/or a green image (23) upon illumination by green light (13) at or near angle REFg. However these spurious blue (22) and green (23) images, if present, are substantially or completely blocked by the Pi filter (20), and the spurious green image (41) is further substantially or completely blocked by the St filter (40). The observer viewing light transmitted through the stack sees a red image (21) from the R film with comparatively little or no blue or green image from the R film (10).

Similarly, the B film (30) may have a broadband response, such that in addition to replaying the blue image (31) upon illumination by blue light (12) at or near angle REFb, it may also replay to some visually significant degree a red image (42) upon illumination by red light (33) at or near angle REFr and/or a green image (32) upon illumination by green light (13) at or near angle REFg. However, the original red reference light (11) present at or near angle REFr has been substantially or completely blocked before it can reach the B film (30) due to the combined actions of the R film (10) and the Pi filter (20), so no significant red spurious image can be formed by the B film (30), and the spurious green image (32), if present, is substantially or completely blocked by the St filter (40). The observer viewing light transmitted through the stack sees a blue image (31) from the B film (30), with comparatively little or no red or green image from the B film (30).

Similarly, the G film (50) may have a broadband response, such that in addition to replaying the green image (27) upon illumination by green light (13) at or near angle REFg, it may also replay (to some visually significant degree) a red image (51) upon illumination by red light (52) at or near angle REFr and/or a blue image (53) upon illumination by blue light (54) at or near angle REFb. However, the original red reference light (11) present at or near angle REFr has been substantially or completely blocked before it can reach the G film (50) due to the combined actions of the R film (10), the Pi filter (20), the B film (30), and the St filter (40) so no significant red spurious image can be formed by the G film (50). Similarly, the original blue reference light (12) present at or near angle REFb has been substantially or completely blocked before it can reach the G film (50) due to the combined actions of the R film (10), the Pi filter (20), the B film (30), and the St filter (40) so no significant blue spurious image can be formed by the G film (50). The observer viewing light transmitted through the stack sees a green image (27) from the G film (50) with comparatively little or no red or blue image from the G film (50).

In so far as the R film (10) has less than perfect holographic efficiency, a proportion of the red reference beam (11) continues past the R film (10) still at or near angle REFr and is incident (24) upon the Pi filter (20) which substantially or completely blocks it before it would otherwise reach the B film (30) or the G film (50). Hence the B film (30) and the G film (50) each receives little or no red light at or near angle REFr and hence, even if they are able to diffract a significant proportion of said red light, they receive too little such red light to produce a visibly significant red image.

Similarly, in so far as the B film (30) has less than perfect holographic efficiency, a proportion of the blue reference beam (12) continues past the B film (30) still at or near angle REFb and is incident (25) upon the St filter (40) which substantially or completely blocks it before it would otherwise reach the G film (50). Hence the G film (50) receives little or no blue light at or near angle REFb and hence, even if it is able to diffract a significant proportion of said blue light, it receives too little of such blue light to produce a visibly significant blue image.

The R film (10) and the Pi filter (20) do not substantially deviate the blue (12) or green (13) reference beams. Upon transmission illumination in blue light at or near the blue reference angle REFb and in green light at or near the green reference angle REFg, the R film (10) transmits all or at least part of said blue and green reference lights without substantially changing their respective angles of propagation. These blue and green reference beams then are incident upon the Pi filter (20) at or near their respective reference angles REFb and REFg, and the Pi filter (20) transmits all or at least part of said blue and green reference lights without substantially changing their respective angles of propagation such that they are incident upon the B film (30) as reference beams at or near their respective angles REFb and REFg.

Similarly, the B film (30) and the St filter (40) do not substantially deviate the green reference beam (13). Upon transmission illumination in green light at or near the green reference angle REFg, the B film (30) transmits all or at least part of said green reference light without substantially changing its angle of propagation. This green reference beam then is incident upon the St filter (40) at or near angle REFg, and the St filter (40) transmits all or at least part of said green reference light without substantially changing its angle of propagation such that it is incident upon the G film (50) as a reference beam at or near angle REFg.

Figure 1D:
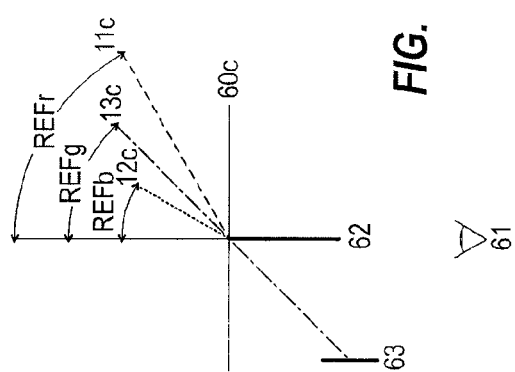

In so far as the G film (50) has less than perfect holographic efficiency, a proportion of the green reference beam (26) continues past the G film (50) still at or near angle REFg. This residual green reference beam does not disrupt the viewing by observer (61) of the red, blue, and green holographic content (62) because it remains at or near angle REFg which is assumed to be outside of the viewing volumes defined by angles Wr Wb Wg Hr Hb and Hg. Typically this residual reference beam illuminates a beam block (55) or the floor (63) of the space in which the hologram is viewed. In some circumstances it may be advantageous for this residual reference beam to illuminate another surface such as a table or the ceiling or a wall. As another aspect of this invention, as shown in FIG. 1D, a third angle-dependent filter (64) which is referred to as the Sa filter, may be added to stack (60$d$), said stack comprising in sequence the R film (10), Pi filter (20), B film (30), St filter (40), and G film (50) of FIG. 1A. This third filter follows the G film (50), and substantially or completely transmits red light incident upon it within the intended Hr by Wr viewing angles of the R hologram and substantially or completely transmits blue light incident upon it within the intended Hb by Wb viewing angles of the B hologram and substantially or completely transmits green light incident upon it within the intended Hg by Wg viewing angles of the G hologram (62$d$), but it substantially or completely blocks green light incident upon it at or near reference angle REFg (13$d$) and ideally also substantially or completely blocks any residual blue light incident upon it at or near reference angle REFb (12$d$) and ideally also substantially or completely blocks any residual red light incident upon it at or near reference angle REFr (11$d$). By this means, even a second observer (61$d$) located, for example, in the optical path of any such residual light sees little or no such light passing through Sa filter (64).

An advantage of the present invention is that the constituent holograms can be made using holographic recording materials, processes, and geometries that do not directly involve or adequately record or reproduce all the desired colors. For example, using a green laser such as a frequency-doubled Nd:YAG laser at 532 nm (a very convenient green wavelength) a holographic recording material and process can be used which gives excellent performance for green light but which would record poorly or not at all in red or blue light (such films and processing regimes are widely available, e.g., see Bjelkhagen's "Silver Halide Recording Materials for Holography and Their Processing, Springer-Verlag, 1993). The "red" and "blue" films produced in accordance with the present invention can be replayed in red and blue light respectively even though only green light and green-sensitive film wasused in their recording. This also overcomes the blue-scatter and resolution problems which have been a problem for blue-sensitive and panchromatic holographic materials.

And it permits the use of recording materials and geometries for which even the "green" film is produced using another wavelength (e.g., a pulsed red source such a ruby laser) where to do so may be advantageous (e.g., holography of non-stationary objects). For example, a wide variety of holographic recording materials are suitable for recording the individual holograms in accordance with the present invention including silver-halide, thermoplastics, DCG, liquid crystal, photoresist, crystalline or glassy electro-holography materials, bacterial materials, and photopolymers, even if such materials are unsuitable for recording one or more of the primary colors, either directly or as master holograms or as intermediate holograms for eventual holographic copying into the same or other materials.

The color aspect of the present invention, as described above in example form, envisages the use of angle-dependent filters between (and, in the case of the Sa filter, following) the films, and hence as described the B film (30) is further from the observer than the G film (50) by at least the thickness of the St filter (40) (and perhaps by a somewhat greater separation including the thickness of the holographic films themselves and of any spacers and other layers introduced in to the film-filter stack). Similarly, the R film (10) is even further from the observer, being behind the Pi (20) filter. Hence accurate color registration in certain embodiments includes the red, blue, and green holographic images being produced by their respective films with slight shifts in the direction perpendicular to the film, so that, in the example given, the R film projects its image a slightly greater distance than the G film does its corresponding image, and the B film projects by an intermediate amount, the exact offsets between the images corresponding to the optical distance between the recording surfaces of the respective films, where by "optical distance" we mean to indicate that while the Pi filter (20) may, for example, have a physical thickness of 3 mm, its apparent thickness is less than this by a factor 1/n where n is the average refractive index of its substrate material, just as a pool of water looks shallower than it really is.

The red blue green ordering described in the above example may instead be implemented as red green blue or any other ordering of these or other suitable colors. In practice it may be easier, less costly, or otherwise advantageous to design or fabricate filters and holograms based upon one particular color order. The present inventors could more easily achieve a satisfactory performance using the red blue and green ordering described above.

The above example refers to "red" light, "blue" light, and "green" light, without giving a specific wavelength or wavelength range for each said color. The present invention can be practiced using broadband wavelength ranges from a white light source, with each color spanning a range of about one hundred nanometers. It may however be advantageous to use narrower-band illuminants, such as the light from red blue and green LEDs with full-width-at-half-maximum (FWHM) bandwidths of for example tens of nanometers, or even very narrow-band red blue and green laser sources with FWHM bandwidths of for example a few nanometers or less: narrower bandwidth sources can simplify the design, production, and use of filters which may lack sharp and/or efficient passbands and block-bands, however broadband sources are generally less costly. A commercially or otherwise advantageous design may involve sources of different natures for each color, such as for example band-filtered white light for the green source, a blue LED or band-filtered blue LED, arc light, or incandescent source for the blue source, and several red lasers combined for the red source. In particular, it may be easier to design and fabricate suitable filters and/or holograms if the FWHM bandwidth of each color is restricted (or reduced by additional filtration before, within, or following the invention as so far described) so that one or more regions of the visible spectrum becomes substantially irrelevant to the design and performance of one or more of the filters and/or holograms.

For example, in the present inventors' color demonstration (described below) an additional small filter can be introduced at a point at which light from the source is not significantly expanded. For example, a Semrock BrightLine Multiband Bandpass FF01-457/530/628 dichroic filter [Semrock Inc, Rochester, N.Y.] is suitable. This limits the bandwidths of the three broadband LEDs used in this demonstration, which bandwidths in the case of the specific components used contain a significant degree of spectral overlap which makes the design and fabrication of suitable filters more challenging and can lead to visible colored ghost images caused by, for example, a proportion of yellowish and greenish-blue light undesirably passing through the Pi and St filters and then acting as reference light and being reconstructed by the G film yielding colored ghost images.

In the context of the present invention, ghost images can occur as colored or uncolored sharp or diffuse images around or adjacent to the intended holographic images or displaced from them and can be of a two-dimensional or three-dimensional nature. Various kinds of ghost image can appear, including those described above (also referred to above as spurious images), ghosts due to misalignment as described below, and ghosts due to several other potential causes such as inter-reflections between components in the film/filter stack. It is generally advantageous to eliminate or substantially reduce the number and intensity of such ghosts because they can be visually distracting, and they can reduce the visibility, brightness, contrast, and color saturation of the intended holographic content. However they can sometimes be accommodated as acceptable aesthetic or artistic effects, or even allowed for in the design or selection of image content.

A further source of ghosts is ambient light originating on the observer's side of the present invention. This can be of arbitrary color, intensity, polarization, and direction, and can include specular, focused, and diffuse components. Such light can be reflected, refracted, diffracted, and scattered from and between the various components of the present invention, and may then be visible to the observer as two-dimensional or three-dimensional colored or uncolored ghost images or sparkles or glare or diffuse, concentrated, or focused noise. Such defects may be reduced or eliminated by careful positioning of the display system embodying the present invention with respect to the sources of ambient light, by reducing or eliminating all or some of the sources of ambient light, by providing anti-reflection or further color-filtering coatings to the optical components of the present invention, by adjusting the design of one or more of said optical components to reduce the severity of such defects, or by a combination of one or more such means. The outermost color filter, filter St in the example above, or filter Sa if this additional optional filter is included, is prone to the non-holographic causes of such defects, and the outermost hologram, the G film in the above example, is prone to the holographic causes of such defects, because these are the filter and film respectively which respectively are closest to the observer and any ambient light sources. This may be recognized in the design of any particular implementation of the present invention and in the use of any such implementation: for example, if the outermost film is chosen to be the G film then green ambient light sources (and other ambient light sources which contain a green component such as yellow lights and white lights) are likely to be particularly troublesome so that it may be more advantageous to have the B film or the R film closest to the observer. Similarly, it is generally advantageous to design the outermost filter element (St or Sa in the above example) to not strongly reflect ambient light back in the direction of the observer or observers otherwise it can act as mirror in which well defined reflections can be seen of the ambient sources and of the observer and of the room or other space external to and optically in front of the present invention.

The green content of a color image is commonly the most important component for visual communications. This is recognized, for example, in the NTSC system for color television [National Television System Committee, 1953] in which the green component is allocated approximately twice as much bandwidth as either of the blue and red components. Two design considerations derive from this in the context of the present invention. Firstly, it may be beneficial to prefer the green content over the red and/or blue content, for example by dividing the green content between two or more films rather than using a single film for all the green content if by so doing each film can, for example, be made sufficiently brighter, more contrasty, or less noisy so that this division into two or more films results in an improved green image, and in the preview environments and metric-based optimizations described below, special care can be taken to alert users to green-related problems, and metrics can be weighted to find solutions which favor the green components of images. Secondly, it may be advantageous to choose a color ordering in which the G film is not on the observer's side of the stack, so that it and the final color-selection filter (St or Sa in the above example) do not act as green mirrors so that this becomes for example a blue mirror or red mirror problem which may generally be more easily mitigated or may generally be less problematic for the observer.

The principles of the invention as described in the example above may be extended to more than three basis colors, for example using red, green, blue, and yellow, or red reddish-green, blueish-green, and purple because such a selection of basis colors may be more suitable for accurate or pleasing color rendition, or may further enhance designability, manufacturability, or ruggedness, or reduce the cost of the corresponding filters and holograms.

The principles of the invention as described in the example above may be applied for two rather than three or more colors, for example using only red and green, because such limited basis colors may provide sufficiently accurate or pleasing color rendition in some cases, or may further enhance designability, manufacturability, ruggedness, or reduce the cost of the corresponding filters and holograms.

In general, for a set of n basis colors, at least n−1 filters and n hologram films are used, with at least one extra filter if the final blocking of the final reference beam component (green via the Sa filter in the above example) is desired. It may prove advantageous to use two or more filters in place of any one filter described above if their combined effect is broadly as described: for instance, two filters may each cover only part of the waveband used for a particular "color" but may in combination filter that color sufficiently well or even to a superior degree or at lower cost than a single filter. It may prove advantageous to split the image content for a given color between two or more hologram films, as described above for the G film.

The principles of the invention as described in the example above may be applied for two or more visible or non-visible colors, such as bands in the radio, microwave, infrared, ultraviolet, or x-ray for non-visual applications or where, for example, an ultraviolet excitation is used for a fluorescent or phosphorescent image. As an example, a thermal infrared holographic volume may be superimposed upon a hologram representative of a hot muffin so that if an observer reaches in to touch the holographic muffin they feel a suitable distribution of heat as they approach the visual image of the muffin. Similarly, radio or microwave holograms can be used to sense or trigger the presence, proximity, or spatial location of small hand-held receiving/transmitting devices such as a Radio Frequency Identification Devices (RFIDs) or Near Field Communications (NFC) devices. And the thermal and other radiation effects of a holographic image may be used to permanently or temporarily modify the properties of a physical material spatially coincident with or adjacent to said holographic image, so that, for example, image-space heating or bioluminescence may be induced or a photopolymer or a powdery substance may be solidified or ice melted in a spatial pattern substantially corresponding to the distribution of appropriate energies in at least a part of the holographic image, for example for the creation or modification of specific two- or three-dimensional shapes for artistic, scientific, or commercial purposes.

The principles of the invention as described in the example above may also be implemented with one or more of the filters and/or films operating in reflection rather than transmission, though the transmission stack as described above has several useful advantages including that it can be assembled as a comparatively thin stack which can optionally use lamination or bonding of its individual elements to form a substantially solid and temporarily or permanently substantially indivisible assembly if this is advantageous for reasons such as enhanced ruggedness, simplicity of use, or the reduction of undesired optical effects including for example absorption, scattering, reflection, diffraction, and refraction at the optical transitions between elements.

Further optical and mechanical elements may advantageously be included in the film/filter stack or assembly including for example cover windows for mechanical protection on one or both of the input and output sides, gaskets, spacers, seals, and optical-indexing methods to establish or eliminate gaps and inclinations between elements and to prevent the ingress of contaminants such as dust and/moisture. Sealing, especially against moisture, by edge seals, lamination of layers, or the application of cover layers such as Barix [Vitex Systems, San Jose, Calif.] is useful in any operating or shipping environment in which dirt, dust, or other contaminants, or atmospheric humidity, may be significant or outgassing, absorption, or adsorption is undesirable, and is especially useful with holographic materials which are significantly moisture sensitive, such as DCG, or that are to be used underwater or at high humidity, in a vacuum or a low-pressure, high-pressure, or potentially explosive environment.

The above example used dichroic filters and holographic films, however, the principles of the invention as described in the example above may also be implemented with other filters or filtering elements that exhibit angle dependences and color effects similar to or as described but which are not per se dichroic filters, such as, for example, by achieving color filtration by exploiting spatially-patterned color filters, prismatic or total-internal-reflection effects, chromatic aberrations in lenslet or prismatic sheets, optical metamaterials with negative refractive indices, or holographic dichroism or dichroic-like effects in holographic filters, and with films which are not holograms as described but are similar elements such as for example diffraction gratings or color holograms in which full or limited color rendering has been achieved by means other than those of this invention.

Whereas the above example maintains substantially constant values for the reference angles REFr REFb and REFg, it may be advantageous to alter the angle of one or more of the colored reference beams upon said beam's interaction with one or more of the film or filter components, or by introducing additional optical components for this purpose, for example by using chromatic dispersion or color-dependent diffraction, so as to optimize the propagation of said beam through said films and filters and other components to achieve particular or optimal values for the incidence angles of each said beam on each said film, filter, or other component.

The terms "optimize" and "optimum" and "optimal" are used herein to indicate a process of, and/or the results of, seeking or experimenting or calculating or modeling to find improved results. Such terms should not be limited to the determination or discovery of the best possible result, though this may be the result.

Having introduced the color aspect of the present invention via the above example, an advantageous method to achieve a color hologram of arbitrary content with good three-dimensional color registration is now described.

Bazargan [U.S. Pat. Nos. 4,623,214 and 4,623,215] teaches a Dispersion Compensated holographic display system, which can beneficially be used with the present invention, and which has been made commercially available by Holorad LLC [Salt Lake City, Utah]. In this, a transmission hologram is made using, for example, a substantially collimated reference beam of a specific wavelength and reference beam angle, for example approximately 56.3° (Brewster's angle for typical holographic materials with refractive indices of about 1.5) at approximately 532 nm, a green wavelength which is a convenient choice since very suitable lasers and film/chemistry combinations are widely available for this wavelength. This hologram (or a holographic copy of it) is then viewed in front of a display device which incorporates a white-light source such as a halogen lamp, a collimating optic such as a Fresnel lens, a diffraction grating which can conveniently be fabricated as a transmission hologram, and an anisotropic blocking material such as the angled variety of 3M's Light Control Film [3M Imaging Systems Division, St. Paul, Minn.].

These elements are typically combined in a free-standing self-contained hologram display device which may also include a housing to hold the display's parts, a mechanism to permanently or temporarily attach or hold one or more holograms in front of the device, and other desired or advantageous components such as an electrical power supply and an on/off switch. The principle of operation is as follows: the hologram as described replays comparatively strongly and without substantial spatial distortion when re-illuminated with substantially collimated light of the same wavelength (or nearly so) and at or near the same reference beam angle as was used when recording it; for other longer or shorter wavelengths at that same reference angle it generally replays (typically less strongly) with significant geometrical distortion. However for any given replay wavelength there is a matching reference beam angle (the "dispersion compensating angle") for which the lateral distortions in the replayed hologram are minimized. This angle is determinable using the well known "grating equation". And in practice if the grating element is made with substantially the same wavelength and reference angle as the hologram to be viewed then it diffracts each wavelength of light from the collimated white-light beam through an angle which closely matches that wavelength's dispersion compensation angle, and in combination with the hologram it produces a grayscale holographic image with negligible lateral distortion.

In Bazargan's invention this desirable compensation can conveniently be accomplished by making the hologram and the grating using identical or very similar beam angles, recording materials, and processing regimes. If the material/processing results in a significant swelling or shrinkage of the hologram or the dispersion-compensating grating, which could shift its respective diffraction angle, this may be corrected for by using a correspondingly altered reference beam angle (determined experimentally or using mathematical methods such as, for example, those provided by Bazargan). Alternatively, the grating or the hologram may be tilted with respect to the primary optical axis or the light source may be moved perpendicularly to this axis. Again, the tilt or offset can be established experimentally or using mathematics such as Bazargan's.

With a dispersion compensation technique such as that of Bazargan, the present invention can conveniently and advantageously be implemented using similar or identical recording reference beam angles for each replay color in conjunction with a single recording laser emitting at a single wavelength. This optional feature allows one hologram recording setup to be used for producing all the hologram films without using multiple laser wavelengths or any change in reference beam angle. Since making such changes generally includes the physical relocation and the partial or complete duplication of expensive, heavy, delicate beam-directing and collimating optics, this can be a significant commercial advantage, and may even permit hologram recording geometries which otherwise would be difficult or impossible to achieve practically.

The basic features of this dispersion compensation technique are well known to those skilled in the arts. What is not well known, but is described in detail in Bazargan's doctoral thesis [Techniques in Display Holography, University of London, 1986], is that a residual longitudinal chromatic effect is still present: specifically, while the dispersion compensation technique can in theory perfectly correct lateral distortions/displacements in the holographic image, a longitudinal variation in image magnification remains in which the depth and extent of the holographic image is wavelength dependent. A mathematical treatment of this is provided in Dr Bazargan's aforementioned doctoral thesis, using the mathematical techniques of Champagne [Nonparaxial Imaging, Magnification, and Aberration Properties in Holography, JOSA 57, 51-5, 1967].

Figure 2A:
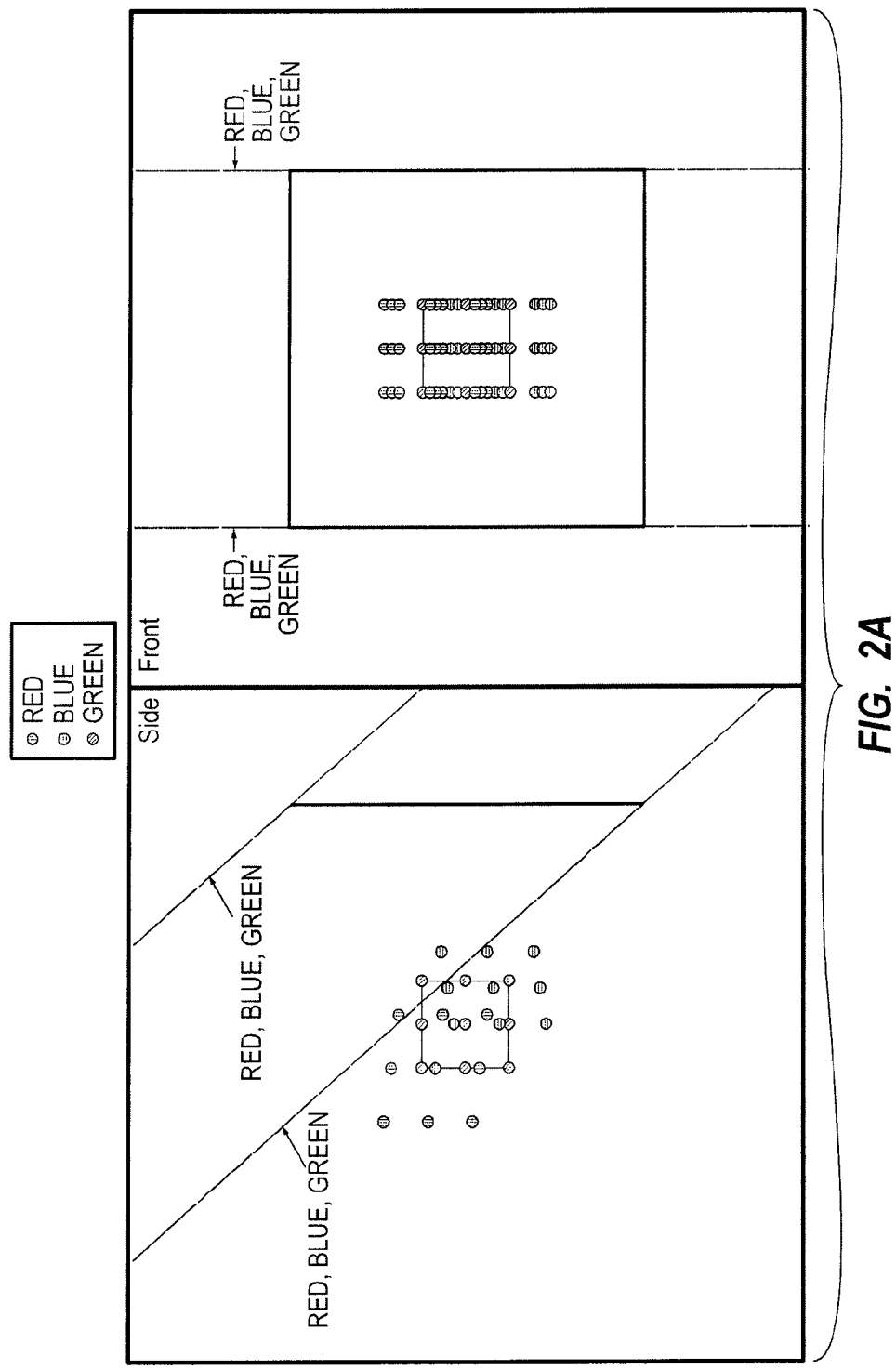
Figure 2B:
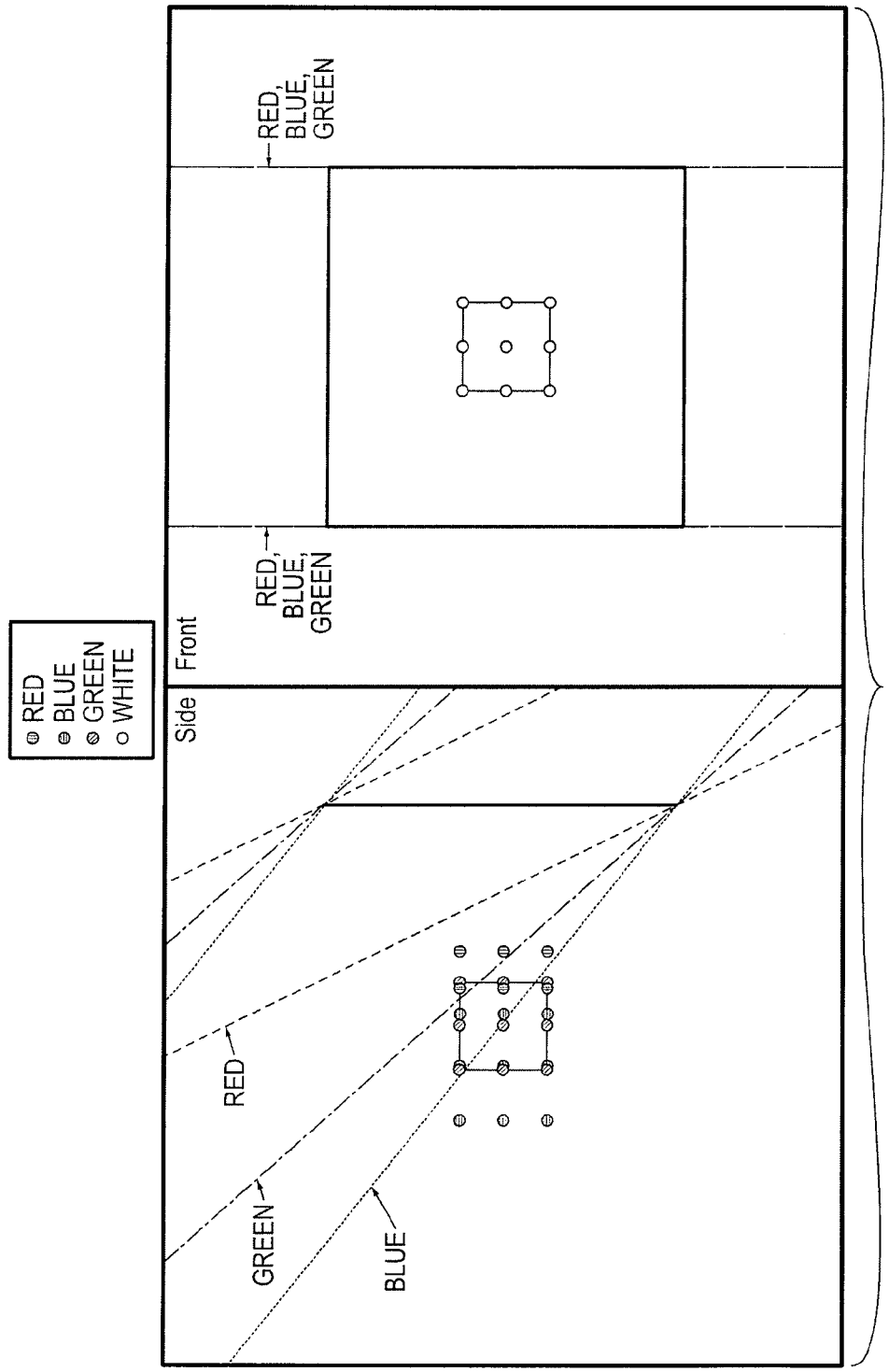

FIG. 2A and FIG. 2B illustrate in side and front views an exemplary dispersion compensation technique of Bazargan as seen by an observer located at a substantial distance along the z-axis (the axis perpendicular to and centered upon the hologram) for a collimated 532 nm recording reference at a 48.3° reference angle, and collimated 640 nm, 532 nm, and 447 nm replay references at 48.3° (in FIG. 2A) and at dispersion compensated angles of, respectively, 63.9°, 48.3°, and 38.9° (in FIG. 2B).

The present inventors have found that the longitudinal chromatic variation of Bazargan's technique can be substantially reduced or even completely eliminated using the color hologram technique as described above: to do so, each of the present invention's single-color holograms is made with substantially identical image positions and sizes in lateral dimensions (the two directions substantially parallel to the holographic films) but with suitably calculated different image positions and sizes in the axis substantially perpendicular to the films (which is referred to as the z-axis). For example, if the mathematics provided by Bazargan predicts that for a certain red wavelength the red image point occurs at a z-axis distance from its film of 60% of the corresponding z-axis distance for the corresponding green image point, and that the corresponding blue image point occurs at a z-axis distance from its film of 140% of the corresponding z-axis distance for the corresponding green image point, then the reciprocals of these scales indicate that in the present invention the red hologram should be stretched in its depth axis by a factor of 1/0.6 (or approximately a factor of 1.66), and the blue hologram should be compressed in its depth axis by a factor of 1/1.4 (or approximately a factor of 0.71). For completeness, the green image point would be at 100%. If this is done then the red image point from the red hologram, the green image point from the green hologram, and the blue image point from the blue hologram overlap in all three dimensions so long as allowance is made for any shrinkage or swelling of any of the holographic recording films and for the differing distances from the individual films to the observer as described above.

Figure 2C:
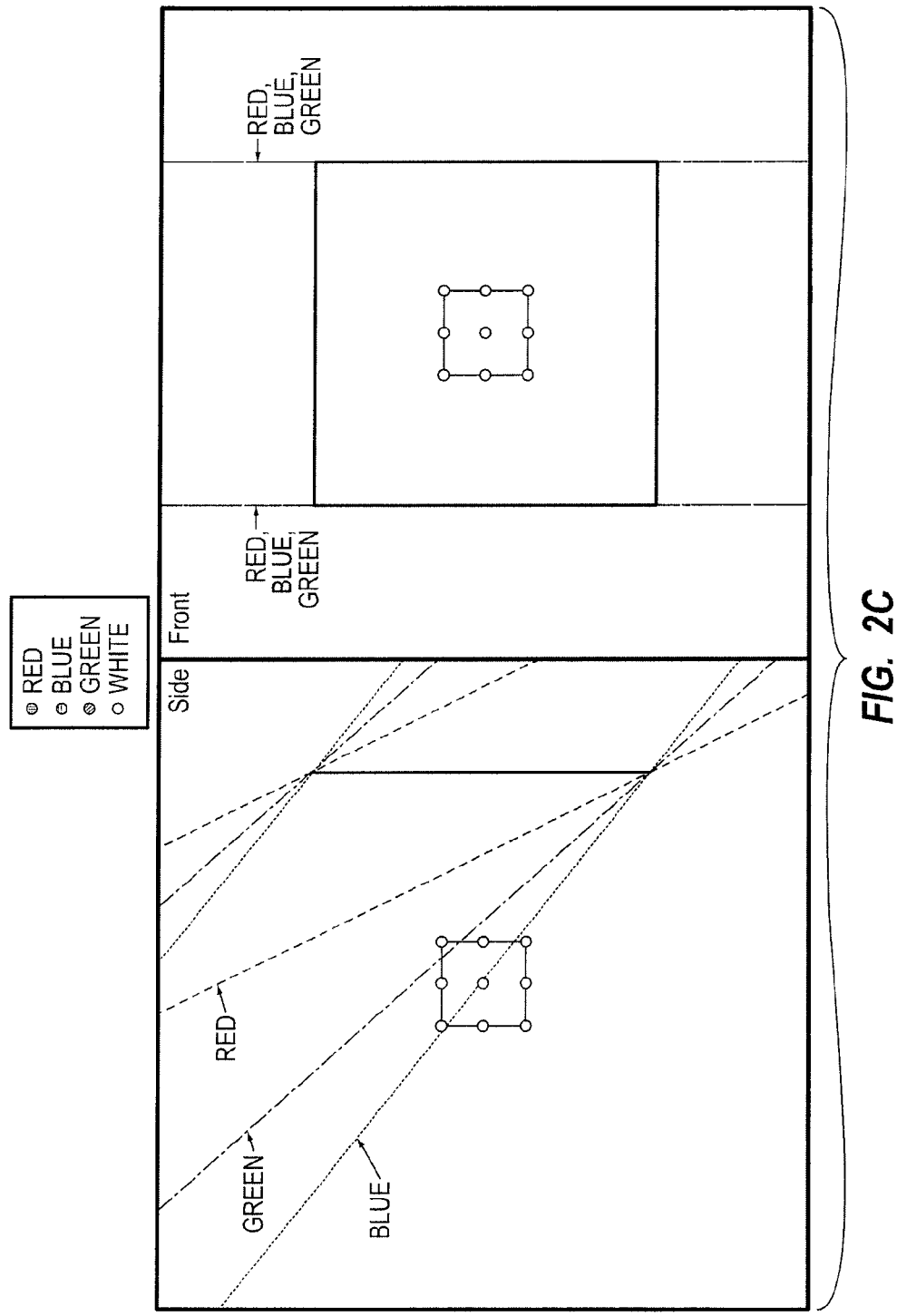

FIG. 2C illustrates an exemplary embodiment of this longitudinal color-correction for a collimated 532 nm recording reference at a 48.3° reference angle, and collimated 640 nm, 532 nm, and 447 nm replay references at dispersion compensated angles of, respectively, 63.9°, 48.3° and 38.9° and with recording z-scales of, respectively, 84% (=447/532), 100% and 120% (=640/532).

For very narrow band replay sources, such as most lasers, this longitudinal chromatic variation can be substantially or completely eliminated as described above. But even for broadband sources, such as white light split into broad nominally red blue and green bands each with a bandwidth of several tens of nanometers, this technique can be used to substantially reduce the effects of the longitudinal chromatic variation by ensuring that the visually dominant wavelengths of each color band are corrected exactly or nearly so: this results in a substantial or complete overlap of the three bands, providing a reduction by a factor of about three in the remaining longitudinal chromatic variation.

As a special case, if each hologram film produces an image in which, after assembly in the color technique of the present invention, the red blue and green intensities are always held in approximately the same proportion then a gray-scale hologram may be achieved without significant color content but with greatly improved sharpness in the z-axis.

Figure 3A:
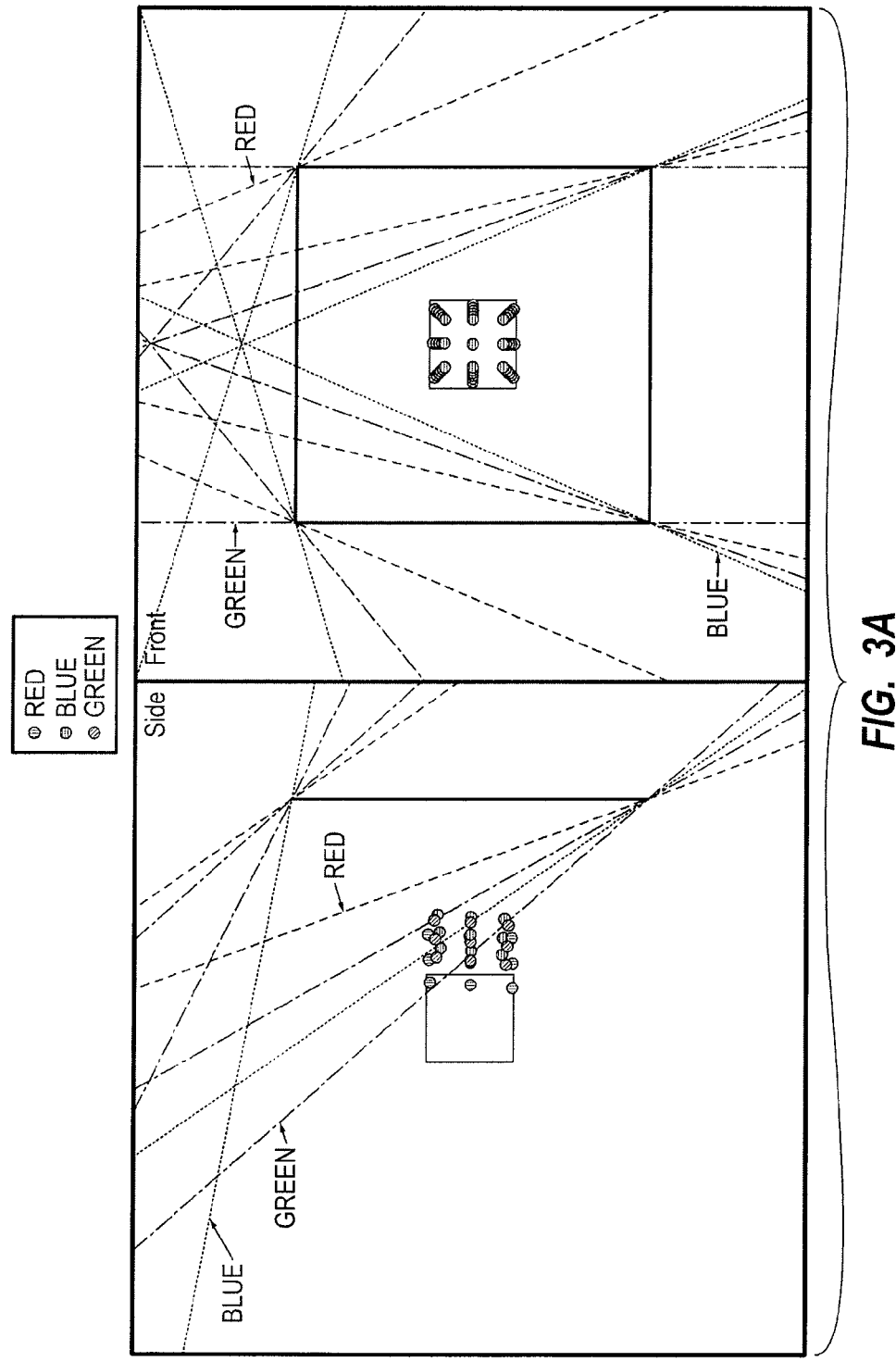
Figure 3B:
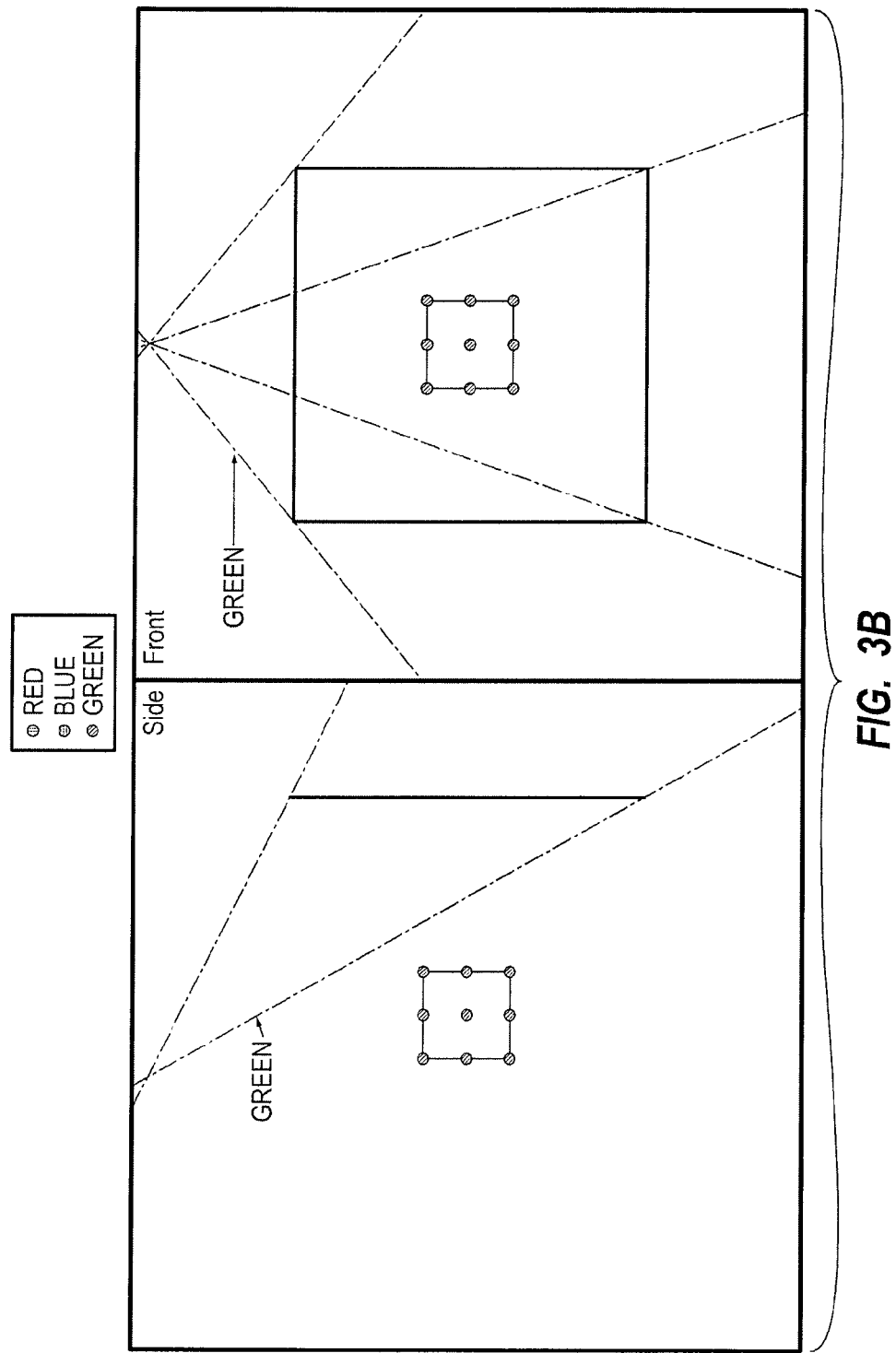
Figure 3C:
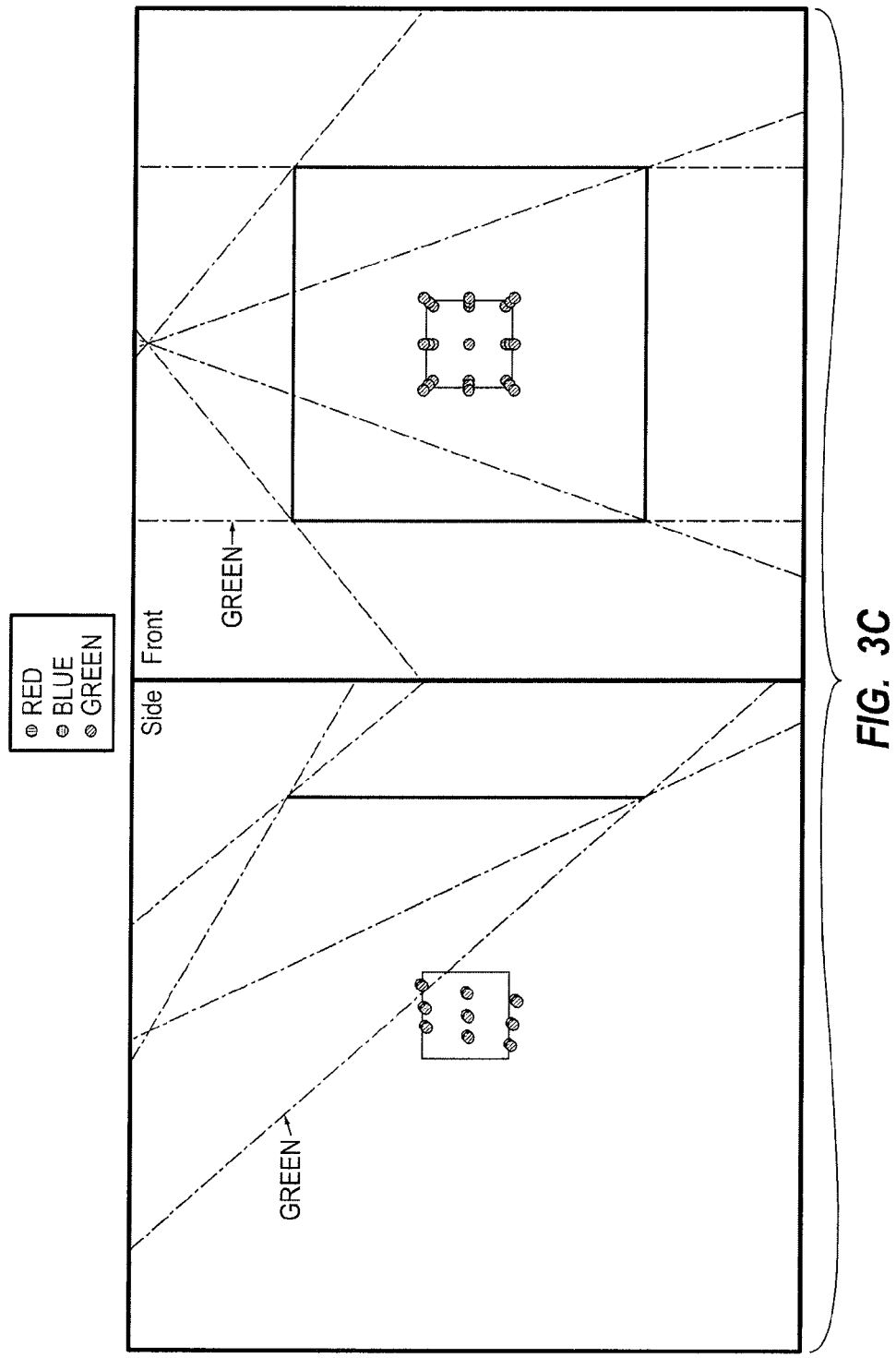

In practice the z-axis offsets and scales to combine certain embodiments with dispersion compensation techniques such as those of Bazargan can be calculated, for example by using Champagne's equations as described by Bazargan, or they may be established experimentally by producing and assembling test stacks (films and filters) in which the positions of image points can be measured using a ruler or other depth-measuring instruments or techniques. A similar experimental, computational, or blended technique can be used to determine any residual origin, offset, or scale errors in any of the three dimensions for any of the color images relative to any of the other color images, and corresponding corrections can then be designed into the production of the corresponding filters or holograms. In extreme cases, this technique may even be used to correct for gross discrepancies between the recording and replay conditions of each hologram, for example to produce a hologram which yields the desired geometry when replayed with a substantially non-collimated reference beam even though recorded with a substantially collimated reference beam, or vice-versa, though in more extreme cases such as this it may also be desired to make spatial variations in the performance specifications of the filters so that, for example, their bandwidths or band-centers vary radially from the central z-axis outwards or linearly from top to bottom or from side to side. Further, these techniques can be used to exploit the inherent magnification or minification of a hologram recorded and/or replayed with reference light which is significantly uncollimated: for example, holograms can be recorded with substantially collimated reference beams and replayed with divergent beams, and the resulting magnification and distortion of the holographic image can be substantially or completely eliminated or even converted to a degree of minification, and this can be achieved for each component color in the context of the present invention even though the degree of magnification or demagnification and other related distortions in such circumstances are generally wavelength dependent. As an example, FIG. 3A shows side and front views of an exemplary system analogous to that of FIG. 2C, but in which the recording reference beam is collimated and the replay reference beams are strongly divergent: substantial color-breakup is evident, along with substantial geometric distortion even for each single color. FIG. 3B shows that such color breakup and distortion can be corrected for each single color (the 532 nm case is shown in FIG. 3B) by using an exemplary convergent recording reference beam matching the divergent replay reference beam. FIG. 3C shows that a similar but less complete correction can be obtained even when using an exemplary collimated recording reference beam with strongly divergent replay reference beams by modifying the x-scale, y-scale, and z-scale of the content recorded by each hologram so that upon replay the distortions and color breakup introduced by the vergence mismatch are substantially corrected by in general corresponding but substantially opposite modifications in the recorded content (in FIG. 3C, x-scale=150%, y-scale=200%, z-scale=200%). Even this residual geometric distortion can be corrected for to a very high degree by, for example, calculating the x, y, z recording coordinate for each pixel of the original content which results in replay of said pixel at its correct position, in effect resampling the original content on a pixel-by-pixel, slice-by-slice, or region-by-region basis to pre-distort it prior to recording it such that upon replay it is substantially undistorted. And the color-breakup which results from the geometrical distortion being color dependent can similarly be corrected for to a very high degree by repeating this pre-distortion process independently for each replay color.

Figure 3D:
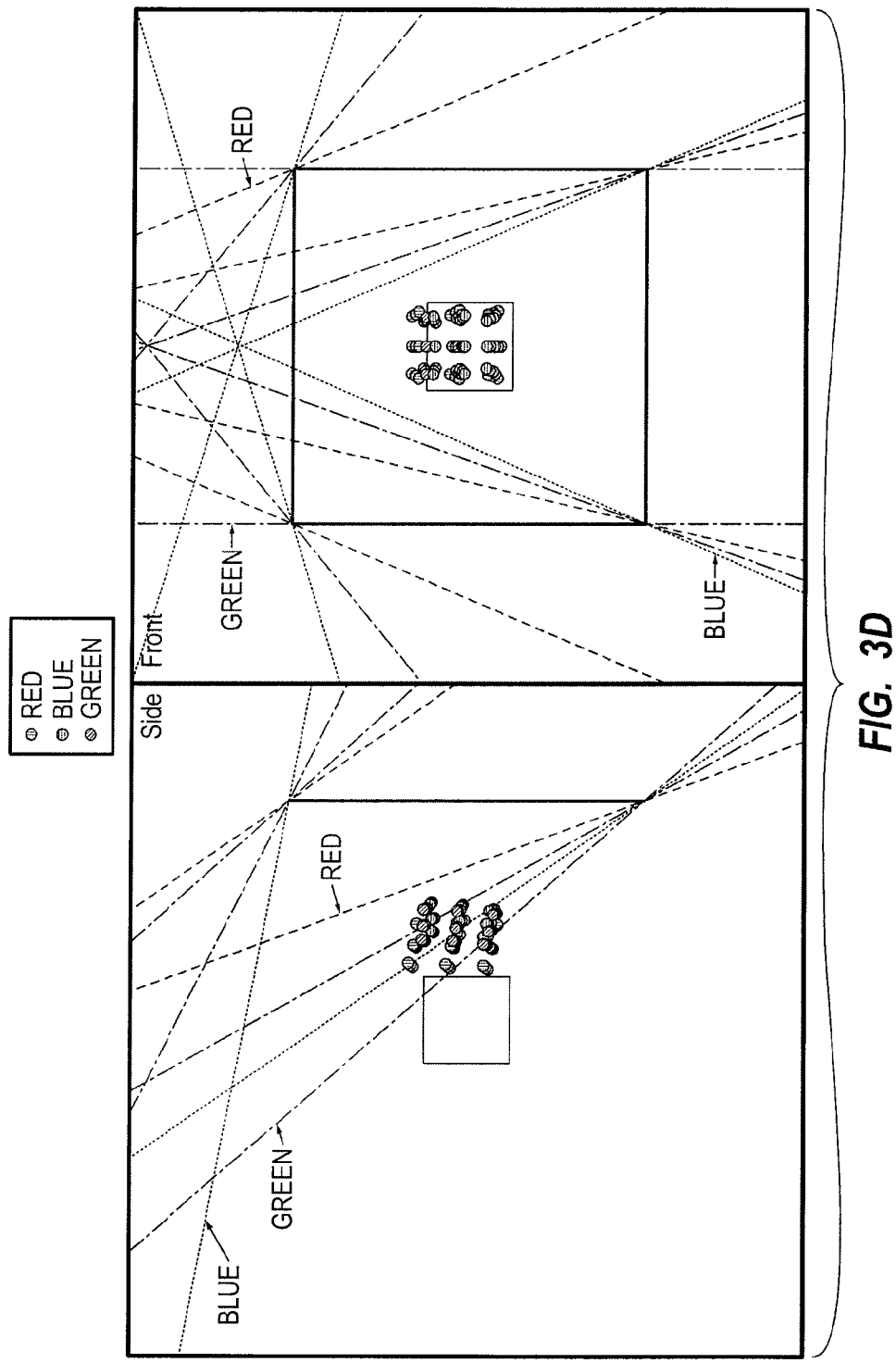
Figure 3E:
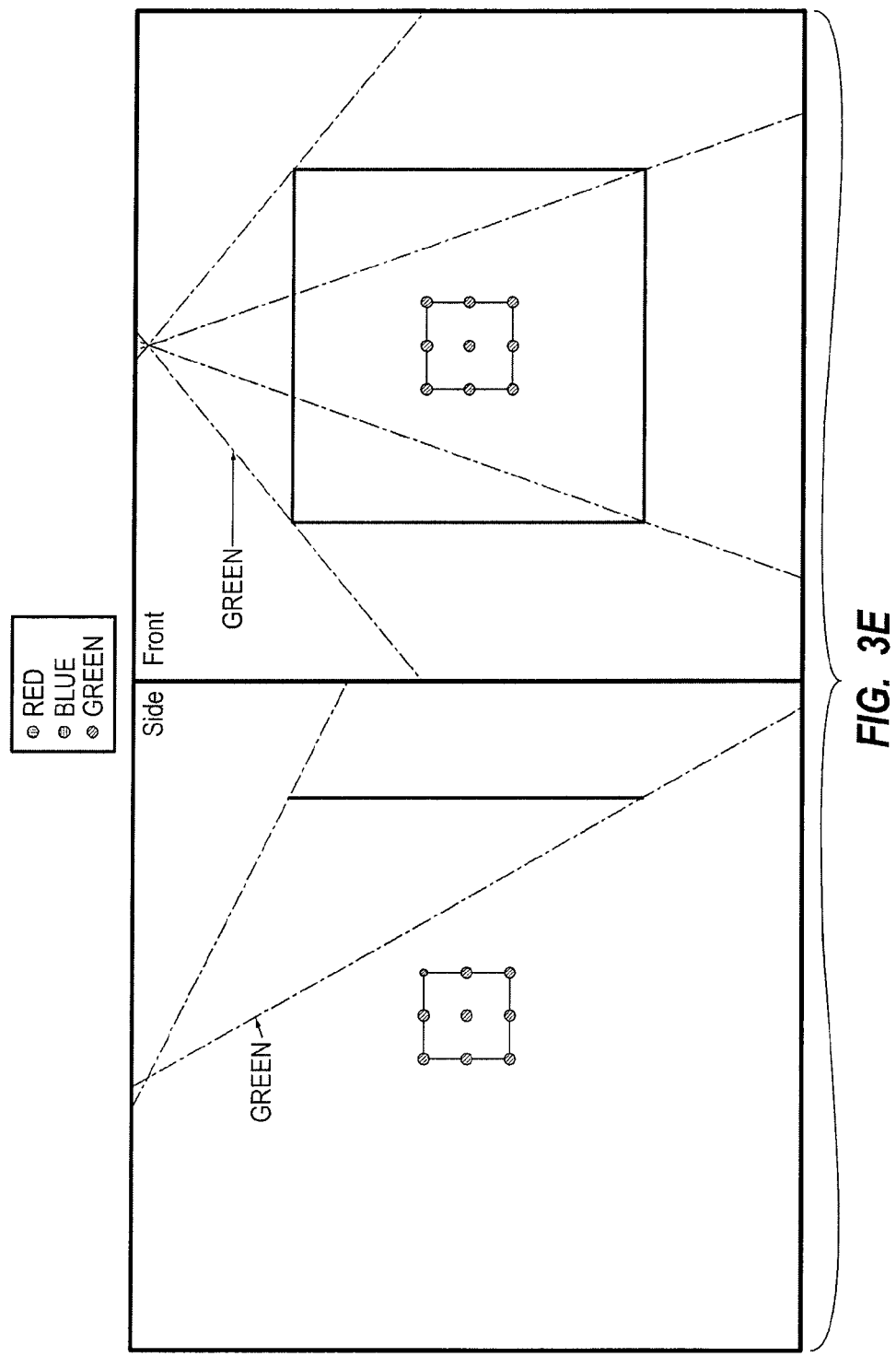

FIG. 3D, FIG. 3E, and FIG. 3F show respectively similar exemplary systems as FIG. 3A, FIG. 3B, and FIG. 3D but with the observer's location moved close to the hologram (300 mm) and substantially away from the z-axis (25° to the left and 25° up): the case with matched references (FIG. 3E) still exhibits excellent correction, and even the case with collimated recording, strongly divergent replay, and simple scalings along each axis (FIG. 3F) is partially corrected. Replay vergence and reference angles may also be adjustable and controlled during replay, for example to optimize holographic image quality as a motion-tracked observer moves, or to generate varying distortions and colors for artistic or aesthetic effects.

As a more detailed example of the present invention's color aspect, the present inventors have built an exemplary demonstration full-color holographic display upon the above described principles.

Figure 4A:
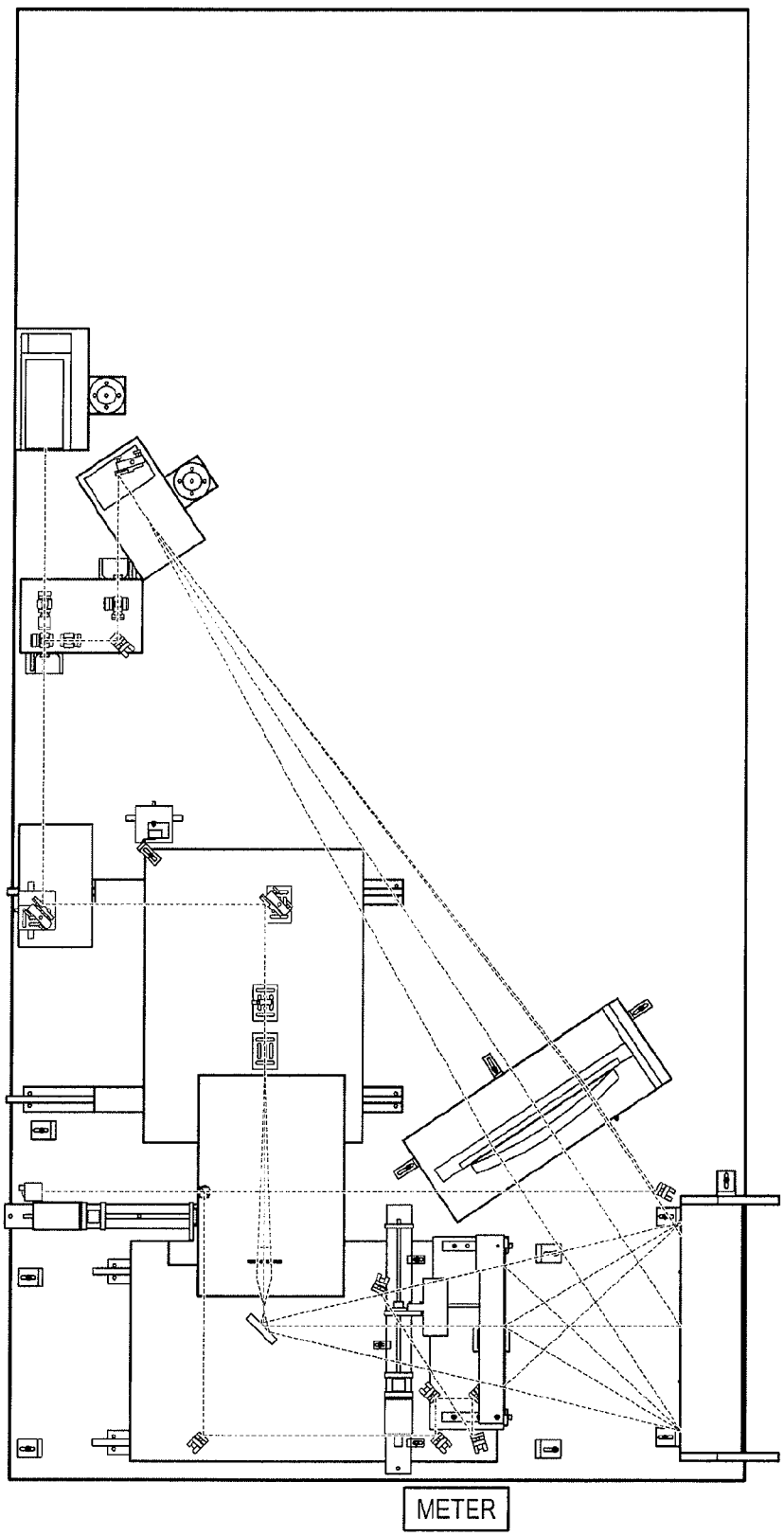
Figure 4B:
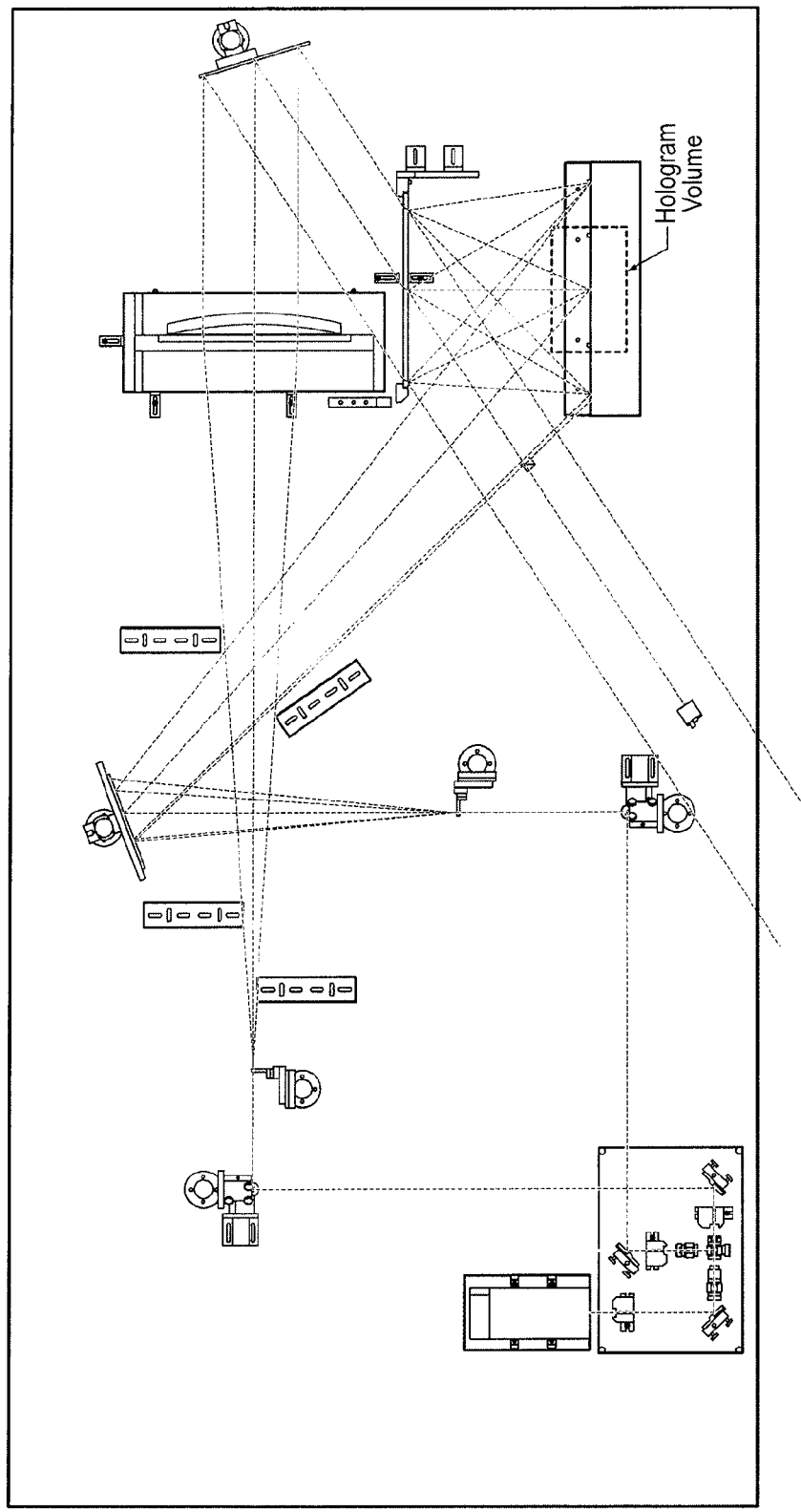

We used three hologram films, one each for red, green, and blue. We used a two-step multiple-slice sequential-exposure holographic process as described in Hart [U.S. Pat. No. 6,151, 143 and CIPs thereof] with master holograms recorded in approximately 14 inch by 17 inch Agfa Gevaert 8E56 emulsions factory-coated on approximately 0.006 inch thick polyester substrates and processed in a developer formulated with ascorbic acid and phenidone-B and a bleach formulated with sodium dichromate (and low-chloride water) using a Colex RTK20SP automatic film processor [Colex Imaging Inc., Paramus, N.J.]. These master films were copied into a similar holographic film (a custom material manufactured by Konica [Konica Corporation, Tokyo, Japan], though the aforementioned Agfa 8E56 would also have been quite suitable) and processed in the same way as the masters. For the master films (FIG. 4A) we used a substantially collimated reference beam angle of approximately 56.3° and substantially P polarization. For the copy films (FIG. 4B) we used an uncollimated reference beam with approximately a 3° full-angle divergence over a 6 inch by 7 inch copy film, a reference angle of approximately 48.3° at the film center, and substantially P polarization. Master-to-copy physical and optical separation was approximately 14.5 inches, which with our recording system (substantially as described by Hart) resulted in an accessible image volume for the real image in the copy films from approximately 4 inches behind the film to approximately 6 inches in front of the film. These masters and copies were all recorded at approximately 532 nm using an OEM-version of a Coherent 100 mW diode-pumped solid state laser [Coherent Laser Group, Santa Clara, Calif.]. This example illustrates the preparation of "copy" or "H2" holograms from "master" or "H1" holograms, however the present invention can also be practiced using master holograms without copying, or using third generation (or greater) holograms copied from H2s.

To reduce scatter noise from the backing layer on the Konica material we used a dilute (approximately 10%) solution of household bleach to remove said backing layer. In general it is greatly advantageous to take any possible precautions to reduce sources of noise in the hologram films of the present invention or which may result from scatter or other undesirable effects including stray light within or between the films and the other optical components desired or used to implement this invention during hologram replay and hologram recording. For example, the content and positioning of elements within the holographic images, and the distribution and other details of the slabbing, feathering, or shelling of said content (as described below) may be adjusted manually or automatically to reduce the number of sequentially recorded holograms (which generally improves the brightness and contrast and reduces the noise) and to prevent the occurrence of exposures which contain very little information (such as a few isolated non-dark pixels) and which hence generally use lengthy exposures which may be impractical or commercially undesirable and which may make them more prone to vibration and other disturbances tending to prevent the recording of bright clean holograms.

Hart teaches that the beam ratio between the reference and object beam should be kept substantially uniform from one sequential exposure to the next and should have a value which tends to unity as the number of such exposures increases. The following empirical formulae work well for the beam ratio and the exposure energy for mastering as functions of the number of sequential exposures N (in the range N=1 to approximately N=100) recorded in materials similar to Agfa 8E56.

Beam ratio $k$=reference power/object power=$6.153832543*N^{(-0.334672624)}$

Exposure energy(in μJ/cm$^2$)for each sequential exposure $E=18.22665*N^{(0.4796472)}$ The resulting k and E values for each value of N can be pre-computed, tabulated, approximated, and/or derived by other formulae than those shown above yielding similar values.

These formulae may be used in conjunction with a measured or estimated reference beam power at (and normal to) the recording material Pr (in μW/cm$^2$) and a measured or estimated object beam power at (and normal to) the recording material Po (in μW/cm$^2$) to calculate a suitable effective exposure duration $t_{effective}$ (in seconds) for each sequential exposure recorded in materials similar to Agfa 8E56 using, for example, the following formula.

$t_{effective}=E/(Po+Pr)$

A suitable actual exposure duration $t_{actual}$ (in seconds) for each sequential exposure recorded in materials similar to Agfa 8E56 may be calculated using, for example, the following empirical fifth-order polynomial formula to compensate for reciprocity failure over approximately the range from $t_{effective}=0.02$ seconds to $t_{effective}=50$ seconds.

$t_{actual}=10^{\wedge}(-0.04704082954975890+$
$1.08351170247430000*Log_{10}(t_{effective})+$
$0.11749593991745200*Log_{10}(t_{effective})^{\wedge}2+$
$0.00018336117455206*Log_{10}(t_{effective})^{\wedge}3-$
$0.01827231737567560*Log_{10}(t_{effective})^{\wedge}4)$ Resulting $t_{actual}$ values for a convenient range of $t_{effective}$ values can be pre-computed, tabulated, approximated, and/or derived by other formulae than those shown above yielding similar values.

For recording images which would use lengthy exposures (which is generally undesirable for reasons including those described above), a satisfactory result may generally be obtained by allowing the beam ratio for such an exposure to exceed the value indicated by the above formulae to a sufficient extent that $t_{actual}$ (allowing for the reciprocity correction) does not substantially exceed a chosen maximum (for example, 20 seconds may be a practical and convenient choice for $t_{actual}$) while maintaining substantially the effective exposure energy indicated by the above formulae. This process is referred to as "reference boost".

Other effective noise-reduction techniques employed by the present inventors include careful control of the degree and orientation of polarization of object and reference beams to maximize their mutual interference, and clean-working chemical processing to avoid photo-chemical and mechanical sources of noise in the films such as fogging, chemical color casts or contamination, surface abrasions, dents, scratches, and other such damage.

Using copy holograms as described in Hart is potentially advantageous because, among other benefits as described in Hart, it can be used to convert a deep-image hologram which recreates entirely on one side of the master film and at some considerable distance from the master film (about 10 to 18 inches in our implementation of Hart) into a shallow-image hologram in which the holographic image is closer to and may even exist on both sides of (i.e., straddle) the copy film. Otherwise in general it is difficult to make a shallow-image transmission master hologram because the mastering reference beam for a transmission hologram is incident upon the recording material from the same side as the mastering object beam, though this issue can in part be addressed by, for example, the use of edge-lit geometries, the use of steep mastering reference beams, or the use of re-imaging optics introduced between the diffusing screen and the recording film in Hart's mastering geometry. As another option, especially if a landscape-mode copy is desired from a portrait-mode copy, or vice versa, a tight fitting geometry which is referred to as "crossed references" can be used which has a side reference beam for one reference and an overhead reference beam for the other, in which case one can be P polarized at its film and the other S polarized at its film (because at the copy film both are then in the same polarization direction) which can be better than the conventional approach (in which both beams are in the same polarization state at their respective films) because it can yield more uniform diffraction and can be less sensitive to polarized scattered light.

In so far as deep-image holograms are or may be blurred or otherwise indistinct due to their image falling too far from their film if a broadband illumination source is used in the context of the present invention, any such blurring or other lack of clarity may be less evident in a shallow-image copy of such a master. However the use of narrow band sources in the context of the current invention permits sharp replay of even deep-image holograms: the present inventors have, for example, viewed a series of crab images (as described below) in the form of deep-image master holograms at depths of approximately 10 to 18 inches very satisfactorily. Another aspect of the use of master or copy holograms in the present invention is that each may have, and may be optimized somewhat differently to have, different viewing angles, vertically and horizontally. A comparatively large master film can capture and replay wide viewing angles of a comparatively small region, but even a similarly or equally large copy of this same master may have reduced viewing angles due to constraints associated with bringing the copy and the master reference beams to their respective films during the copying process. These constraints may be reduced (and hence the copy's viewing angles potentially increased) via the use of edge lighting, steep references, reimaging optics, or the crossed-reference geometry as described above. On the other hand, the vertical or horizontal viewing angle of a master hologram in the context of this invention, or of a copy thereof, may desirably be reduced or made asymmetric, non-rectilinear, or intermittent for artistic or aesthetic effects or to increase the brightness or contrast of said hologram.

The Agfa 8E56 material is an example of a holographic material which, depending on the processing regime used, can post-processing retain a degree of photosensitivity such that upon subsequent exposure to light, especially to bright blue or ultraviolet light, a process of photolytic silver grain formation occurs and via this or other effects (generically termed "printout") such a material gradually darkens. This can be used to create holograms with a deliberately limited lifespan: such holograms darken with use such that after a predictable period of use they become sufficiently less bright as to be unsatisfactory or unusable. The present inventors have also observed that printout in some material/processing systems can in fact improve the image quality of holograms because scatter noise, perhaps attributable to the presence of photosensitive grains of certain sizes, may darken more rapidly or before the holographic image itself does, and hence printout can improve a hologram's image contrast and may advantageously be induced, accelerated, or promoted deliberately by, for example, subjecting a hologram to intense light, especially blue or ultraviolet light such as can be provided for example by Q-Panel's UV-enhanced fluorescent lamps [Q-Panel Company, Cleveland, Ohio]. This deliberate induction of printout may also be accelerated by immersion of the target hologram during this light exposure in a developing agent such as, for example, a weak solution of ascorbic acid. Printout may be avoided, or slowed, even in materials such as Agfa's 8E56, by the use of a desensitizing bath or ingredient prior to, during, or subsequent to photographic processing, and in the context of the present invention one or more of the component color films may be partially or substantially shielded from the desired actinic light because of its location within the film/filter stack. For example, in the present inventors' color demonstration, as described herein, only the outermost film facing the observer is directly exposed to ambient light, the other films being behind filters which filter out portions of any such external ambient light before it can reach these other films. Similarly, the outermost film receives from the illumination source only that proportion of the colors of light for which the other films are responsible which those films direct into their respective images, but is substantially protected by the filters from the remaining portion, if any, of the un-diffracted reference beams of these colors. Further protection from printout induced by the internal sources and any external sources of actinic light may be provided by the addition of respectively back and front protective windows or covers to reflect back or absorb the most harmful wavelengths such as in particular those in the ultraviolet region.

Such front and back windows may in any case be desirable to hold the front and back films in place and flat, and in the case of the front window to protect the front film from scratching and impacts either accidental or on the part of a malicious or curious observer, and in the case of the back window to protect the film/filter assembly from infrared heat generated by the illumination source (very little such heat is generated if laser sources are used, but LEDs and especially incandescent white light sources can be significant heat sources).

The "object" for each of the three holograms in the present inventors' color demonstration consisted of a series of two-dimensional images as described by Hart, though in this case we used a selection of corporate logos rather than radiological imagery and we assigned each color component of each logo to an arbitrary z-depth to achieve a visually pleasing distribution of content in color and all three spatial dimensions. The original full-color digital file of the artwork for each logo was color-separated and color-corrected using the built-in commands of the ImageJ image processing program [Wayne Rasband, National Institutes of Health, Bethesda, Md.]. Each such two-dimensional image was recorded (FIG. 4A) in series generally as described by Hart, using a Sony LCX016AL LCD projected and magnified onto a holographic diffuser [LSD, Physical Optics Corporation, Torrance, Calif.] with an approximately 45° symmetric full-angle diffusion and its diffusing side facing away from the recording material (the side which does face the recording material can beneficially be anti-reflection coated to reduce scatter and halation within the diffuser and mirror images between it and the recording film). Other film production details were broadly as described by Hart, including gamma control and superblacking implemented in a combination of ImageJ and our proprietary hologram production software, copying (FIG. 4B), and replay of the copies using an example of Bazargan's dispersion-compensating display with a grating matched for 532 nm at 48.3° (this angle was chosen empirically because if the otherwise generally preferable 56.3° is used (Brewster's angle as discussed above), Fresnel reflection losses can be severe, especially for the red end of the dispersion compensated spectrum which passes through the optical layers of the dispersion-compensating display, as described in more detail below, at steeper angles).

Gamma correction was based upon the use of a Look-Up-Table (LUT) to provide the desired exponential ramp matching the response of the human eye, said lookup table being computed from the measured grayscale response of the Sony/POC projection system. Color-matching and white-point selection could have been achieved by using a different LUT for each color film. The use of LUTs is a practical convenience for computational efficiency, but since a LUT contains essentially an indexed record of a series of computations or estimations its use can generally be replaced by execution of said computation or estimation as and when the desire arises.

In addition, we calculated z-scale offsets and scales for each film to allow for the correction of Bazargan's longitudinal chromatic scale-dependence as described above. In so calculating we allowed for the known thicknesses of our hologram films and of our filters. Rather than using the full form of Champagne's equations we noted that we had a special case with simplified math: specifically, for this special case in which each film is made using a collimated reference beam with the same reference angle and green laser wavelength and is replayed using our color method in an example of Bazargan's dispersion compensating display implemented with collimation and a compensation grating made for the same reference angle and green wavelength, 1) the green image did not use z-scaling, and, since our G film was the final element in the stack (i.e., was closest to the observer), also did not use a z-offset, 2) the B film included a z-scale in the same proportion as the predominant blue and green wavelengths used for its reconstruction, and included a z-offset allowing for its own optical thickness and the optical thickness of the St filter, and 3) the R film included a z-scale in the same proportion as the predominant green and red wavelengths used for its reconstruction, and included an additional z-offset allowing for its own optical thickness and the optical thickness of the Pi filter.

To construct the dispersion-compensated display, we used a modified example of Holorad's Voxbox Model-22 [Holorad, Salt Lake City, Utah] implementing Bazargan's device including its housing, Fresnel lens, and grating. We also used its anisotropic material, a sheet of Holorad's Voxblock material which performs a function akin to the 3M LCF described by Bazargan but which is, as described below, superior for our purposes. The standard Model-22 Voxbox uses a broadband halogen lamp: we substituted a tri-color LED illumination source based on individual red green and blue LEDs [PhlatLight PT120 Projection Chipset, Luminus Devices, Inc., Woburn, Mass.] with beam-combining optics in the form of a Samsung BP96-01725A [Samsung Electronics America, Inc. Ridgefield Park, N.J.] as used in the Samsung's HL-T56087S rear-projection television. Whereas Samsung uses these parts for time-series illumination of each color, and hence wires the LEDs in parallel so each can be activated individually at full (18 Amps) or reduced power, we rewired the LED's in series and ran them continuously (DC mode in Luminus's nomenclature) powered by an BK Precision 1621A variable power supply [BK Precision, Yorba Linda, Calif.] operating in constant voltage mode at approximately 4.5 Volts and approximately 10.9 Amps. We retained the fan-based air cooling system Samsung use in the HL-T56087S, substituting this for the Model 22's standard fan cooling, though conductive cooling could have been sufficient given the inherently high wall-plug efficiency of the substitute LED sources.

Color-matching, white-point selection, and brightness and contrast control can also be achieved by adjusting the relative brightness of each LED, for example by introducing fixed or variable resistances between the LEDs in series or by operating them with individually selectable voltages and/or currents and/or in a Pulse Width Modulation (PWM) scheme (linear or logarithmic), or by tilting the optical components in our film/filter stack. It may be desirable to use methods such as these to supplement or override an initial step of color-matching and white-point selection and brightness and contrast control achieved in software for example using color-specific LUTs. This can be done to adjust the color-matching and white-point and brightness and contrast to better suite a specific application or environment or the visual response of an observer, allowing for, for example, inter-observer variations or the psychovisual effects of different ambient lighting conditions, either as a set-up adjustment, or dynamically in response to a light-measuring mechanism, a timer, or observer-directed control inputs.

Color matching and white-point correction are particularly useful for holograms including skin tones or edible produce or corporate identity marks such as logos, in the former two cases because the human visual system is particularly adept at noticing errors in skin tones and in the color of fruit and other edible comestibles, and in the later case because the correct and accurate use of certain colors, such as, for example, Eastman Kodak's trademarked yellow color, is commercially and legally important.

Behind the Model 22's standard approximately 3 mm thick transparent acrylic cover plate we added an approximately ¼ inch thick black (to reduce scattered noise) acrylic plate with an approximately 12 inch approximately circular opening cut through it into which we mounted our three hologram films and our two glass dichroic filters. Suitable dichroics comprise, for example, for the Pi filter part number 070927-01 from Optical Filter Source, LLC [Austin, Tex.], and for the St filter part number 071011-04 also from Optical Filter Source, LLC. These filters were designed for the present inventors' color demonstration using OFS's in-house dichroic design software and FilmStar [FTG Software Associates, Princeton, N.J.] to match a specification we provided based on our own detailed calculations. Specifically, we calculated in Excel [Microsoft Corporation, Seattle, Wash.] the desired filter transmittances for each filter as functions of wavelength for each of S and P polarization in 5 nm steps from violet (400 nm) through red (700 nm) using the dispersion-compensation mathematics of Bazargan, the grating equation, the standard photopic response curve of the human eye [Commission Internationale de l'Eclairage Proceedings, 1924, Cambridge University Press], and our own measurements of the angular-dependence of the transmission, scatter, and diffraction of our gratings and holograms and of the transmission of our Voxblock material. FIG. 5 shows exemplary transmission spectra in P (solid line) and in S (dashed line) polarization of the Pi dichroic at 0.0° (FIG. 5A), 17.0° (FIG. 5B), 25.0° (FIG. 5C), and 35.0° (FIG. 5D) for image content, and 40.2° (FIG. 5E) for the blue replay reference, 47.5° (FIG. 5F) for the green replay reference, and 61.3° (FIG. 5G) for the red replay reference. FIG. 6 shows exemplary transmission spectra in P (solid line) and in S (dashed line) polarization of the St dichroic at 0.0° (FIG. 6A), 17.0° (FIG. 6B), 25.0° (FIG. 6C), and 38.0° (FIG. 6D) for image content, and 38.0° (FIG. 6E) for the blue replay reference, 45.0° (FIG. 6F) for the green replay reference, and 57.0° (FIG. 6G) for the red replay reference. Slightly different reference angles are shown for the two dichroics because they were designed and measured assuming slight adjustable tilts in the film/filter stack.

These particular filters were fabricated on approximately 3.3 mm borofloat glass, but other suitable substrate materials could have been used including for example plastic substrates which may advantageously weigh less or be less costly or less fragile or otherwise beneficial. It is also possible to use holographic filters which exhibit the desired angular dependencies, and these may be manufactured on thin flexible plastic substrates each, for example, on the order of a few thousands of an inch thick enabling the cost, thickness, and fragility of the entire stack to be considerably reduced. For example, flexible angle-dependent filters, such as holographic dichroic filters, may advantageously be laminated with or otherwise permanently or semi-permanently attached to flexible holograms.

Figure 7:
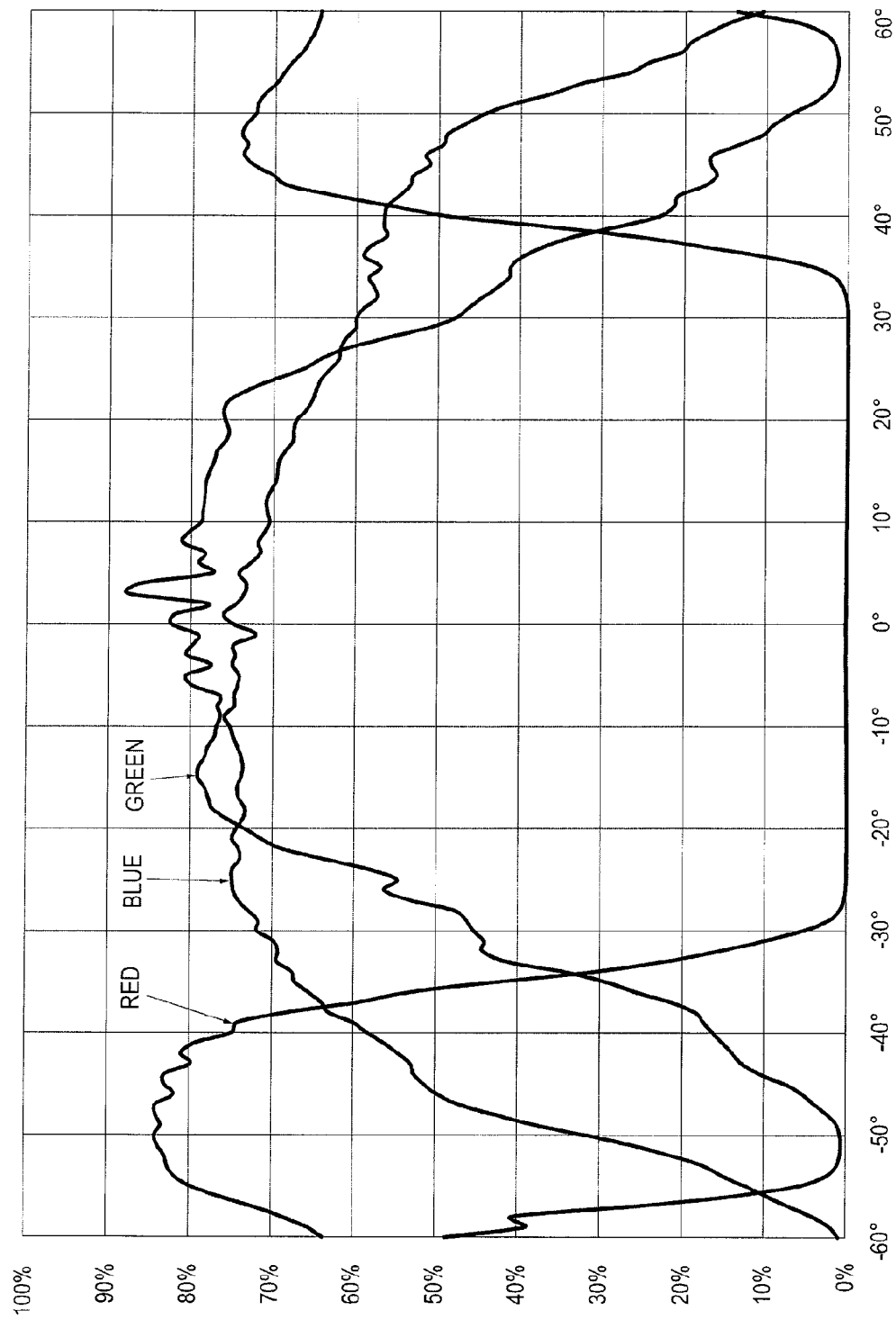

An exemplary holographic "dichroic" may be produced as follows. Dichromate emulsion is produced by dissolving approximately 45 grams of gelatin in approximately 300 ml of water at approximately 35° C. This mixture is slowly and continuously stirred while the gelatin dissolves and liquefies. Upon complete liquefaction of the gelatin, approximately 8 grams of Ammonium Dichromate is added, and the mixture is stirred at temperature for a further approximately 15 minutes. Clean glass plates are then coated with the gelatin/dichromate mixture to a thickness of approximately 12 μm, allowed to dry for approximately 48 hours at room temperature, and aged for approximately two weeks before use. The filter is recorded in reflection mode using an exposure of approximately 120 mJ/cm$^2$ using two substantially collimated 488 nm beams at approximately a symmetric angle around the plate normal. The filter is developed by hardening for approximately 30 seconds in Kodak Rapid Fixer [Eastman Kodak Company, Rochester, N.Y.], washed for two minutes in filtered water, and dehydrated by being passed through a series of baths of graded percentages of alcohol/distilled-water mixtures for approximately 1 minute each ending with a bath of 100% dry alcohol. Finally the plates were dried in filtered warm air at approximately 70° C., and, if desired, laminated to prevent the ingress of moisture. FIG. 7 shows transmission spectra of such a filter (compare with the conventional dichroic of FIG. 6).

The specific style of Fresnel lens and holographic diffraction grating used in the present inventors' exemplary demonstrations can be replaced by other kinds of, respectively, collimating and dispersing elements. For example, collimation may be achieved using solid or liquid-filled plastic or glass lenses (including TIR lenses which can be optically very fast for their thickness), or using spherical, parabolic, or higher-order mirrors, on-axis or off-axis. Embossed gratings can be used, and either kind of grating can be given optical power so that it achieves or contributes part of, or to some degree color-corrects, the collimation.

The analysis (experimentally and mathematically) and control of polarization in the present device can be quite interesting. Many of the light paths through the present invention are incident upon films, filters, gratings, lenses, mirrors, holograms, windows, or other optical components at quite steep angles for which there may be a significant polarization dependence in their subsequent refraction, reflection, diffraction, scattering, and absorption. This can lead to polarization dependent losses of light and hence impact overall or localized brightness and color of the observed holographic image. Introduction of additional polarization-dependent optical components (such as polarizers, waveplates, and polarization recyclers) may be advantageous, for example to polarize light from a fully or partially unpolarized source, or to eliminate or reduce polarization induced brightness variations within the holographic image or polarization induced variations in any background noise which is visible in conjunction with the holographic image. As a further consideration, observers of the holographic image may be wearing polarizing glasses, such as for example polarization dependent sun glasses, and hence it may be advantageous to ensure that the net polarization of the holographic image is uniform or negligible or aligned or otherwise orientated with respect to the anticipated polarization axes of such glasses, for example by achieving a substantially linear polarization, substantially circular polarization, or substantially unpolarized state for the holographic image via the use of, for example, an additional waveplate incorporated within the already described stack or in front of or behind it.

As a general observation regarding the design of systems such as this, whether strictly via computation, experimentally, or as a blended combination of calculation and experiment, in many cases the functional features of each filter described above can be substantially simplified or relaxed, either to simplify the design or to enhance manufacturability or operation. For example, if in the detailed example above the Pi filter removes substantially all the residual red reference beam at or near the REFr angle then there is little or no need for the St filter to also block red light at or near the REFr angle, and the red diffraction efficiency of the blue and green holograms can essentially be ignored, or, in fact, these two holograms can be individually optimized for their respective blue and green roles. Generally there are several ways like this in which each component can be better optimized if other components before and/or after it can be optimized in other ways, and, while this can partly be decided by simple theoretical arguments, in practice a somewhat detailed modeling effort allowing for wavelength and polarization dependencies can reveal unexpected opportunities for such optimizations. For example, the utility of and design parameters for antireflection coatings on one or more surface of one or more components can be estimated, as can the potential advantages of tilting components or index-matching components together. Such design calculations can be performed by hand or formulaically in a mathematics program such as Excel or in optical design software capable of modeling many or all of the significant physical effects, e.g., ZEMAX [ZEMAX Development Corporation, Bellevue, Wash.].

One goal of any such design activity may be to enhance rather than to reduce or eliminate a particular effect, such as polarization dependence, either because the end result of this is an improved holographic image, or because it can be used as an additional effect or decoration to enhance the holographic image by altering or modulating or otherwise modifying it in a permanent or temporary or varying manner. For example, an angle dependent color shift may be used for aesthetic or artistic effect, or a temporary or permanent flickering or wobbling of the image may make it more attractive or exciting.

Similarly, the holographic image may be enhanced by using it in combination with, for example, colored or shaped surrounds and enclosures, other holograms, and two-dimensional or three-dimensional text, graphics, imagery, and decorations adjacent to or in the vicinity of the holographic image or printed embossed or otherwise applied to or attached to or in the vicinity of one or more of the hologram films of the present invention (especially the frontmost such film) or to one or more of the other described components such as a protective front window. Such additional decorative or informative elements may also take the form of mists, fogs, smoke, gasses, fluorescent or phosphorescent, reflective, diffractive, refractive, diffusive elements which are in part or whole illuminated by the holographic image or images or by other light sources herein described (such as residual or utilized reference beams) or provided as additional illuminants for this purpose or derived from ambient light sources. Two-dimensional and/or three-dimensional static or moving or moveable objects, shapes, or devices (including sculpted, found, or specially fabricated objects, shapes, or devices) may be disposed around or within the holographic image or images: such objects or shapes or devices within the holographic image may selectively occlude said holographic imagery from certain viewpoints either permanently, temporarily, or intermittently, and may reflect or image other two-dimensional or three-dimensional images or objects into part or all of the space occupied by the holographic images.

Returning now to the exemplary color demonstration, we rigidly mounted the Samsung/Luminus source to the Model 22's base plate and introduced two extra flat folding mirrors (one a high-quality aluminum on glass mirror from Newport Corporation [Irvine, Calif.], the other a low-quality aluminum on plastic mirror fabricated for us by a local plastics shop, both mounted on Newport adjustable optical mounts (high quality optics are generally not used in the implementation of Bazargan's display device which we have found to be pleasingly immune to imperfections and damage to its optics) to route the combined white beam from this source to approximately the focal point of the Model-22's plastic Fresnel lens, via the Model 22's existing flat beam-folding mirror. This is a fast (approximately f/0.5) custom Fresnel lens [RHK Japan Inc, Tokyo, Japan], so even quite small displacements and tilts of the various folding mirrors can produce a significant error in collimation which in turn can lead to some image distortion and to a display which, for example, has some difficulty achieving a saturated and bright red color at the upper part of the image and a saturated and bright blue color at the lower part of the image or vice versa: while this color variance can be used for aesthetic or artistic effect, it can also be reduced or eliminated by careful alignment of the optics and by the introduction (as we did) of spacers to hold the existing beam-folding mirror of the Model-22 a little further away from its mounting post (and hence a little closer to the Fresnel) than was the original design intent. If instead the desired correction had been to increase the distance between these components we would have introduced spacers at the front of the Model-22 to move the Fresnel lens a short distance towards the observer.

For this demonstration, we added simple flat mirrors to route light within the enclosure of the Model-22 and we retained the existing flat mirror present primarily for the purpose of reducing the Model-22's overall depth. It is advantageous to use such mirrors to fold the optical path to this extent and even to a greater degree. For example, a longer optical path permits the use of a slower collimating optic, which generally is less costly and performs better than a corresponding fast element like the f/0.5 Fresnel lens used in the Model-22. Also, a longer optical path implies a lesser proportional difference between the distance traveled by on-axis rays from the source to the hologram film and the distance traveled by off-axis rays from the source to the hologram film and this reduces the resulting diminution of brightness of those parts of the holographic image which are lit by the off-axis rays compared with those parts lit by the on-axis rays, an effect further enhanced by the shallower angle of incidence upon the collimator of off-axis rays with a longer path length. However if the lengthier path is not folded or is only folded once or twice the overall depth of the display device can become commercially or technically unreasonable or inconvenient. Several factors, however, weigh against folding the path too often or too sharply. For example, each mirror, even if antireflection coated, reflects only a polarization-dependent proportion of the light incident upon it, the remainder of the light being absorbed or scattered or to some extent depolarized to the detriment generally of image brightness and image contrast, though suitably interposed baffles can generally intercept and hence attenuate much or all of any such scattered light. Further, for sources with comparatively high etendue, such as incandescent lamps, less of the source's light can be captured by the collimator if a greater path length is used since in this case the source subtends, or appears to subtend, a lesser solid angle as seen from the collimator, and hence a dimmer holographic image results, though in partial compensation of this detrimental effect, because the source also appears to be smaller (unless a physically larger and hence typically brighter source is used in an attempt to offset this loss of brightness) it appears to be more nearly an ideal point source which results in a higher resolution for hologram image points off the film plane.

Generally, a single fold mirror which is quite large (approximately as large in one or two extents as the minimum dimension of the collimating element) can be used to fold the path of even an f/0.5 collimator, and this can result in a theoretical minimum device depth of at most one half of the lesser linear extent of the collimating element in its own plane (i.e., not one half of the collimator's thickness, which in the case of a Fresnel lens, especially an embossed or otherwise high pitch Fresnel lens, can be very thin compared to its other dimensions, for example, approximately 2.7 mm in the case of the Model-22's Fresnel). So, for example, using a 14 inch by 17 inch Fresnel lens collimator in the Model-22 permits it to be folded with a single mirror to a depth no greater than approximately $14/2 \approx 7$ inches. In practice a somewhat greater depth is generally desired even in this case because the folding and the folded optics themselves have a certain depth and generally include some manner of holder, retainer, or mount to position them and this holder, retainer, or mount itself generally has some depth. For example, the actual depth of a Model-22 is approximately 9 inches (excluding an optional handle).

Figure 8B:
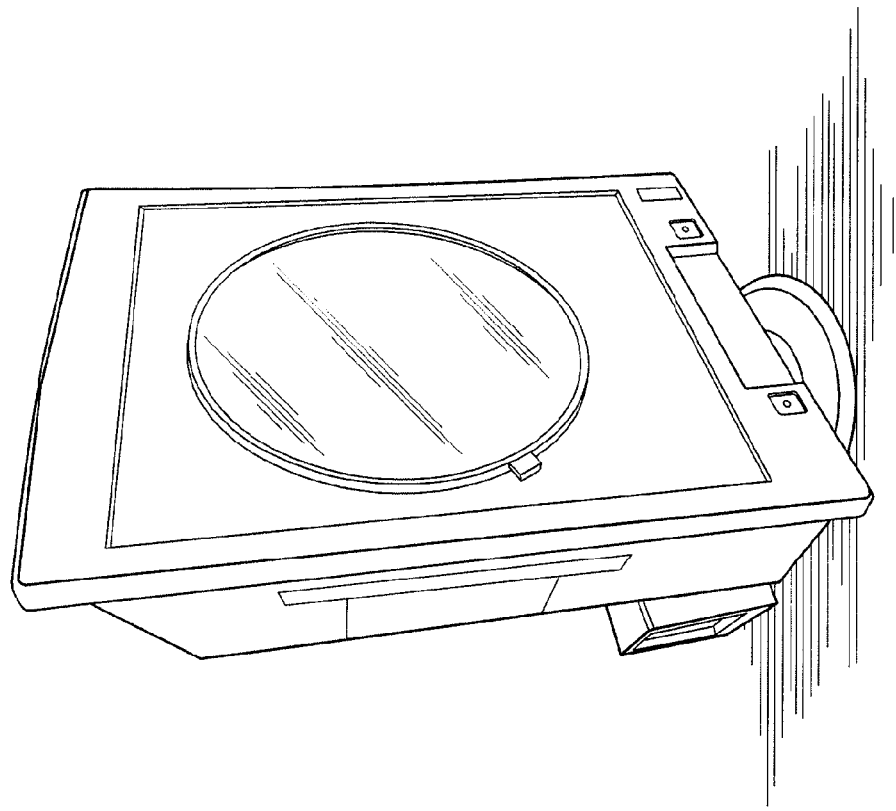
Figure 8A:
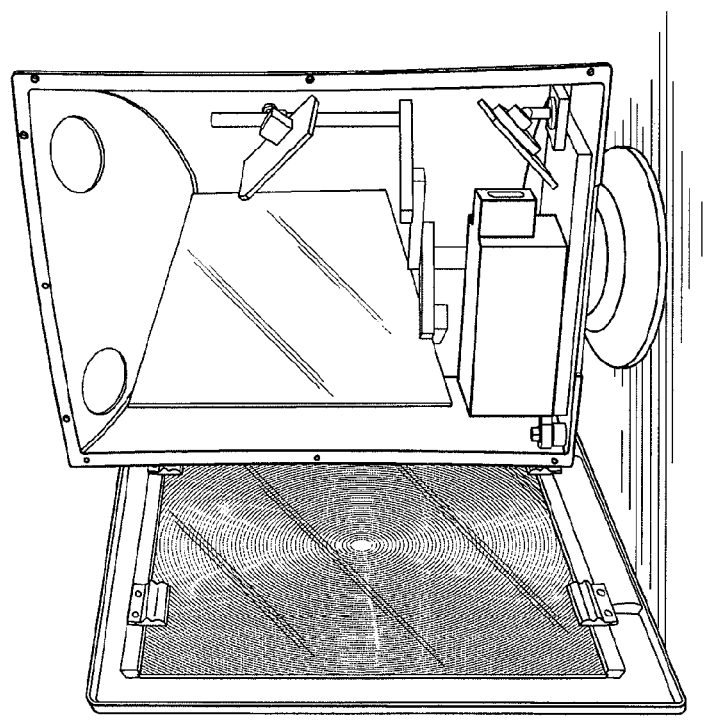
Figure 8C:
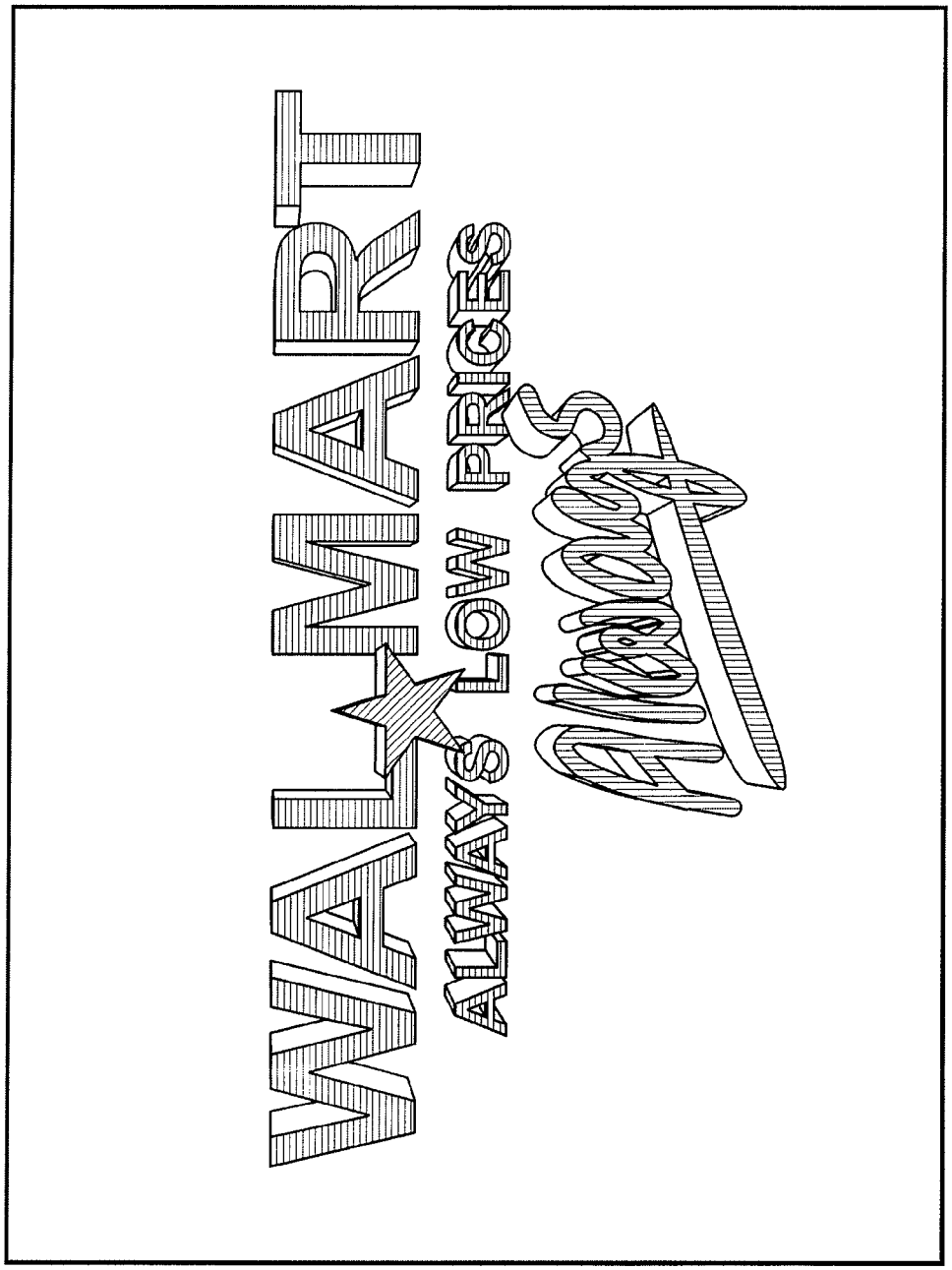

FIG. 8A and FIG. 8B respectively show an exemplary interior and exterior of the modified Model-22 as described above, and FIG. 8C shows an exemplary demonstration full-color hologram as illuminated by this device.

Figure 9B:
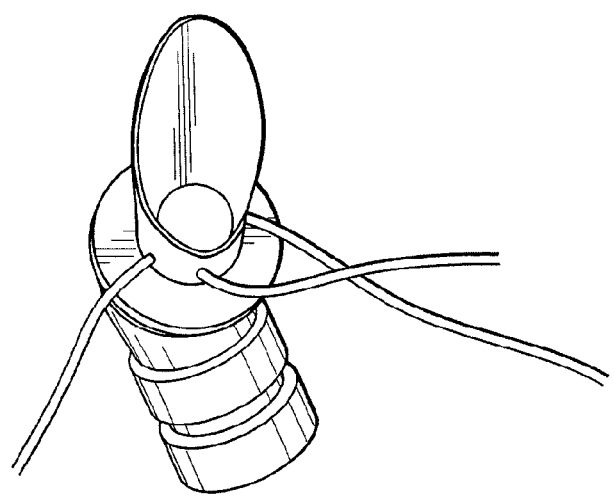
Figure 9A:
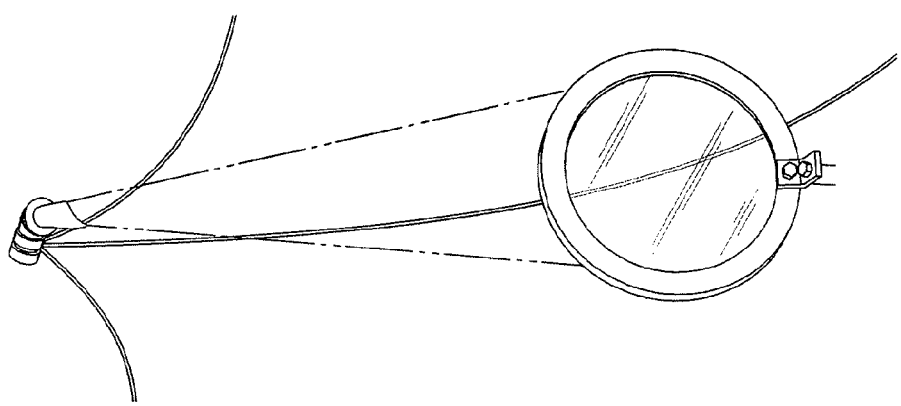

In another approach, a visually and commercially appealing embodiment of the present invention uses low or very-low etendue LED or laser sources to permit bright illumination of the hologram or holograms by a light source (or sources) which is (or are) physically or optically at a substantial distance behind said hologram or holograms and physically or optically substantially off-axis so that the hologram or holograms may be viewed without the use of an anisotropic material such as Voxblock or LCF as otherwise described herein (FIG. 9A). In such a geometry, the light source or sources can illuminate from a sufficient actual or apparent distance and at a sufficient actual or apparent angle as not to be visible within the viewing angle of the hologram or holograms, and hence the anisotropic material is not used (though it may still be advantageous for other reasons, such as to make the display opaque so that the environment immediately behind the display is not directly visible to the observer). Such a system can be implemented even for the color aspect of the present invention using laser illuminants (or sufficiently narrow band LEDs) without using dispersion compensation (though it may still be advantageous for other reasons) because each illuminant color can be obtained from a different source which said sources can be positioned to illuminate at or close to the desired reference angles (REFr REFg and REFb, for example) and hence the dispersion grating and its resulting dispersion compensation as described herein and by Bazargan may be omitted. Each said source can be independently collimated, or may be sufficiently distant that additional collimation is not desired, or the vergence corrections described above may be used to allow for the divergence of a comparatively close point source.

FIG. 9A and FIG. 9B show an embodiment using an unfolded light path from a point source 530 nm peak 70 nm FWHM 53 lumen LED [part number LXHL-NM98 "Luxeon Star/O", Philips Lumileds, San Jose, Calif.] for the green channel, located approximately 705 mm behind and approximately 1,057 mm above a vertically mounted circular hologram of approximately 300 mm diameter. The LED in this example is bandwidth narrowed using a 532 nm peak 10 nm FWHM dichroic filter [part number N62-157, Edmund Optics, Barrington, N.J.] to improve the sharpness of hologram details, located in this example out in front of the hologram in a range extending from approximately 200 mm to approximately 300 mm. An advantage of this geometry is that the space directly behind the hologram is clear, whereas in the example described using a modified Model-22 Voxbox display this space is occupied by the LCF/Voxblock, grating, and Fresnel lens immediately adjacent to and behind the hologram, and further back by the mirrors and the optically in-line source.

The psychological impact of such a hologram display may be enhanced because with free-standing holograms mechanically unconnected to their (potentially concealed) illuminants, the observer often cannot easily determine or even guess how the replay is achieved. Whereas with a box, case, or housing (such as the Model-22) immediately behind the hologram, the observer may generally assume there is some arbitrarily complicated mechanism or trickery concealed within it. Further, the space behind the hologram may be used for other visual effects and equipment. For example, an object such as a sculpted face located in this space is generally invisible to the observer unless separately illuminated, so that by turning on/off such additional illumination a startling apparition may be caused to appear/disappear. As another example, a video camera, periscope, peephole, or other observation or recording means may conveniently be located behind the hologram such that it can be used to watch or record the observer of the hologram, for example to monitor their reaction to the hologram for market research purposes or to provide a means for controlling or triggering an interaction between the observer and the hologram or the hologram's ancillary interactive systems such as loud speakers to provide audible feedback/interaction or motion within the hologram as described below.

If a second hologram is mounted with or close to the first hologram in an arrangement such as, for example, that of FIG. 9A, and a second illuminant is provided in front of the first hologram shining back through both holograms, and such second hologram is rotated such that it is reconstructed by said second illuminant and not by the original illuminant of FIG. 9A while the first hologram is reconstructed by said original illuminant and not by said second illuminant, then a first observer can see the first hologram from one side of the system as described but not the second hologram, whereas a second observer located on the opposite side of the holograms can see said second hologram but not said first hologram. The two observers may see each other if they are both illuminated, or one observer may be concealed from the other by being in a dark location or by being shrouded or otherwise concealed, or both observers may be in dark locations or shrouded or otherwise concealed and thus not able to see each other. Any such concealed observer can be revealed at any time, for example by being illuminated continuously or intermittently, and such ghostly apparitions of the other observer may be caused to appear or disappear or change color or brightness as part of a planned or impromptu interaction or performance between said holograms, said observers, and, optionally, an external operator or control system.

Returning now to the subject of illumination sources, the etendue-limited issues discussed above are substantially reduced by the use of low etendue LEDs and essentially eliminated if very-low etendue laser sources are used. As an example, the Mitsubishi L65-A90 LaserVue rear-projection television (RPTV) [Mitsubishi Digital Electronics America, Inc. Irvine, Calif.] uses laser sources (at wavelengths of approximately, 447, 532, and 640 nm), and achieves a tightly folded beam path incorporating aspheric and off-axis components to illuminate an internal collimator of approximately 57 by 32 inches (approximately a 65 inch diagonal) in an enclosure depth of approximately 10.1 inches, i.e., approximately ⅓ of the collimator's least dimension rather than the ½ which is the best which can generally be achieved with a simple single flat fold mirror as described above. Other more complex optical elements, such as holographic optical elements (HOEs), can also be used to produce a shallow overall depth in a device such as this. Extremely tight folding of the optical path is generally substantially less problematic using laser sources, even without aspheric or off-axis lenses or mirrors or HOEs, and even the reflection and scattering losses can be reduced through the use of wavelength-optimized and polarization-optimized coatings because an additional advantage of laser sources is that they are generally well or at least partially polarized: every reflection off a mirror, and (typically to a lesser degree) every scatter or reflection of a lens surface or HOE, has a polarization dependence, and these can be better managed with a polarized source for which in large degree, in one embodiment, only one of the orthogonal polarization states may, at least initially, be present, considered, and allowed for.

A potential disadvantage of using narrow band laser sources for one or more of the colors is the resulting presence and potential visibility of laser speckle. In practice in the context of the present invention laser speckle is not as troubling as might be expected: if more than one laser is used, either to provide the different colors, or to provide more light of any particular color, then the speckle for any of these single laser source, even if noticeable or objectionable on its own, is substantially uncorrelated with the speckle, if any, from the other laser source or sources and hence is less visible in combination. Further, the color holographic display of the present invention can be practiced with lasers which have very short coherence lengths: such lasers are generally unsuitable for recording (or copying) the component holograms, but are quite satisfactory for their replay. If it is desired to further reduce or substantially eliminate laser speckle, commercially available devices to do so are cost effective e.g., the speckle removal device available from dyoptyka [Dublin, Ireland], and can conveniently be incorporated in a hologram display device incorporating the present invention.

The present inventors' demonstration of these color hologram principles provides a holographic image visible over an approximately 6 inch high by 7 inch wide rectangular area approximately centered in the approximately 12 inch diameter approximately circular filters used. A black card mask is applied to the front of the display to frame this area. However in general the illuminated area of the films and filters, and any mask or surround, can be of an arbitrary size and shape, including for example non-rectangular shapes such as circles, ellipses, ovals, star shapes, or the geometric forms of letters, numbers, or other symbols or glyphs. This can be achieved by shaping and sizing one or more of the films or filters (or their surrounds and/or masks) to limit the illuminated area to the desired shape or size, or by introducing additional elements in the form of apertures or masks to further define or establish the desired size or shape. In general, smaller holograms can be illuminated with adequate brightness using less bright light sources, which may for example permit battery-powered operation (or operation by harvested energy such as solar power) where a larger display may include a more substantial electrical supply.

An advantage of the present invention is that the stack of films/filters can be held or attached to the front of an illumination mechanism, such as the modified Voxbox Model-22 display device described above, which permits the convenient and simple interchanging of holographic imagery. The front of the display device can be formed or equipped to permit the temporary attachment of a replaceable cartridge, holder, or cassette which retains the films and filters in substantially their desired geometrical relationships and yet which can be removed and interchanged with another similar cartridge, holder, or cassette containing different films and/or filters to display different holographic content or the same content in different colors. Such a cartridge, holder, or cassette, front-loading or otherwise, can be attached or retained with a locking mechanism or with fasteners that are actuated using a special or custom tool or process so that accidental or unauthorized removal or replacement of said cartridge, holder, or cassette may be prevented. Similarly, a mechanism or fixture may be provided which retains the filters substantially in place but permits the films arranged adjacent to said filters to be removed, exchanged, repositioned, interchanged, or replaced, and again a lock or locks or special fasteners may be provided to prevent accidental or unauthorized removal, exchange, repositioning, interchange, or replacement of said films. Holograms recorded on flexible films may be held in a substantially flat or planar fashion in this way, yet may also be rolled or otherwise deformed for convenient shipping and storage. On the other hand, holograms recorded on glass or other rigid or semi-rigid materials may in some circumstances be easier to handle and their greater rigidity may be relied upon to align and orient the correct assembly and operation of the film/filter stack.

As a safety feature for observers, installers, and others in the vicinity of or able to see a display device incorporating the present invention, especially such a device using bright light sources, and most especially one using laser sources, interlocks can be provided so that the light source is disabled, turned off, or hidden by a shutter or other interposing beam blocking mechanism, and these safety features can be linked to sensors and switches which sense or detect states of the device which otherwise could lead to a potentially unsafe exposure to the source, such as, for example, switches which detect the absence or presence, correct placement, and state of the cartridge, holder, cassette discussed above or of the films and filters themselves, or sensors which detect suitable, appropriate, or anticipated levels and wavelengths of light at one or more locations within the device's housing, or sensors or switches which detect the opening or closing of access hatches or covers permitting access (for example for service purposes) to the light from the enclosed source or sources.

The present inventors' demonstration of these color hologram principles used a modified Model-22 Voxbox display, in part for the advantages this embodies in terms of compactness, ease of use, enclosure of the optics, and convenience of use, all of which are inherent benefits achievable using the present invention, however the present inventors also anticipate that the component parts of the present invention, individually or combined as described, may have utility as modular parts for incorporation in other forms of display device utilizing the present invention. For example, the film/filter stack as described, or the parts thereof, or one or more of these parts incorporated into or contained within a cartridge, holder, or cassette as discussed above may be provided without some or all of the other parts and components and systems and processes described herein. In particular, the present invention may be manufactured and sold in the form of a module or a kit of parts used by others to build, implement, service, or repair hologram display devices or to add holographic display capabilities to other devices such as for example kiosks, vending machines, advertising and promotional displays, slot machines, posters, games, information displays, toys, furniture, and art works.

The present inventors' demonstration of these color hologram principles used component holograms made broadly as described by Hart. However the basic color invention presented here may be used with holograms produced in other ways, subject to the z-axis scale of each component hologram being such as to satisfactorily allow for or exploit the longitudinal chromatic defect identified by Bazargan.

For example, a stereolithographic process may be used to convert or "print" a CAD model or other three-dimensional computer data into a solid physical model, form, object composed of a material such as solidified photopolymer, sintered metal, or laminated paper (a wide variety of such systems have been commercially and experimentally implemented using these and other materials, and the use of such equipment is commonly referred to as Desk-Top Manufacturing or DTM). In such a DTM process the source data or model can generally be manipulated prior to printing so that, for example, its scale may be altered in one or more dimensions, and its scale can be different in one dimension, so the color-dependent z-scaling of the present invention can be accomplished. For example, a model of a building may be scaled from life-size to approximately 1% of life-size in two dimensions and 1.66% in the other dimension. This process may be repeated, producing a set of models which are substantially the same scale in two of their three dimensions but which have different scales in their third dimension, such as for example a set where for each model two dimensions are scaled to approximately 1% and the third dimension is scaled to approximately 1.66% in a first model, approximately 1.0% in a second model, and approximately 0.71% in a third model. These values of approximately 1.66%, 1.0%, and 0.71% are in the same relative proportions as the values of approximately 166%, 100%, and 71% used in our earlier example of Bazargan's z-axis mathematics. If now three holograms are made, one of each model, using substantially the same recording geometry and process for each and with the models oriented with respect to the holographic recording material such that the dimension in which their scales vary is substantially perpendicular to said recording material, and if desired, they are offset along that axis by amounts corresponding to the z-axis offsets described above as being desirable to compensate for the physical and optical spacing between the films/filters upon their replay, then upon such replay of said films in a replay system utilizing the color aspect of the present invention the holographic images are subject to the longitudinal chromatic variation. The model which was recorded with an approximately 1.66% scale along the z-axis replays in substantially a first color with an approximately 1.0% z-axis scale, the model which was recorded with an approximately 1.0% z-axis replays in substantially a second color with an approximately 1.0% z-axis scale, and the model which was recorded with an approximately 0.71% scale along the z-axis replays in substantially a third color with an approximately 1.0% z-axis scale. Thus corresponding image points in each model approximately overlay in their combined holographic reconstruction and a grayscale holographic representation the original CAD model may be observed at a matched scale in all three dimensions of approximately 1%

Several DTM processes are available which are capable of producing objects in two or more colors or in shades of one or more color or with surface textures or finishes which appear visually different or which interact differently with laser light, and prior to printing each of the three differently-z-scaled objects described above, the CAD model or other three-dimensional computer data may be re-colored. So, for example, to the extent that the original data described a blue color for a particular point or region, that point or region can be printed in different shades of gray or different colors or with different surface textures or finishes so that when illuminated by the laser light used to record a hologram of it those points which were originally intended to be colored bright blue appear brighter under the laser's light (or brighter when viewed through a polarizing filter) than those points which were originally intended to be colored dark blue. This re-colorizing can be performed manually or automatically in software, or printed or otherwise fabricated objects can be painted or otherwise have their surface colors, shades, textures, or finishes modified, so that each of the objects when laser viewed as described portrays substantially the relative brightnesses intended for the color to be used in reconstructing the hologram of that object. Now when the holograms of these objects are made and viewed using the color aspect of our invention as described, a color holographic image of the original CAD model or other three-dimensional computer data can be viewed rather than the grayscale or single-color image which results when the individual objects are not so treated.

Alternatively, suitable objects for this process may be available without the described z-axis scaling, or with somewhat or substantially incorrect z-scalings. Such objects may still be recorded and replayed as described above by using an additional means of changing their apparent depth along the z-axis. For example, compressible objects may be physically shrunk or stretched along one dimension, either mechanically or, for example, by heat processing if for example they consist of a material or materials with anisotropic thermal properties. Or optical means may be used, such as magnifying or minifying lenses, mirrors, or other optical devices. Or such objects may be immersed in reasonably transparent liquids or gases (which may subsequently be frozen, gelled, or otherwise partially or fully solidified) such that their apparent depth along one dimension is altered.

It is common in CAD applications to use indicia such as different colors for different aspects of a design. For example, one color, shade, or pattern may be used for a glass part and another color, shade, or pattern may be used for a metal part. Or different such representations may be used to indicate differences in finish or tolerancing. In any case, such indicia may be color coded in a hologram produced in accordance with the present invention, either with the same colors as would otherwise be used in the source CAD system or with a different choice of colors. Further, if two parts of a CAD data set (or of other data sets) are recorded on different holograms in color and are viewed in a display device or arrangement which permits the translation and/or rotation of one hologram with respect to the other, then where the holograms are seen to overlap their colors blend additively and volume pileup (described below) increases the brightness. For example, mechanical interferences between two parts can be detected by noting such areas of blended color or increased brightness when such holograms are adjusted to bring the images of their respective parts in to substantially their intended relative positions. Similarly, an actual part (for example a mechanical, mineral, or organic part, found, selected, or fabricated for this or other purposes) can be inserted into the replay volume of a hologram so that it occupies a specific region of the holographic volume and hence blocks light within that region and by such means a comparison may be made between the actual part and, for example, its representation within the hologram or the representation of other parts or features within the hologram. As a non-CAD example, holograms may be use to display rare or valuable works of art or culture, and further a hologram of a complete or restored artistic or architectural work can be replayed within the volume occupied by the actual incomplete or damaged art work or building (or a scale model thereof) so that, for example, the missing arms of the Venus de Milo [attrib. to Alexandros of Antioch] may be restored. As a further example, for education or training purposes, a partial mechanism or a damaged or unfinished part may be inserted into the replay volume of a hologram, with the visible parts of the hologram demonstrating or teaching via static or dynamic content how controls or additional parts are intended to be added or adjusted to complete or prepare the mechanism for use or how finishing processes are to be performed.

In certain embodiments, in the color hologram methods and examples described above, the component holograms may not be adequately aligned in six degrees of spatial freedom. If, for example, inadequate alignment is achieved for a blue hologram such that it is rotated and/or translated away from its preferred location upon replay, then all the blue content in the observed holographic image is similarly rotated and/or translated (though the precise extent of said rotation and/or translation in the image may not in general exactly match the physical rotation and/or translation of the component hologram because of the z-axis scaling and potentially other optical aberrations and distortions). In this example, the rotation and/or translation of the blue content of the final image is visible as a general miscoloring and as generally incorrect intensities of every point or region in the image which had or now has blue content, and in particular a blue ghost image is generally visible towards one or more sides (such as the left side or front side) of the image with an approximately corresponding region on generally the opposite side or sides in which the complete or partial absence of blue is perceived as a ghost of an optically complementary color. The present inventors have determined that small amounts of such misregistration may be visually unnoticeable or tolerable, especially for images in which this behavior has been anticipated and allowed for, for example by a judicious re-coloring or de-coloring of the edges of an imaged object or scene, or for images in which this behavior appears natural or aesthetically or artistically desirable. In general however such misregistration should be minimized or eliminated and this can be achieved, for example, by a mechanical or optical means which provides a rotation and/or translation of one or more of the component holograms so as to bring its replayed image back into adequate registration. For example, an individual component hologram may be slid in its plane or twisted or displaced out of its plane during assembly. If for whatever reason a misregistration is predictable, such as, for example, if the discrete or approximate nature of points and coordinates in computer data does not permit an adequately precise registration to be achieved otherwise, then an optically substantially corresponding but opposite misregistration can be deliberately introduced in the component hologram during its recording. Thus adequate registration may be achieved optically or mechanically and either by design or by subsequent adjustment. Such adjustments can be guided visually by an observer of the composite color image, or fully or partially automated by for example machine-vision equipment such as for example a camera and an image processing system. To avoid or minimize such registration adjustments, the component films may be manufactured with and/or using or incorporating mechanical registration means such as registration pins and surfaces. To simplify or speed any such registration adjustments, or to indicate or determine the degree to which any such adjustment is desirable, if at all, additional points, marks, or structures may be included in or adjacent to the object or data recorded in any two or more of the component holograms, such points, marks, or structures acting as fiducials to visually or optically reveal the approximate extent, nature, and degree of misalignment.

The multiple-slice hologram recording method of Hart used in our demonstration example typically results in holograms with discrete gaps between each slice, though this effect can be reduced or eliminated if the diffuse image recorded in this method has itself a depth along its axis of translation, such as for example by using a volume of diffusing material rather than an essentially two-dimensional diffuser. Such gaps may be visually distracting or unpleasing or otherwise undesirable in the component hologram or in the color holographic image formed by the color aspect of the present invention. The occlusion aspect of the present invention, as described below, can be used to reduce or eliminate such gaps. However, the present inventors have determined that in the absence of sufficient occlusion the visibility of such gaps depends upon, among other variables, the number and distribution of slices, the z-discrimination ability of the observer, and the z-resolution achieved in the replayed holographic image which in particular is generally increased as the bandwidth of the replaying light is reduced so that for example in the present invention the z-resolution and hence the visibility of inter-slice gaps is increased if narrow-bandwidth laser sources are used rather than broader bandwidth LED sources or broadband filtered white light.

Since generally it is desirable for other reasons to retain high z-resolution and hence sharpness, and is thus desirable to use narrower bandwidth replay sources such as LEDs or in particular lasers, it is generally desirable to reduce or eliminate the visibility of such inter-slice gaps. In addition to or instead of occlusion, one method the present inventors have used to achieve this is to reduce the actual gap between slices by increasing the number of slices used. Similarly, the location at which an inter-slice gap occurs may beneficially be adjusted on a slice by slice basis so that, for example, slices are spaced closer together where the visibility of their inter-slice gaps is predicted or observed to be greater, for example on areas or in regions of the image which are comparatively smooth, uniform, or un-textured. Further, if the z-axis longitudinal color correction of the present invention is in practice imperfect, as it generally is, their may be regions within the final holographic image where the correction is worse and hence inter-slice gaps are less visible and hence coarser slicing may be used in such regions. In particular, if the reconstructing source or sources has or appears to have a finite extent (as is generally the case, especially for non-laser sources) rather than appearing to originate from an effectively infinitesimal point source, then the resolution of the reconstructed holographic image falls off in approximate proportion to the distance of image points from the holographic film which replays them, so that in effect the hologram is or appears to be sharper and more contrasty (and is, or at least often is described by observers as looking, brighter or otherwise better) closer to the replay film and hence more closely spaced slices may be used advantageously for image regions and volumes which appear to be or are closer to the component film or films. However, it may be advantageous to reduce the total number of slices, or to avoid locating slices in certain positions, for example to reduce the cost and time of hologram production, in which case a visually and economically satisfactory balance should be sought.

These and other effects and techniques can be used to reduce (or if so desired to enhance) the number, visibility, or visual importance of these inter-slice gaps, and these effects and techniques can beneficially be combined with each other. For example, the chosen position of slices in each of the component holograms may be selected so that, after allowing for the z-axis scaling effect and any z-axis offsets, the slices of one or more color are positioned upon replay between the slices of one or more other colors. As another example, slices may be positioned or repositioned to reduce undesirable visible effects in specific regions or volumes of the holographic image where they would otherwise be more visible or more visually significant. Such repositioning may be achieved by manual adjustment of slice positions during hologram recording or by manual adjustment of the computer data or processing which would otherwise determine the position of slices or by automatic or manually-guided processes which use, for example, edge, texture, or thickness determination to select where within the image the slices may most advantageously be positioned.

Figure 10C:
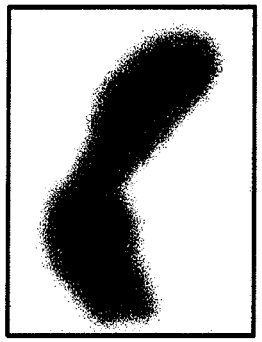
Figure 10B:
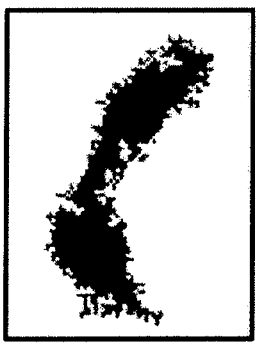
Figure 10A:
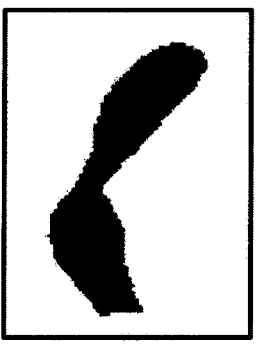

Further, the precise shape and size of recorded slice images, or of recorded objects if the DTM approach is used, may be adjusted to optimize the appearance of the composite holographic image. For example, the edges of regions of an image to be recorded in an individual slice (FIG. 10A) may be "feathered" (FIG. 10B), softened/diffused, (FIG. 10C), or "grown" or extended (FIG. 10D) so that upon replay in conjunction with the other slices in this and the other component holograms the visual undesirable effects of slicing are reduced (or if so desired enhanced). The present inventors have observed, for example, that if lit image areas in each slice are grown by a suitable amount then inter-slice gaps become visible as an apparent or actual overlapping of slices in which the light from two of more slices partially or completely adds to give an increased brightness in said overlap region, and this increased brightness, which can be quite a subtle visual effect if several slices contribute light to it, is generally less noticeable and less visually disturbing or distracting that the dark gaps which otherwise appear between slices, especially when the hologram is observed from an off-axis position. In either case, the dark gaps or the regions of enhanced brightness appear to move about the replayed holographic image as the observer's viewpoint changes, widening and narrowing as the angle at which the observer observes them changes, and since most observers have and use two eyes there is a stereoscopic disparity in the noticeability of, and the visual disturbance or distraction caused by, such gaps or enhancements.

Figure 10E:
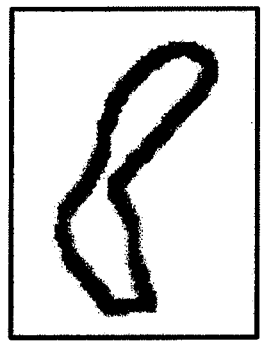
Figure 10D:
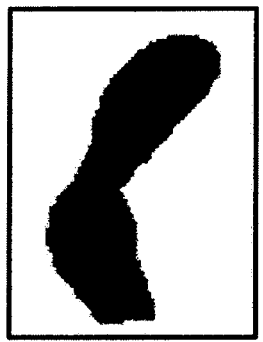

The steps of edge growing, feathering, diffusion, etc may be achieved by optical effects such as selective or overall defocus or diffusion, or may be practiced as a two-dimensional procedure applied automatically or with manual guidance in, for example, an image processing or manipulating program such as ImageJ or After Effects [Adobe Systems Inc., San Jose, Calif.], by, for example, averaging adjacent pairs of images. The three-dimensional analogy of these two dimensional image manipulations may be achieved in programs such as ImageJ which can process a volume or three-dimensional array of data. The inter-slice variation in image content in the z-axis may be calculated or otherwise determined and used to achieve a shelling or hollowing out of volumes within the data, object, or scene represented by the original slices (FIG. 10E). And the thickness of the shell so retained may be adaptively adjusted, manually or automatically, to reduce (or if so desired to enhance) the inter-slice effects. Generally, a thicker shell also results in more volume pileup (described below) along and around the edges and surfaces of objects in the scene and hence generally increases the brightness, sharpness, and contrast of said edges and surfaces in the resulting hologram. Further, by increasing the overlap, a thicker shell generally also reduces the number of slices desired to maintain an appearance of smoothness and continuity, and the use of fewer slices generally also results in brighter, more contrasty holograms.

Where three-dimensional data is synthesized or is manipulable in the form of CAD or surface or solid modeling, such as in rendering programs such as Maya [Autodesk Inc., San Rafael, Calif.] or modeling programs such as SolidWorks [Dassault Systèmes SolidWorks Corp., Concord, Mass.], it is possible to obtain suitable manipulations of the underlying models or of their representations or renderings to achieve the desired effects to reduce (or if so desired to enhance) slice and inter-slice gap visibility, so, for example, the surface of a Maya model may be roughened or distended in a suitable fashion and/or direction, or it may be rendered with soft surfaces. In such cases, or in any circumstance where the desired holographic image is represented by a model, mathematical representation, or data set which is not itself in the form of, or simply transformable in to the form of, a set of two-dimensional images as envisaged by Hart, it is desirable to have a method to obtain a "slicing" or "slabbing" into said two-dimensional images or into an intermediate representation which is simply transformable in to the form of a set of two-dimensional images as envisaged by Hart.

Figure 11A:
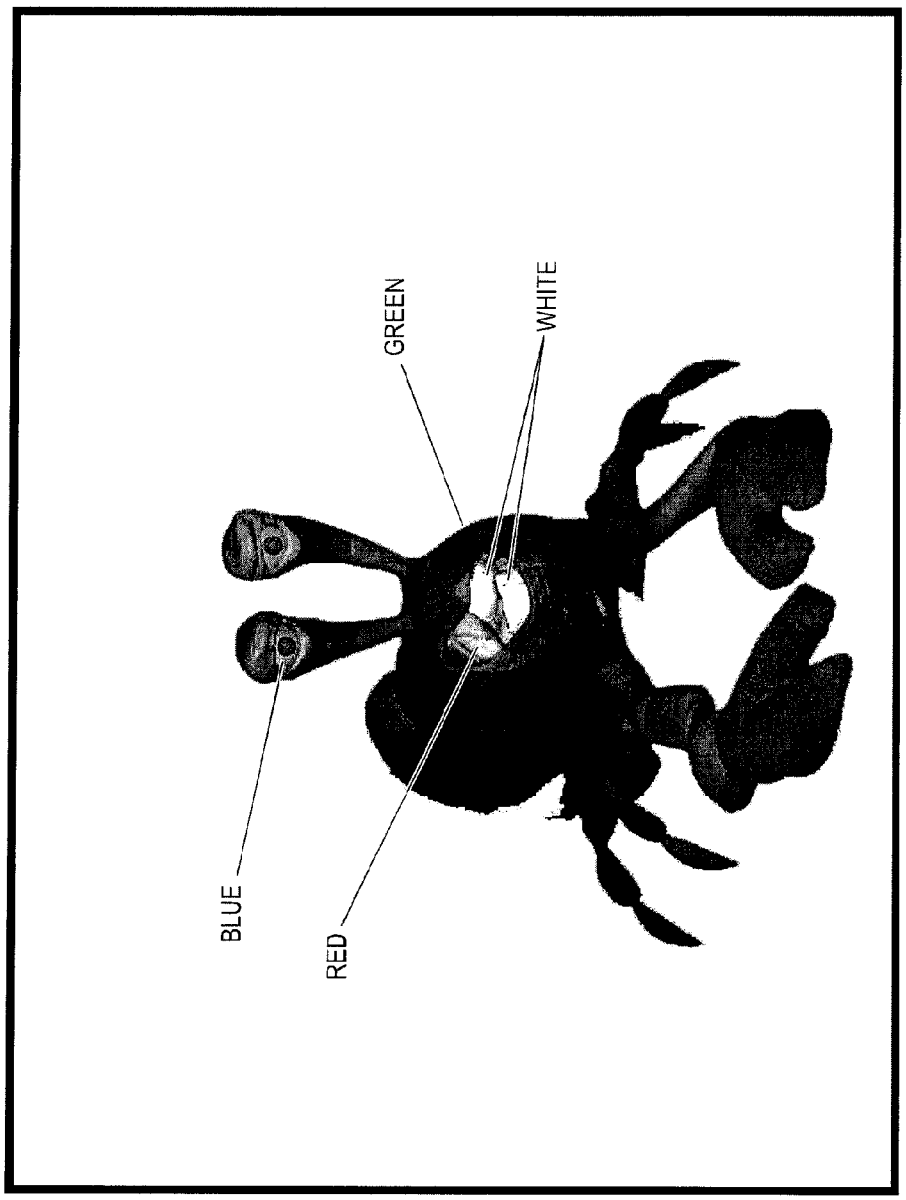
Figure 11B:
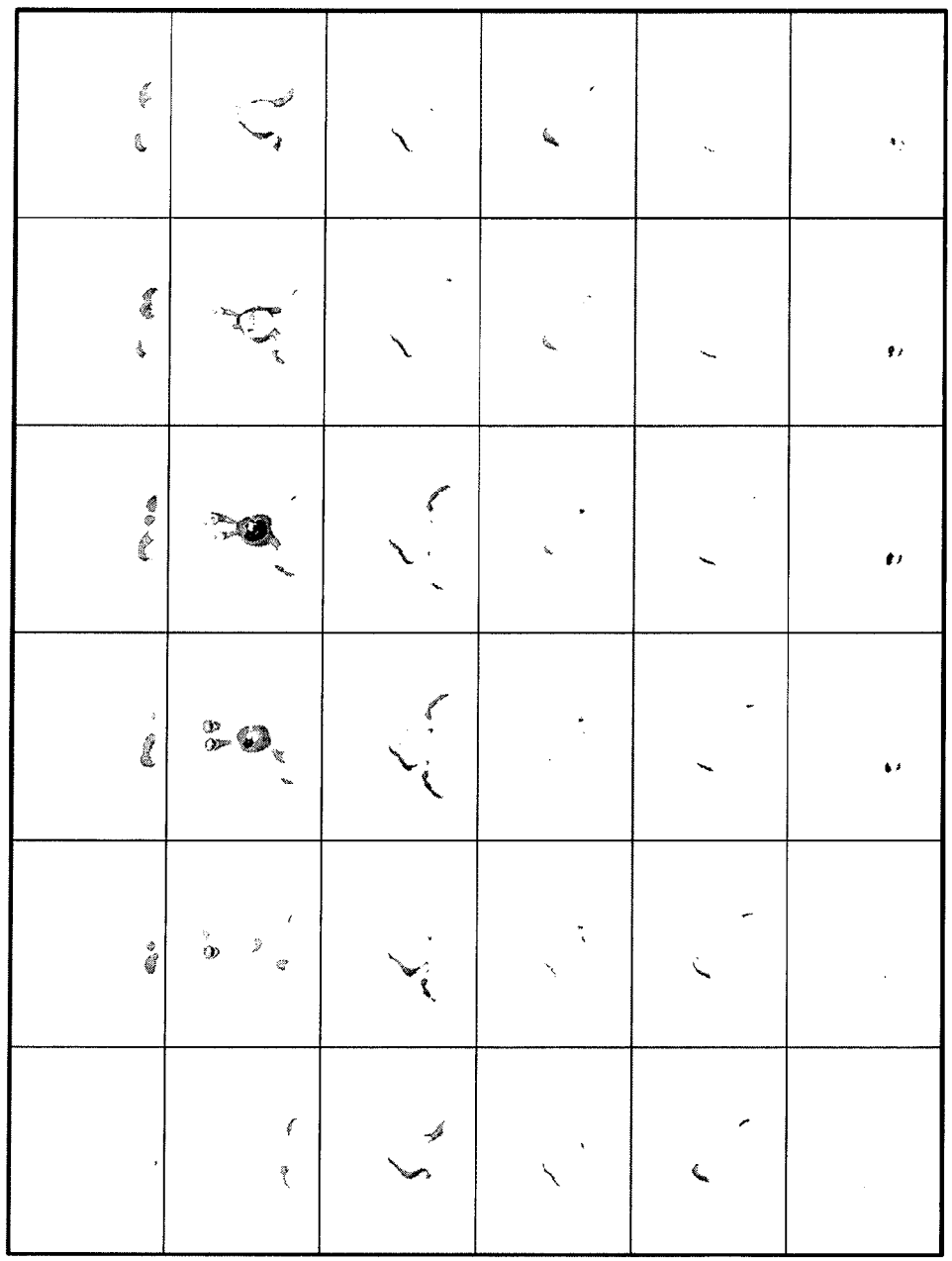
Figure 11C:
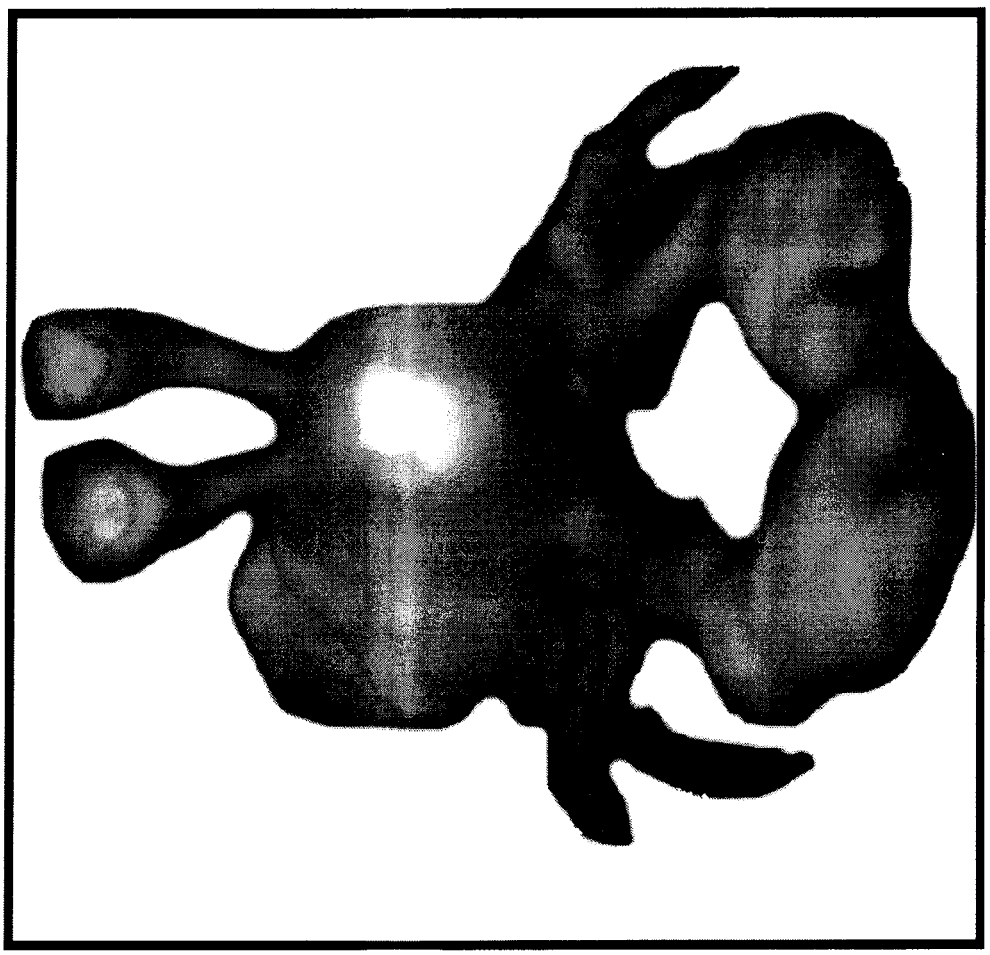

A suitable method for such slicing is to model in the program a slab or wall of finite thickness which can be rendered within the program along with the intended model, data, or other three-dimensional information or description, and to use the program's capabilities, or suitable add ins or services, to render the common sub-volume of three-dimensional space occupied by the slab or wall and by the part or parts of the model, data, or other three-dimensional information or description that is or are represented as being within substantially the same sub-volume. This may be thought of, and in some cases may be implemented as, a constructive solid geometry (CSG) intersection operation. This operation, whether via a CSG process or otherwise implemented, is repeated for a set of slab or wall positions that may be thought of as sweeping out the entire three-dimensional volume, or at least selected parts of the entire three-dimensional volume which are occupied in part or in full by the model, data, or other three-dimensional information or description. Each such intersection operation results in a rendering, or a renderable sub-volume, representative of a sub-volume of the model, data, or other three-dimensional information or description. This may be thought of as analogous to a process of Computer Tomography in which a real object, such as the body of a patient, is sliced into data images by being intersected with and moved through a rotating beam, fan, or ray of x-rays which in effect sample the object's spatially varying influence on the x-rays (and hence, approximately, the object's density distribution). Another implementation of slabbing yields the desired effect using a ramped renderer which renders a series of adjacent or somewhat overlapping soft-edged planar sub-volumes of the scene or object: this has the advantage of providing the slabbing functionality and achieving a controllable degree of edge softening, and for example the present inventors have implemented this method as a short (approximately 20 lines of code) MEL (Maya Embedded Language) script. For a shelled object, which in a program such as Maya or SolidWorks can be generated by, for example, subtracting or deleting or otherwise removing a somewhat shrunken version of the original model, data, or other three-dimensional information or description, this slab-bing process naturally results in sliced images which can have the desired slice-to-slice overlap described above. FIG. 11A illustrates an exemplary cartoon crab "character" modeled and rendered in Maya, and FIG. 11B illustrates an exemplary set of green slices derived from this model using the ramped renderer technique. FIG. 11C shows the character reconstructed as a color hologram.

An alternative approach to this method of slabbing is to use front and back clip planes, a common feature in programs such as Maya, which are software adjustments which direct the program to render only those elements which are found between two defined planes. However the detailed implementation of this feature in specific programs, including, in the present inventors' experience, at least certain versions of Maya, may make it unsuitable for the purpose of slabbing as described herein for at least two reasons. Firstly, some implementations provide a ragged treatment of elements which are found partly but not wholly between the two planes: such elements may be excluded from rendering or may be included without clipping at the clip planes. Secondly, the rendering of the clip planes (or of one of them) may be unsuitable, for example if their use allows the inside of a clipped object to be viewed. A custom or semi-custom implementation of the clip-planes concept may be used to overcome such limitations, or the CSG method or ramped rendering described above may be preferred. In either case, or via any other method of slabbing, the shelling described above can be used to obtain the desired slice-to-slice overlap described above or this overlap can be achieved by causing the slabs so generated, whether defined by parallel front and back surfaces or by non-parallel front and back surfaces, to overlap partially in three dimensions so that, for example, the front and rear surfaces of slab n lie at approximately the centers of respectively slab n−1 and slab n+1.

As an alternative to computational slabbing or slicing to obtain substantially parallel flat slices (or to obtaining substantially parallel planar slices via a scanning means such as a computed tomography scan or a physical slicing means such as the collection of a series of images each one recording a microtomed or confocally scanned section of a sample), it is also possible to obtain computationally (or via a suitable scanner or physical or optical sectioning) a series of images which are not substantially parallel and/or not substantially flat. Such images may still be used to make holograms for the present invention following substantially the methods of Hart if either they are first computationally resampled as substantially parallel flat slices or (in the case of substantially non-planar slices) the planar (flat) diffusion screen of Hart is replaced with a not-flat diffusion screen in substantially the same shape as the not-flat slices and/or (in the case of substantially non-parallel slices) the track or motion of the diffusion screen in Hart is modified to produce a series of corresponding non-parallel screen positions which said positions may even cause the resulting sequence of screen positions to intersect at one or more points or along one or more lines or planes.

For example, to record a hologram of a cylindrical object (such as a soda can) in accordance with Hart, a computer model of the can (or the can itself) would be sliced into numerous images each representing one parallel cross-section of the can, each of which would be recorded holographically in series as portrayed on Hart's planar diffusion screen. Alternatively, a diffusion screen may be used which is indented in the shape of the front of the can (much as though such a can had been pushed into a softened plastic sheet diffuser which upon hardening retains the imprinted shape of the can) and a suitably warped image of the front surface of the can may be projected upon this can-shaped diffuser such that a single holographic recording would suffice to record holographically both the shape ("geometry") of the can (i.e., the geometry of the can-shaped screen) and the can's surface detail (its "photometry") (i.e., the image of the can's surface). A hologram so produced would generally not use multiple holographic exposures and would generally not show the effects of slice overlap. A hologram so produced can in effect be shelled for greater brightness using a thick diffusion screen as described above or by using two or more nesting screens wherein, for example, the second such screen has a smaller indent upon which is projected a smaller image. This process is particularly advantageous for recording holograms in the context of the present invention of objects which share one of a small set of shapes and sizes, such as for example different brands of soda can or cereal packet, so that a small set of standard screens can be retained and used as necessary.

As another example, planar but non-parallel slices are commonly collected in a fan-like fashion by medical ultrasound scanners, and said fan-disposed images may be printed holographically in the context of the present invention using a diffusion screen which can itself be positioned in a similar fan-like series of positions. In the more general case, a planar or non-planar diffusion screen may be affixed to or otherwise positioned by a general positioning device such as a robot arm or a hexapod mount so that said screen may be positioned in space with up to six degrees of spatial freedom, and such a screen may advantageously be illuminated by imagery in the manner described by Hart using light from a pulsed laser routed via fiber-optics.

Prior to or after slicing/slabbing it is advantageous to perform a back-face culling operation to remove those bright areas, if any, of each resulting two-dimensional image which would otherwise in the resulting hologram fall behind other bright areas in nearer two-dimensional images recorded in the hologram. This is not generally desired for the clinical data anticipated in Hart (and is not described in Hart); a ghostly appearance (in which inner objects and details and the rear parts of objects and details may be seen through outer and front objects and details) is generally advantageous for radiological data. For other kinds of image content this may not be so, and hence this removal of bright rear areas may be advantageous in preventing such ghostliness and the effects of volume pileup described below. In general this back-face culling is not a process which can be performed perfectly because what is viewed by an observer as being behind something else depends on the observer's viewpoint into the hologram, and changes as the observer (and/or the content in the hologram in the case of a holographic movie) moves and is in any case generally different for each eye in stereoscopic vision. However in practice a visually satisfactory result may generally be obtained by eliminating rear areas that would otherwise be seen by an observer observing monoscopically down the central axis of the holographic image (the z-axis), and this may be achieved using a simple painters' algorithm, which, for the demonstration holograms made by the present inventors was implemented as a macro in ImageJ supplemented by a small amount of manual adjustment (painting in or out seemingly undesirable gaps or bright areas by hand, guided by Simgram images (simulations of such holograms, as described below) also implemented as an ImageJ macro as per Dalton as described below. Examples of this may be seen in FIG. 10B in slices where, for example, the crab's body would be visible through its legs.

Maya and SolidWorks (and other similar programs and development environments) both contain and support tools and methods for rendering and modeling, either directly or via available plugins or additional complementary programs or services. The names "Maya" and "SolidWorks" used herein should not be understood to imply the exclusive use of these or other similar or specific tools and methods and are not an endorsement or recommendation, though Maya was used for some of the demonstrations of the inventions described herein, including the ramped-renderer style of slabbing via a custom script.

It is desirable to provide or have access to a previewing environment in which operations such as the slabbing, back-face culling, and feathering described above can be simulated or executed with visual feedback to an operator, designer, or client desirous of a hologram such that said operator, designer, or client can control, steer, guide, or judge the effect upon the eventual hologram of executing the operation in different ways or with different control parameters. Alternatively, numerical metrics of quality may be defined such that they can be determined or estimated for any particular choice of algorithm or control parameter, and an optimization or search procedure can be executed automatically or with manual guidance to find a best, preferred, or satisfactory choice.

Ideally such a preview environment or metric-based optimization should be implemented within or as a plugin or service for Maya or SolidWorks or whatever other programs or development environments are convenient for, or familiar to, the operator, designer, or client so that they can be productive without excessive training or familiarization with new programs or development environments or features thereof.

Ideally such a preview environment or metric-based optimization should further incorporate all or most of the other holographic and optical effects described herein (including optionally occlusion) or otherwise determined to be present or likely or possible, such as, for example, the limited viewing angles of the component holograms, their limited or imperfect color rendering, the green mirror effect described above, colored ghosts and shadows and other artifacts predictably resulting from, likely to result from, or to the maximum extent possible or anticipated to arise from, misalignments of and inter-reflections between optical components, the bandwidth of the color reconstruction sources, ambient light sources, the slabbing process, other necessary or desired approximations to or modifications of representation of the subject of the hologram, errors, simplifications, or modifications in the z-axis scaling and offsetting calculations, wobbling or other motions, deliberate or otherwise, of any of the mechanical or optical components used for recording or reconstructing the holographic image, the limited angles subtended by the holographic image which results from its actual size and extent when compared with the size and extent of the space within which the observer can or may chose, be required, or be able to move within, including stereoscopic effects resulting from the different locations and performance characteristics of the observers' eyes, and any degree of holographic targeting as described in Hart2 [U.S. Pat. No. 6,441,930] which provides a process and apparatus for reducing or eliminating this particular effect. For example, the operator, designer, or client may be provided or equipped with stereoscopic viewing capabilities, such as for example, a stereoscopic LCD display such as the iZ3D [iZ3D, LLC, San Diego, Calif.], and their head and/or eye position may be tracked, known, or estimated using, for example, an ultrasonic tracker such as a UM-5 tracker [RuCap, Moscow, Russia].

A particular optical effect which can beneficially be incorporated in a preview environment or metric-based optimization is the way in which light from different slices in Hart's method combines visually, and a method and apparatus for so doing is provided by Dalton [U.S. Pat. Nos. 6,748,347 and 6,123,733] which describe the generation and use of "Simgram" images and movies which simulate the appearance of the kinds of hologram used in the present invention. Dalton also includes the effects of superblacking per Hart. This is particularly useful when shelling (as described herein) is used to effect slice-to-slice overlapping, to increase brightness, or for any other reason.

The present inventors have observed that holographic targeting as described in Hart2 is generally reduced or even eliminated by the combined effect of using more than one hologram film in the present invention, as is the case for other holographic and production artifacts such as dirt and physical damage to films, filters, and other optical components which, unless similarly present on the corresponding films, filters or components of another color, often only influence the content of a single color which said color may not even be generated by the region suffering such dirt or damage.

The present inventors have observed that holographic targeting as described in Hart2 is general stronger and more clearly visible for data where two or more slices overlap and hence especially so for thickly-shelled data in general. In practice the methods and apparatus of Hart2 can substantially eliminate even this degree of targeting: for example, the present inventors have determined that targeting can be made essentially invisible even in holograms of thick-shelled data, and even under laser illumination (where targeting is far more prominently visible than under broader-band illumination), if for slice spacings of, for example, approximately 2 mm in the z or depth axis, incremental screen translations in an x- or y-axis (axes substantially parallel to the plane of the diffusing screen in Hart2) of approximately 4 mm are made between slice exposures such that the screen returns to substantially its original x location only after a change of approximately 4 mm or more. An example of such a sequence would be z:x pairs (given in mm and relative to an arbitrary origin) following approximately the sequence 4:0, 2:8, 0:16, −2:−16, −4:−8, −6:0 for which any given x value only repeats after a change of z value of approximately 10 mm.

The preview environment or metric-based optimization should further incorporate or be supplemented by a set of design rules, which may be application-specific, to permit, encourage, and enable the operator, designer, and client to create a holographic image or images optimized for the intended usage. For example, a surgeon, radiologist, or researcher may be advised, guided, or compelled to render arterial blood flow in shades of red and venous blood flow in shades of blue. As another example, a geophysicist may be advised, guided, or compelled to render different rock types in commonly accepted and understood colors. As another example, an advertiser may be advised, guided, or compelled to avoid certain colors or shades, or to make compensating adjustments to the coloration, design, or placement of a logo, because otherwise they cannot be produced satisfactorily in the holographic image. As another example, an architect may be shown in simulation the appearance of a holographic image as it would appear with specific replay hardware (or an approximation thereof) in a given location or building under specified, typical, or known or anticipated lighting conditions, such as for example inside a hotel lobby or on a sunlit wall outside a cinema, or with the display device positioned behind a shop window and the holographic image partially or fully on the other side of said window, so that they may, for example, specify a suitable battery power supply or select display hardware including multiple laser sources for extra brightness, or design or select a shade or shades to be used to prevent strong lights in the surrounding environment from overwhelming the holographic image. As another example, a packaging or consumer-products designer may evaluate in simulation whether a specific hologram is too large or too small for its intended observer. As another example, an artist or interior designer may be shown in simulation the size of an image achievable with specific replay hardware so that they may chose to use multiple display devices in an arrayed or tiled or arbitrary combination to produce a larger overall image or to fill or otherwise use a display environment more fully or more effectively (for example by using a series of separate holograms to display each of the characters, symbols, or glyphs of a message, sign, or logo) or so that they may hide the holographic image or images or part or parts thereof from certain locations, positions, or zones within the display environment for aesthetic or artistic reasons or to create visual surprises or excitement on the part of the observer or to fully or partially prevent a certain observer or observers in certain locations from viewing all or part of the holographic image or images or of the display hardware, such as for example by concealing or buying the hardware or some part or parts of it within a wall, ceiling or floor, or an existing or additional housing such as a plinth, cabinet, or display wall or a product or its packaging or a fixture or fitting.

Further expanding this last example, and more generally whenever or wherever more than one hologram is used or a single hologram or hologram series is divided or activated in whole or in part or in parts, it may be desirable to synchronize or relate the operation of one or more hologram or parts of one or more hologram. For example, in a room with two or more holograms it may be desired to turn them on or off or vary their brightness or move them or activate or deactivate ancillary mechanisms or devices to hide them or to modify their appearance in predictable, predetermined, or random or pseudo-random or semi-random patterns or schemes either over time or in response to external triggers such as sound, light, temperature, or humidity or motion sensors which respond to, for example, the presence or location of an observer or observers, or the degree or character of ambient light or noise. For example, a hologram may appear to react to the presence of an observer as a result of a camera or motion tracker, switch, capacitive sensor, or microphone which detects the presence, proximity, orientation, or activity of said observer or of another target or of an action such as speech or a hand motion or head motion. As another example, an intermittent motion hologram (as described below) can be changed from one image to another in response to, for example, an external temperature sensor, and can thus in this example act as a visual thermometer showing a numeric or analog readout of the temperature accompanied by scenes ranging from a wintery landscape with snow to a pictorial representation of a summer heatwave. Since each such hologram is (or can be) fully three-dimensional, they can also be sequenced or controlled to illustrate a non-scalar phenomenon or measurement, such as, for example, the ambient magnetic field, with holographic content chosen to point with or otherwise represent both the magnitude and the direction of a measured parameter, in this case acting as a holographic compass or magnetometer. As another example, such a hologram series can be triggered by the detected presence or absence of an object in the volume of the holographic image, so that, for example, the holograms could show imagery representing the flow of data back and forth between a bank ATM and an NFC "cash card", the holograms projecting from the ATM into the vicinity of the card held by a bank customer and portraying, in effect, the flow of money (credit) from the customer's account into the card.

Such activation sensors or triggers may also be used to deactivate the same or other holograms or parts of holograms, for example when an observer is detected to have departed, and may also be used to trigger and control the state or outputs of other devices that are desired to behave in conjunction with the hologram or holograms, such as, for example, a sound track or sound effects, other visual displays or indicators, room lighting or temperature or humidity, or the release or removal of certain smells such as, for example, a scent matching or suiting the subject of the holographic image such as a perfume or fresh-baked bread. In a further example, a haptic mechanism may be used to provide force feedback acting against part or parts of an observer's body, so that for example the visual appearances of three different cloth samples may be replayed, one in each color all together, or in combinations such as one color at a time, and with haptic feedback an observer who touches the holographic image feels the appropriate texture of the corresponding cloth type.

In addition to or in combination with the use of multiple display devices in an arrayed or tiled or arbitrary combination to produce a larger overall image or to fill or otherwise use a display environment more fully or more effectively as described above, such multiple devices can also be used to provide a wider viewing angle, by, for example, arranging two or more displays facing in somewhat or substantially different directions. This may comprise, for example, a polyhedral arrangement, regular or irregular and consisting of substantially similar units or a collection of dissimilar units such as a surface filling or tiling arrangement of larger and smaller polygonal displays. Such a polyhedral arrangement may approximate a cylindrical or semi-cylindrical or spherical or semi-spherical display surface which is convex or concave to the observer so that, for example, it may partially or fully enclose an observer. Similarly, images or partial images from two or more hologram devices may be combined optically, by, for example, a beam-splitter, to produce a larger or more complex hologram: for example, using the motion aspect of the present invention, two short motion sequences may be combined as one longer sequence by viewing the two motion displays (as described below) in sequence through a beam-splitter so that they appear as a single hologram of greater duration. As another example, a hologram of a substantially unchanging part or scene can be shown using one such hologram device, and one of an interchangeable set of other holograms can be superimposed via a beam-splitter or other opto-mechanical means on the unchanging part or scene so that, for example, a "stage" (within which a "play" is seen by the observer) can be displayed with one device, and the beam-splitter can superimpose upon part or all of this holographic image a second holographic image in which a character is seen to move and "act" upon the stage to convey the "action" of the play, and by interchanging holograms in such an arrangement a more lengthy or complex "story" may be told.

In general, design and use of truly three-dimensional holograms shares some features with theater design, sculpture, architecture, stereoscopic cinema and video, and the layout of commercial and other spaces, in that there can be more than one observer and the observer or observers can generally move to some extent in three dimensions so that it may be wise to pre-visualize and design for different observers of different heights following different paths in space and time.

Design rules to parameterize and help simulate these and other variations may be provided in verbal or graphical form, via education or training of operators, designers, clients and other interested persons, or may be incorporated as constraints, rules, or guidelines within a preview environment or metric-based optimization. Such rules may include, for example, that it may be undesirable for certain subjects to include shadows (including self-shadowing) or enclosing or offsetting surfaces or environments because they can provide a visual interruption, disruption, or artifact to a certain observer or observers from some or all positions or under certain or arbitrary viewing conditions. For example, frame violation or "window violation", as stereographers call it when an object becomes partly invisible at the edge or edges of a limited stereoscopic viewing region, is generally inadvisable, but may be exploited for aesthetic or artistic effects.

Following, or incorporated with, or instead of or in addition to a preview environment or metric-based optimization, it may also be found advantageous to provide a production environment to assist an operator, or a defined or exploratory process to convert the design or selection of the desired holographic image or images into specific data, instructions, and settings for the hologram production and replay systems and apparatus. This production environment can be used, for example, to actually slab, cull, and feather a model or design from Maya or SolidWorks, such operations having perhaps been only partially or imperfectly simulated or executed in the preview environment or metric-based optimization. Other necessary or desirable conversions can also be accomplished in this production environment (including the calculations for any desired occlusion), even if perfectly simulated beforehand, including such steps as superblacking, filtering out of isolated distracting pixels, elements, or sub parts of a data set, color correction and balancing, and two-dimensional and three-dimensional compositing, blending, or morphing of different designs or data, including for example stored representations of graphical elements such as logos or scene objects which may be repeated from one hologram to another and which may conveniently be archived, cached, indexed, and promoted to clients. The preview and production environments may be very similar or even identical, or they may have significant differences, such as, for example, in that the preview environment may render using linear perspective to more faithfully simulate the appearance and use of a three-dimensional hologram, whereas the production environment may use orthographic rendering because the resulting hologram, as a truly three-dimensional distribution of light in space, is perceived in natural perspective if created using an orthographic geometry.

The designs, selections, modifications, and renderings performed in Maya or SolidWorks need not be constrained to polygons or other kinds of planar surfaces. Volumetric effects such as fogs may be included and rendered for holographic display, as may abstract data, mathematics, observations, measurements, or computations which may be spatialized or colorized for display even if they do not contain three dimensional or color components per se. Surface and near-surface effects such as specularity and sub-surface scattering may also be included and rendered for holographic display. Effects, features, and details which cannot conveniently or efficiently be included in renderings prior to their slicing/slabbing can nevertheless be reintroduced into the resulting slices as 2D effects using typical post-production tools and software such as, for example, Adobe After Effects. Depth may be obtained from point-cloud data or measurements or may be derived from stereoscopic imagery or via motion flow or image-to-image variations as a camera or simulated camera pans past or moves around or through a scene or as the scene itself changes or evolves over time. Even simple vector graphics may be suitable or advantageous for some applications. The present inventors have observed that when one vector is seen to pass in front or behind of another vector in such a hologram viewed monoscopically, the light from the two vectors adds to produce a somewhat or significantly brighter point or region. When viewed stereoscopically, each eye may see these enhanced points or regions at different locations, and this can act as a useful additional depth-cue to indicate to the observer the relative locations of the vectors within the holographic space and in relation to said observer. Dalton has termed this "volume pileup" by analogy with the term "vector pileup" which has been used to describe an analogous effect in computer graphics displays where using certain technologies and algorithms the brightness of intersecting or overlapping vectors is seen to be enhanced. Such volume pileup is an underlying cause of the banding seen when the edges of slices overlap in holograms per Hart as described above, and is the primary effect simulated by Dalton's Simgram images.

Motion

Summary: Embodiments include achieving moving holographic imagery by the angular multiplexing of a collection of "frames" each comprising a single hologram.

The replay of holograms is generally an angle dependent process, with Bragg selectivity preventing efficient reconstruction if the replay reference beam is incident at too great or too small an angle. This angular selectivity may be exploited to permit two or more recorded holograms to be replayed independently from one recording medium.

For example, if a suitable unexposed holographic recording material is subject to a first recording exposure using a reference beam incident upon it at a certain angle R and an object beam incident upon it at angle O1, next is rotated by approximately 90° in its own plane, and next is subject to a second recording exposure using again the same reference beam incident upon it at substantially angle R and a different object beam incident upon it at angle O2 (where angle O2 may be substantially the same as angle O1), and next is processed (if the use of said material includes processing to develop latent holographic images recorded during these two exposures), then two sets of holographic fringes can be recorded within or upon the recording material, and, if said recording material is thick enough, Bragg selectivity will ensure that if held in substantially the first recording position and re-exposed to a reference beam at substantially angle R (or at a suitably different angle if in processing the thickness of the recording material has increased or decreased significantly) the first recorded object beam replays and the second object beam does not replay, or at least replays substantially fainter than the replay of the first object beam, and if the material is now rotated by approximately 90° in its own plane and held in substantially the second recording position and re-exposed to a reference beam at substantially angle R (or at a suitably different angle if in processing the thickness of the recording material has increased or decreased significantly) the second recorded object beam replays and the first object beam does not replay, or at least replays substantially fainter than the replay of the second object beam.

Holographers generally use the terms "orthoscopic" and "pseudoscopic" to refer respectively to images which appear normal and images which appear to be inside out. Such pseudoscopic images may generally be created by inverting a recorded hologram. So, for example, the hologram copied in the copy geometry of Hart is a pseudoscopic reconstruction of the originally-recorded screen-positions. Most display holograms are replayed in an orthoscopic mode because it is generally highly undesirable to see objects inside-out. For the multiple-slice holograms of the present invention the front and back of the "object" can be interchanged by interchanging the positions of the recording screen. This achieves, in effect, a reversal of the z-axis of the recorded object or scene, permitting the reversal of the normal relationship of inside to outside for orthoscopic and pseudoscopic views.

In the context of the present invention, the holographic "window" (i.e., the recorded edge of the master hologram as seen in the copy hologram) may advantageously be positioned closer to the observer than is the holographic content they are observing so that the window's presence is less noticeable to the observer because the observer's eyes are focused deeper into the holographic space and because in this situation the window is further from the replay film and hence is less sharply replayed. Because the present invention's multiple-slice recording permits the reversal of the normal relationship of inside to outside for orthoscopic and pseudoscopic views (as described above), the holographic window can be positioned closer to the observer without replaying the object or scene "inside-out".

Figure 12:
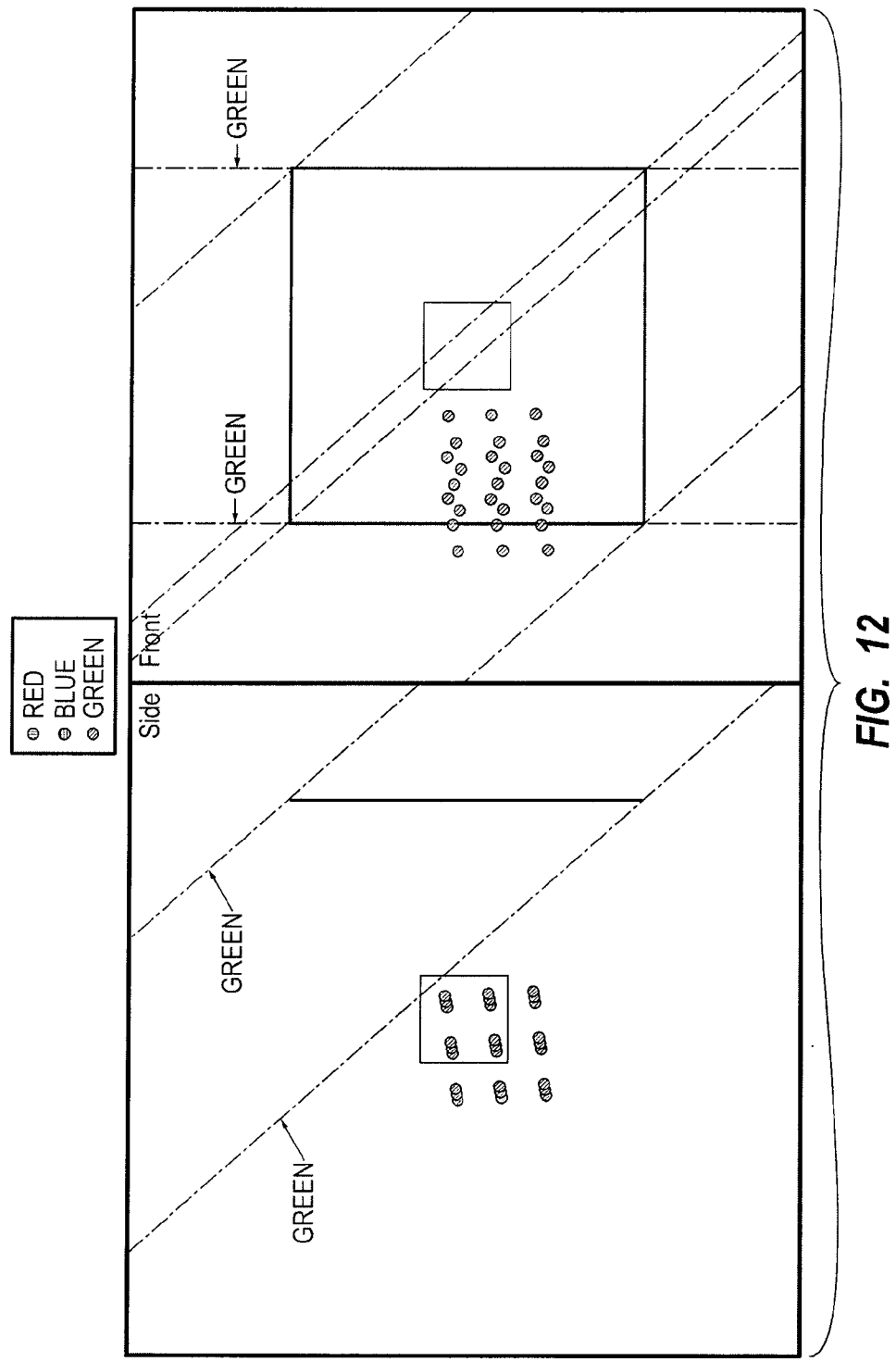

Two further effects can work together with Bragg selectivity to further control the visibility of holographic content recorded and replayed at adjacent angular positions. Firstly, the distortion mathematics of Bazargan/Champagne show that as the replay material is rotated the holographic image it replays rapidly distorts and swings-out away from the observer (FIG. 12), a combination of effects referred to herein as "swing-out". Secondly, the holographic window may be sized and positioned to provide a rapid termination of visibility as the recording angle changes. For example, a circular or elliptical window may be created, either by recording the master hologram on a circular or elliptical film, or by masking it to a circular or elliptical shape upon replay for copying. Such a circular or elliptical window can cut-off visibility upon rotation more rapidly than a square or rectangular window. Further, with this window closer to the observer than is the holographic content they are observing (as described above) the window is positioned further from the replay film than it otherwise would be and hence it distorts and swings-out more rapidly upon rotation, further helping to isolate frames.

This procedure (sequentially recording a series of holograms within one recording material using angular rotation between exposures, and using Bragg selectivity, swing-out, and the holographic window to allow the subsequent replay of any one of the recorded holograms essentially in isolation without substantial visibility of any of the other so recorded holograms) may be repeated with another approximately 90° of rotation for a third recording exposure, and again rotating a further approximately 90° for a fourth recording exposure. If a fifth exposure is attempted at a further approximately 90° of rotation the system would be returned to substantially its original position, and hence any such fifth exposure would be recorded in substantially the same geometry as was the first exposure and hence would not be uniquely replayed during subsequent replay.

If a hologram prepared with four exposures as described above at approximately 90° separations is gradually rotated while exposed to a suitable replay reference beam as described above, then the four recorded holograms replay and are visible to an observer in series as the recording material reaches approximately the 0°, 90°, 180°, and 270° angles in its rotation. At rotations between these four values one or two holograms are visible, but are geometrically distorted and generally fainter than the correctly reconstructed holograms at the approximately 0°, 90°, 180°, and 270° angles. Typically, the greater the thickness of the recording material the greater is its Bragg selectivity, so that for sufficiently thick recording materials no holographic image is replayed or visible at the intermediate rotation angles of, for example, approximately 45°, 135°, 225°, and 315°. For an even thicker material, generally there is a range of angles about these approximately 45°, 135°, 225°, and 315° rotation values for which substantially no reconstruction is visible.

Figure 4C:
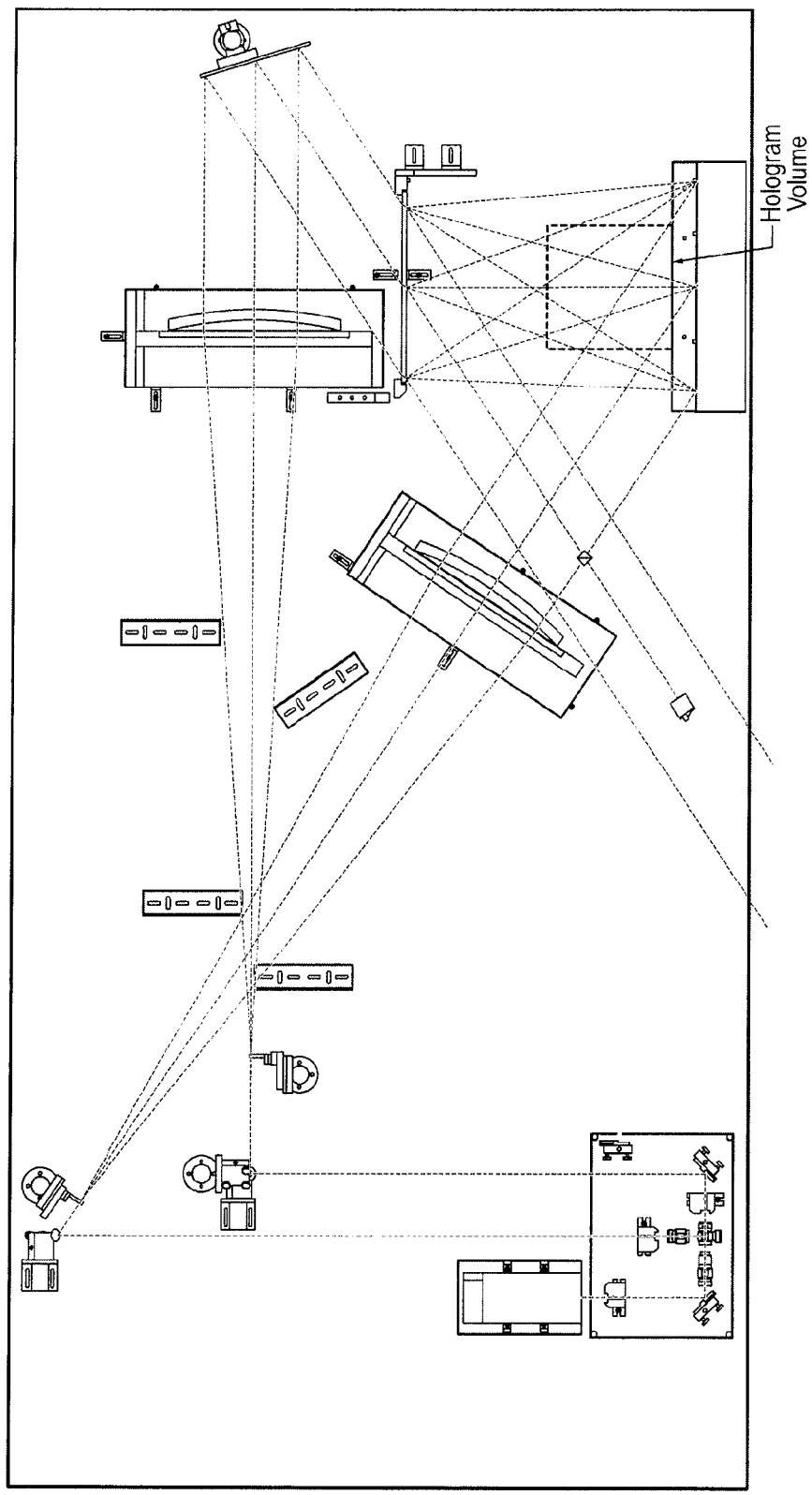
Figure 5A:
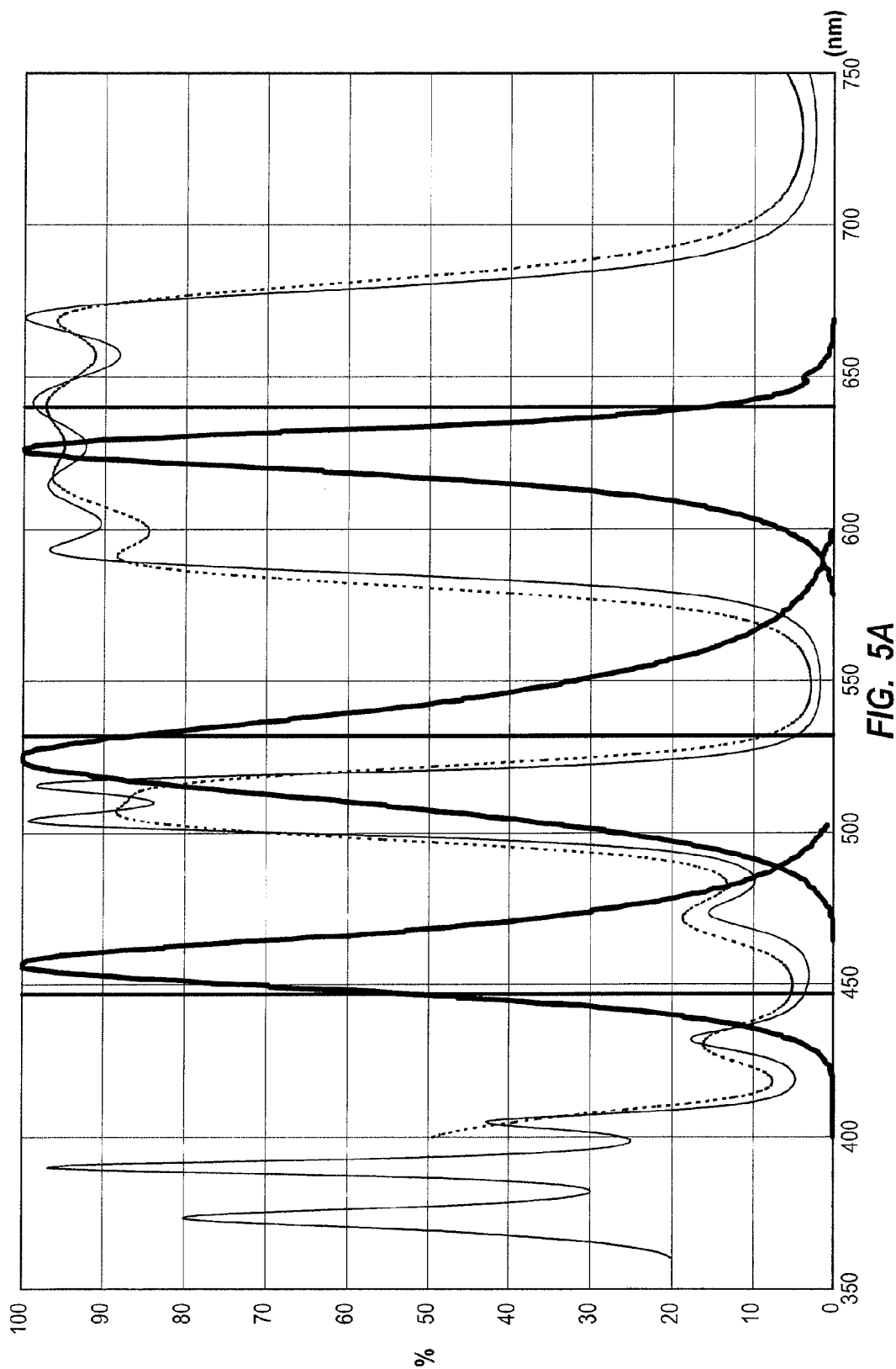
Figure 5B:
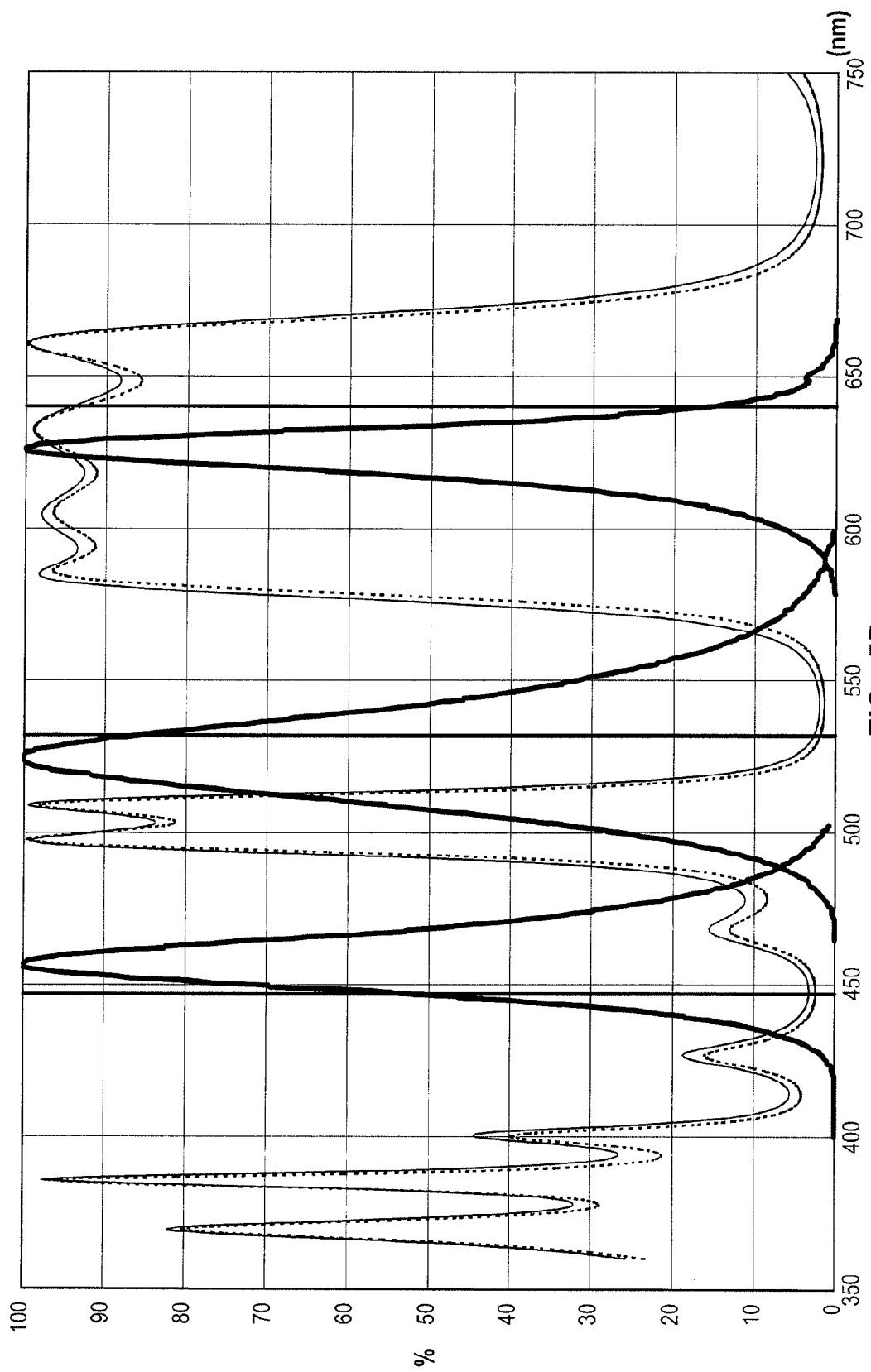
Figure 5C:
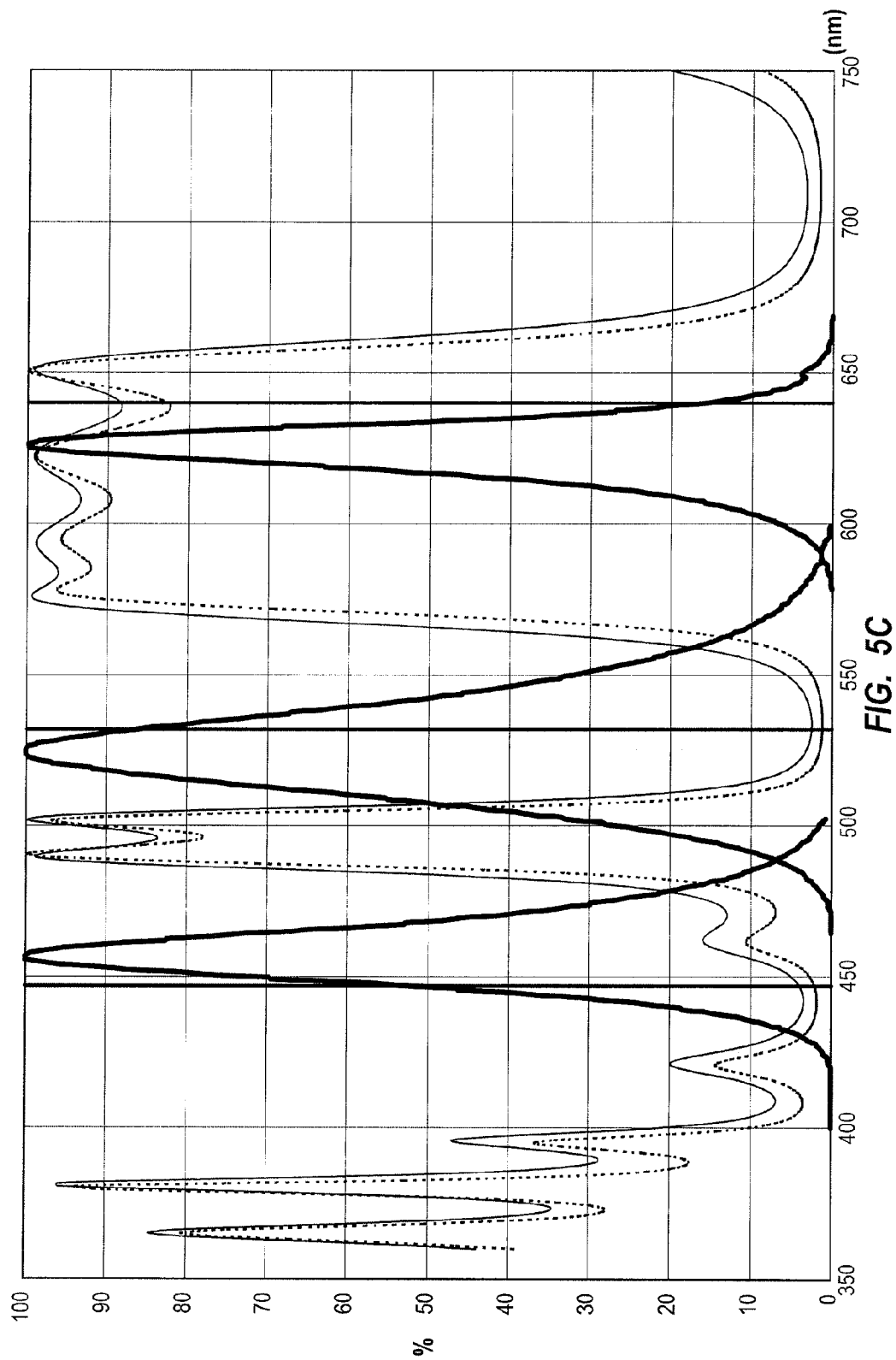
Figure 5D:
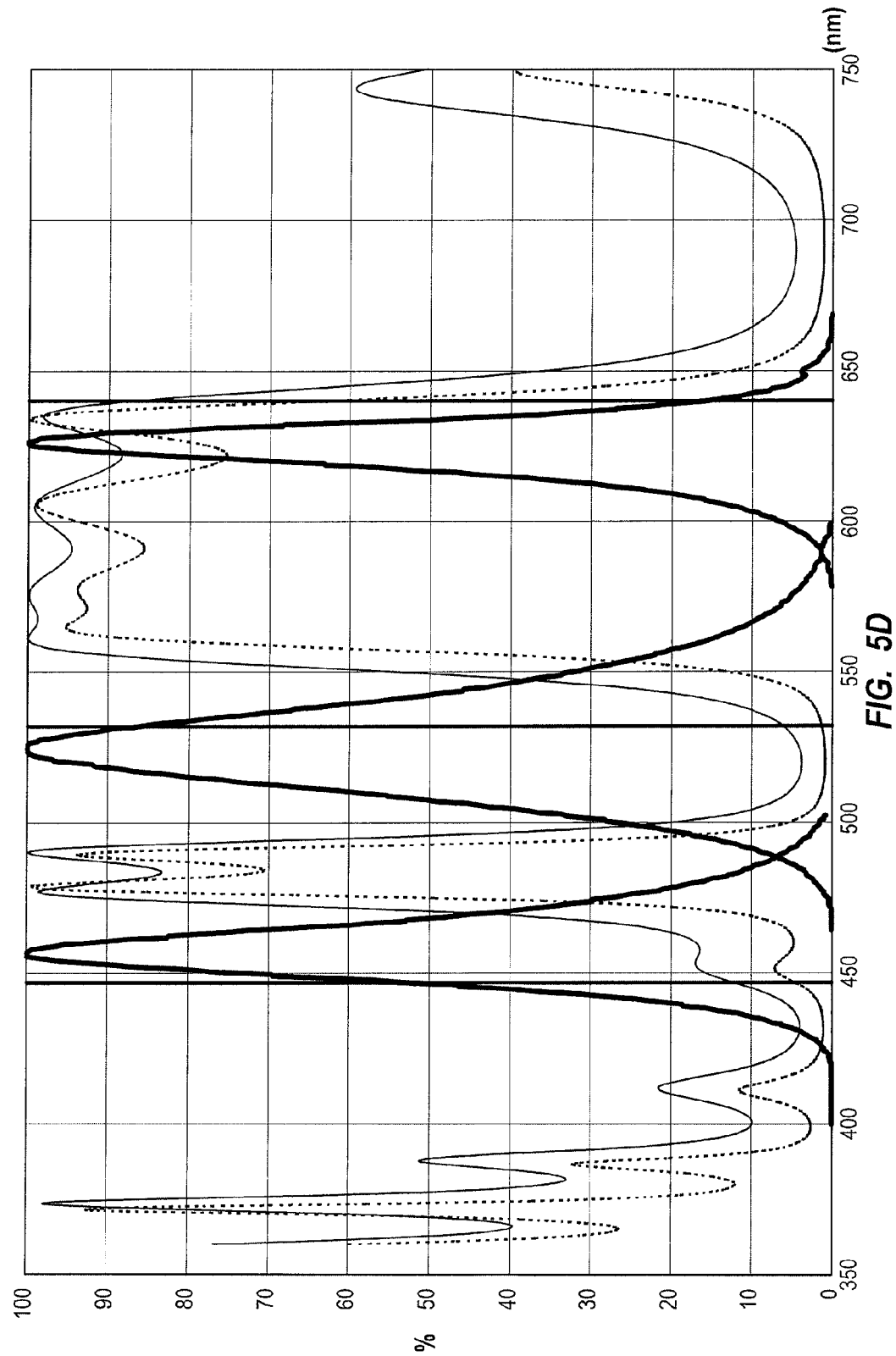
Figure 5E:
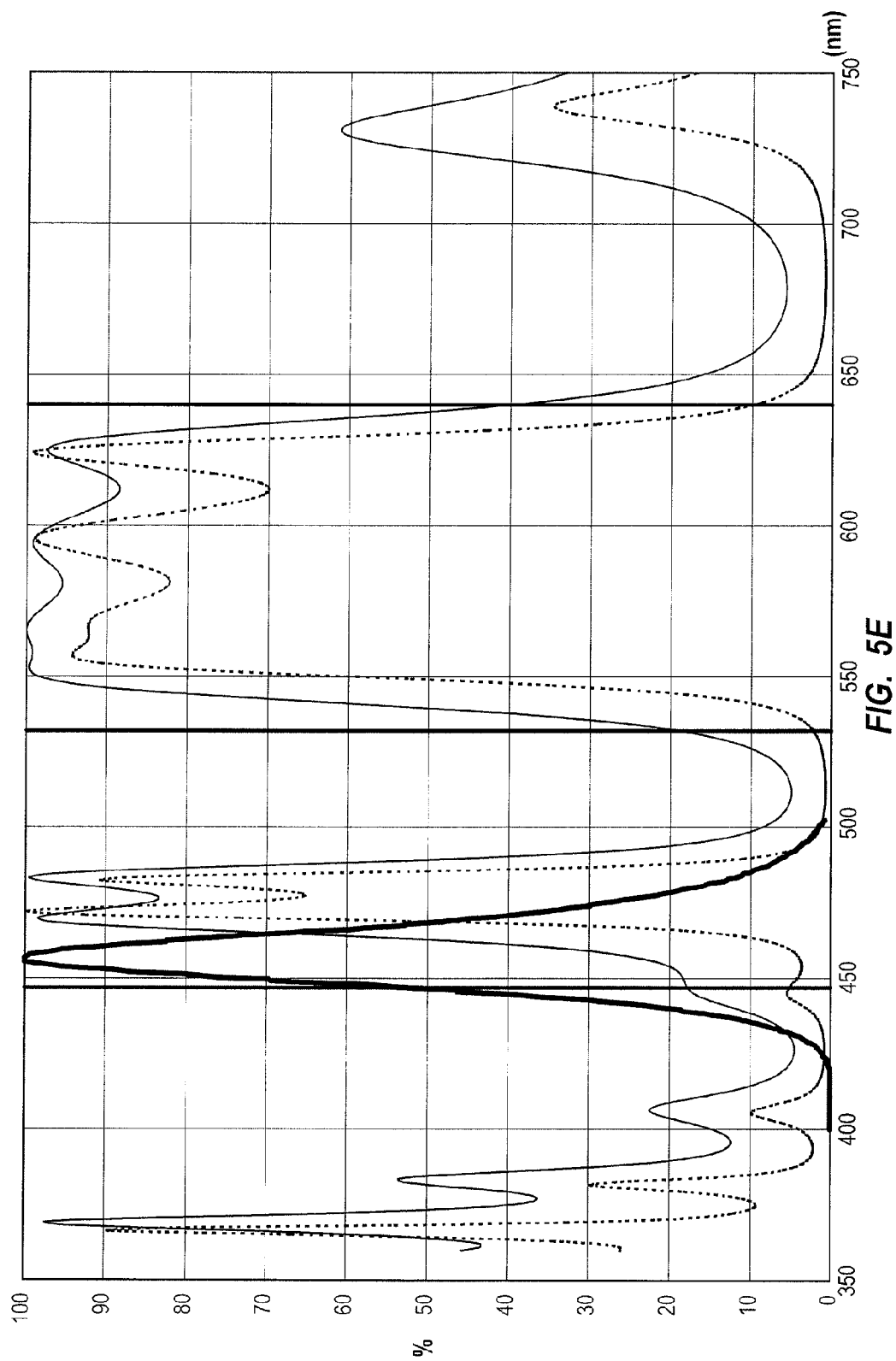
Figure 5F:
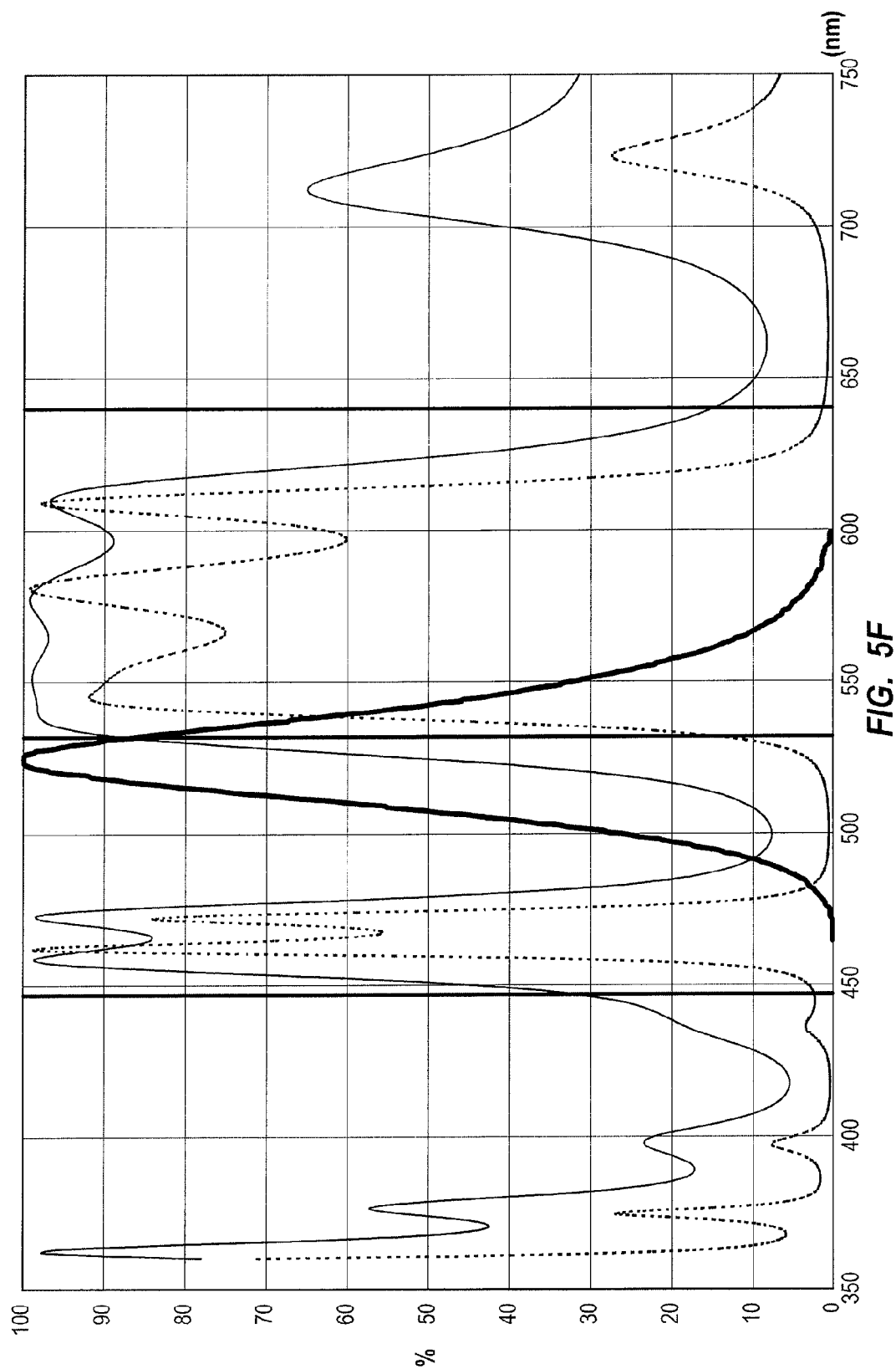
Figure 5G:
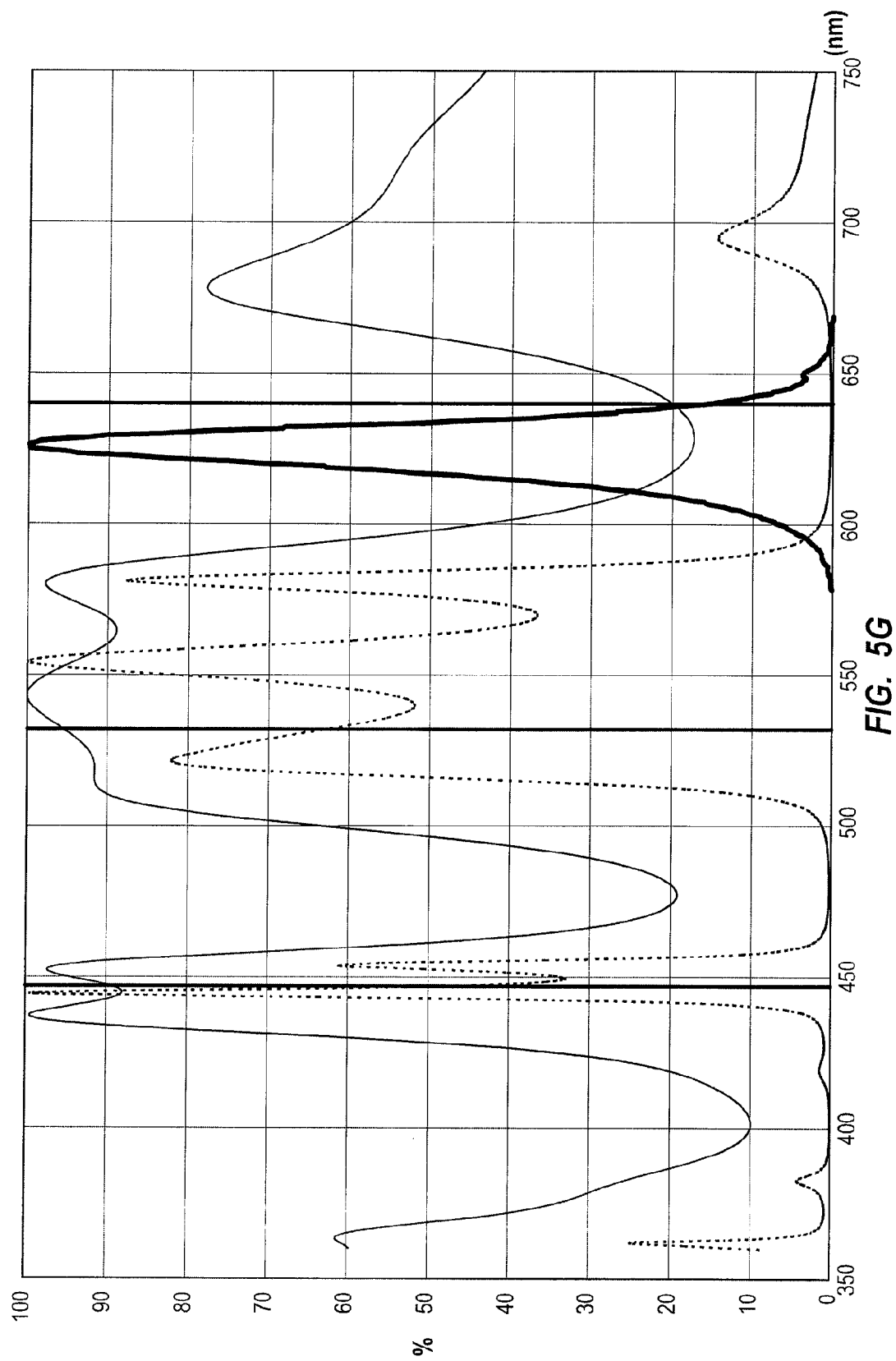
Figure 6A:
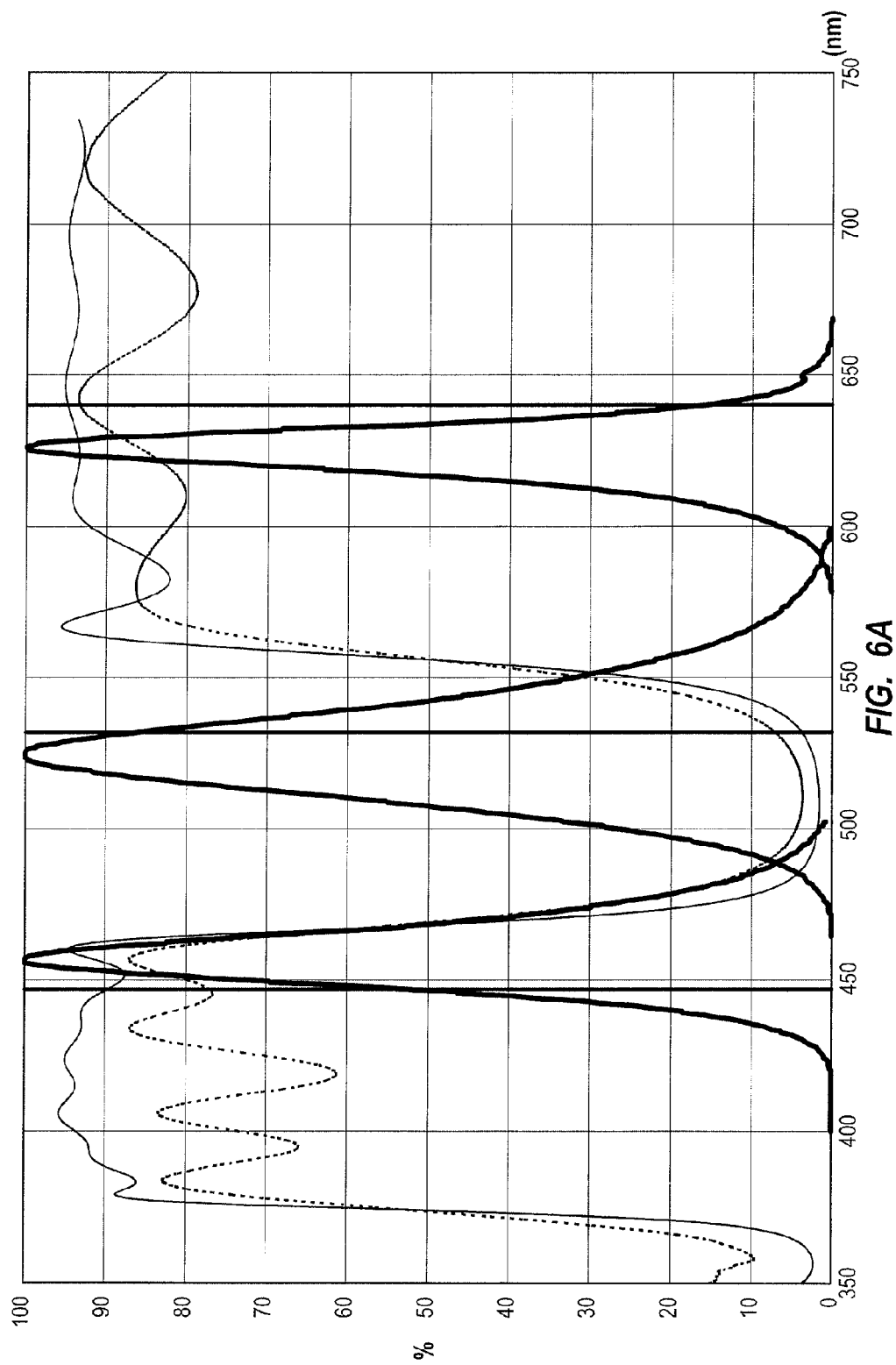
Figure 6B:
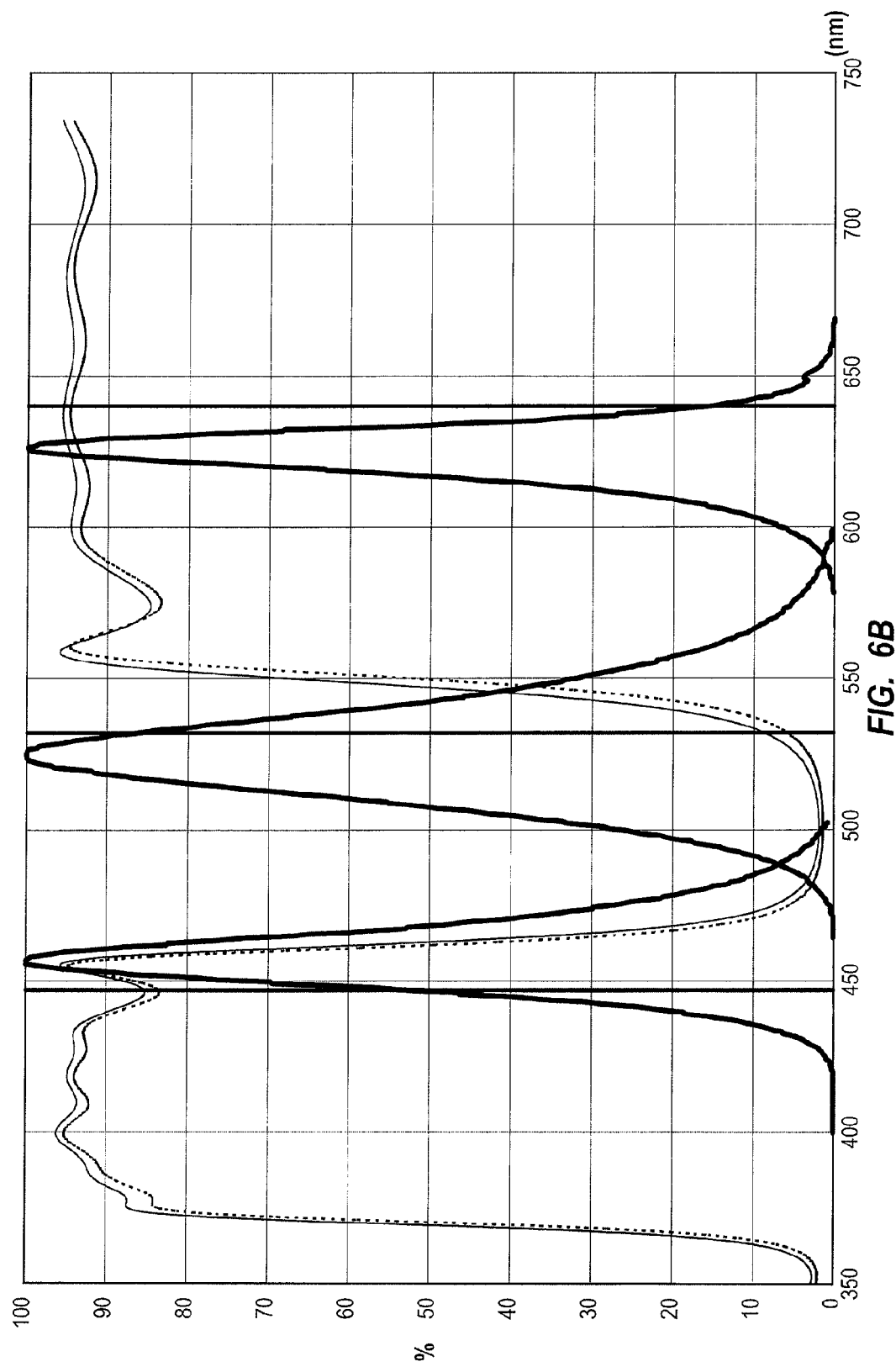
Figure 6C:
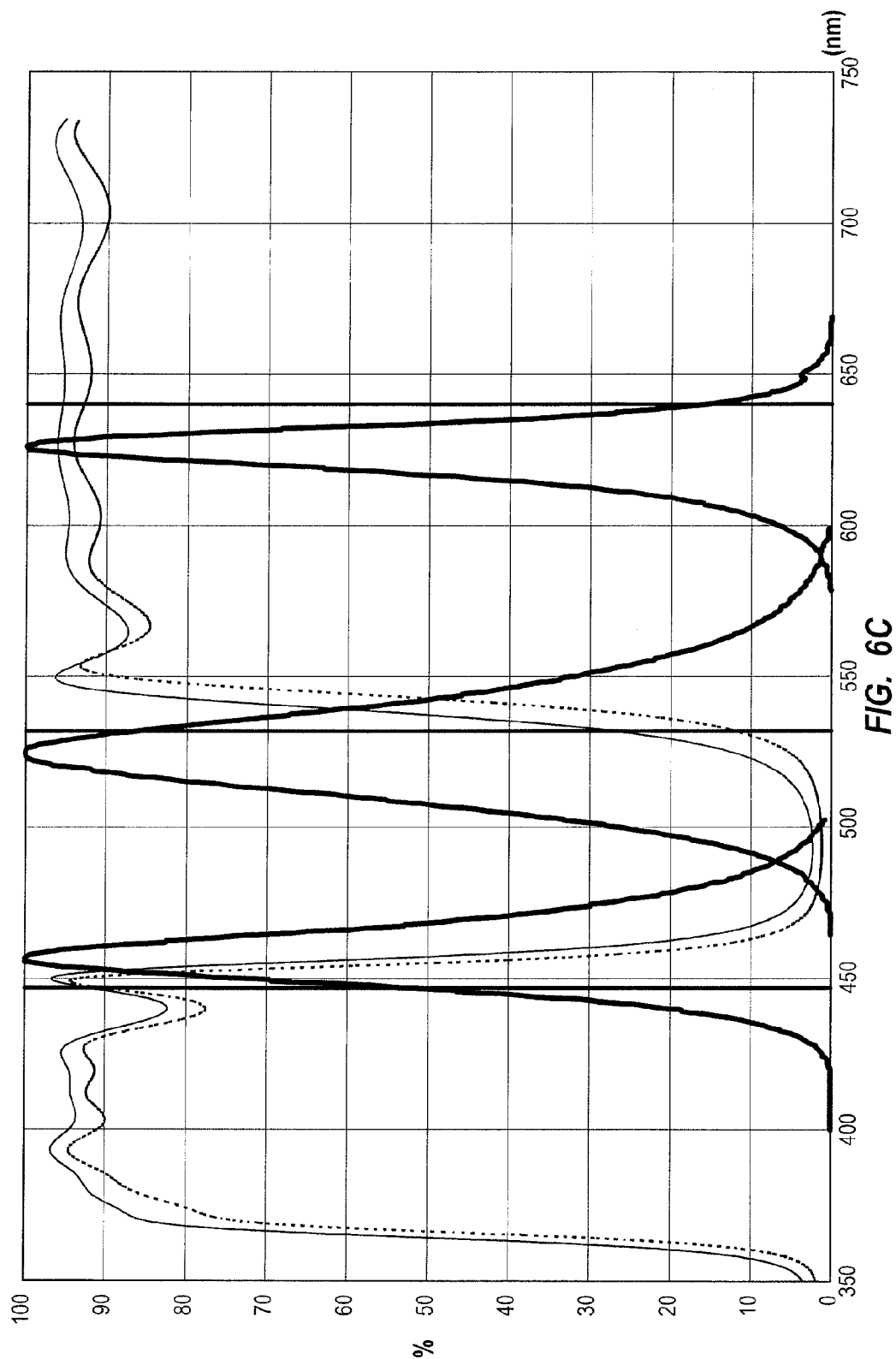
Figure 6D:
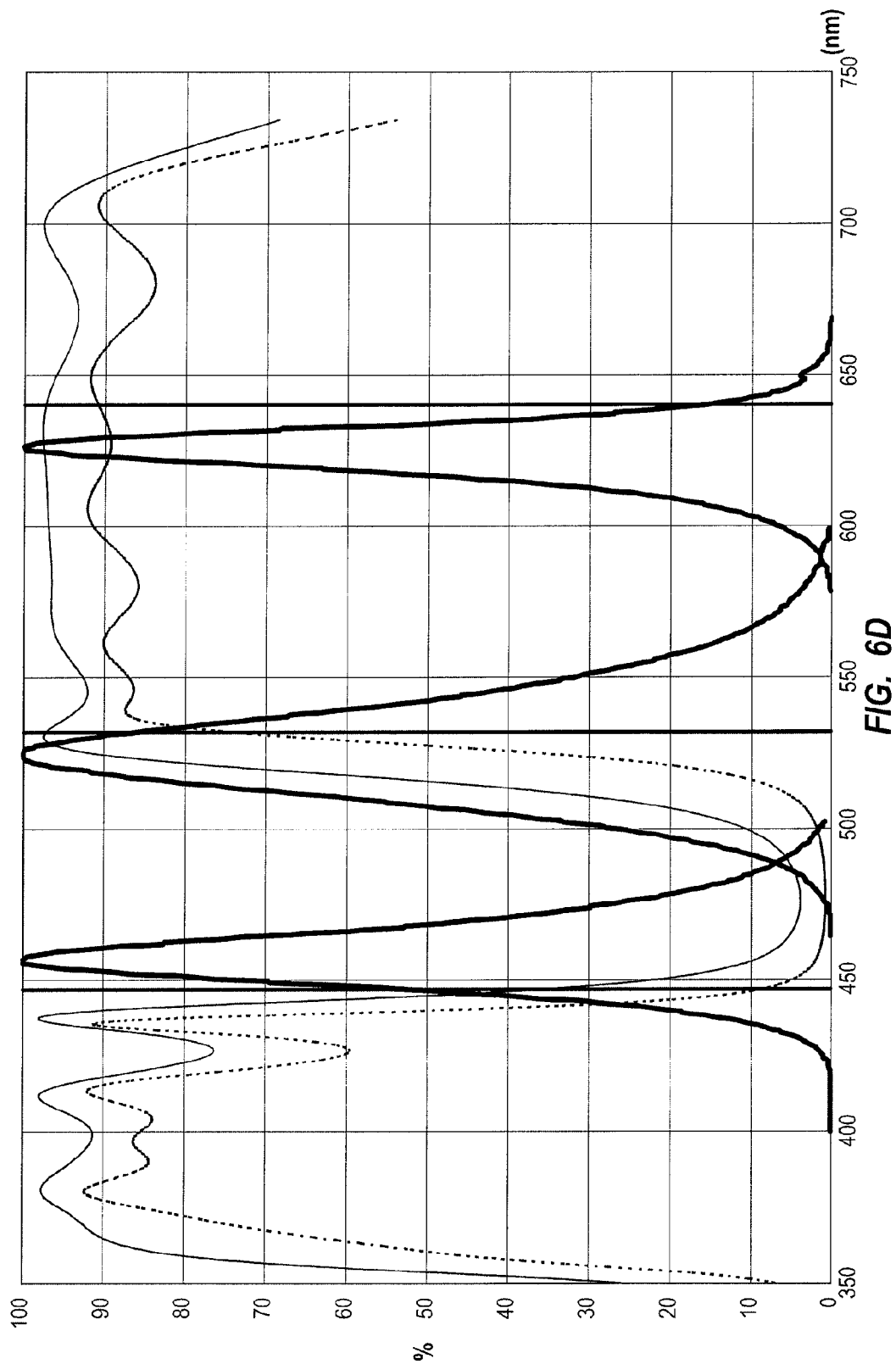
Figure 6E:
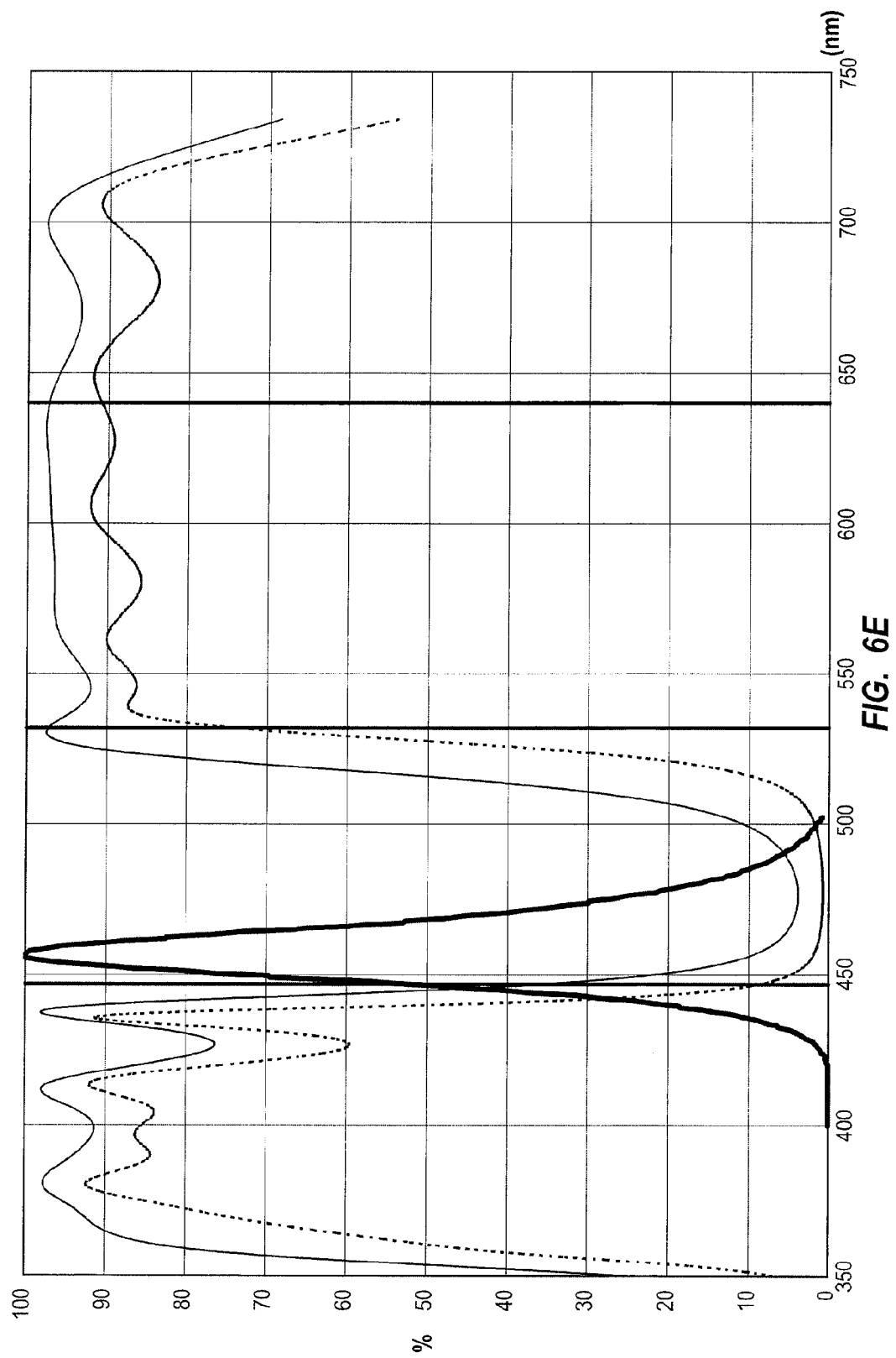
Figure 6F:
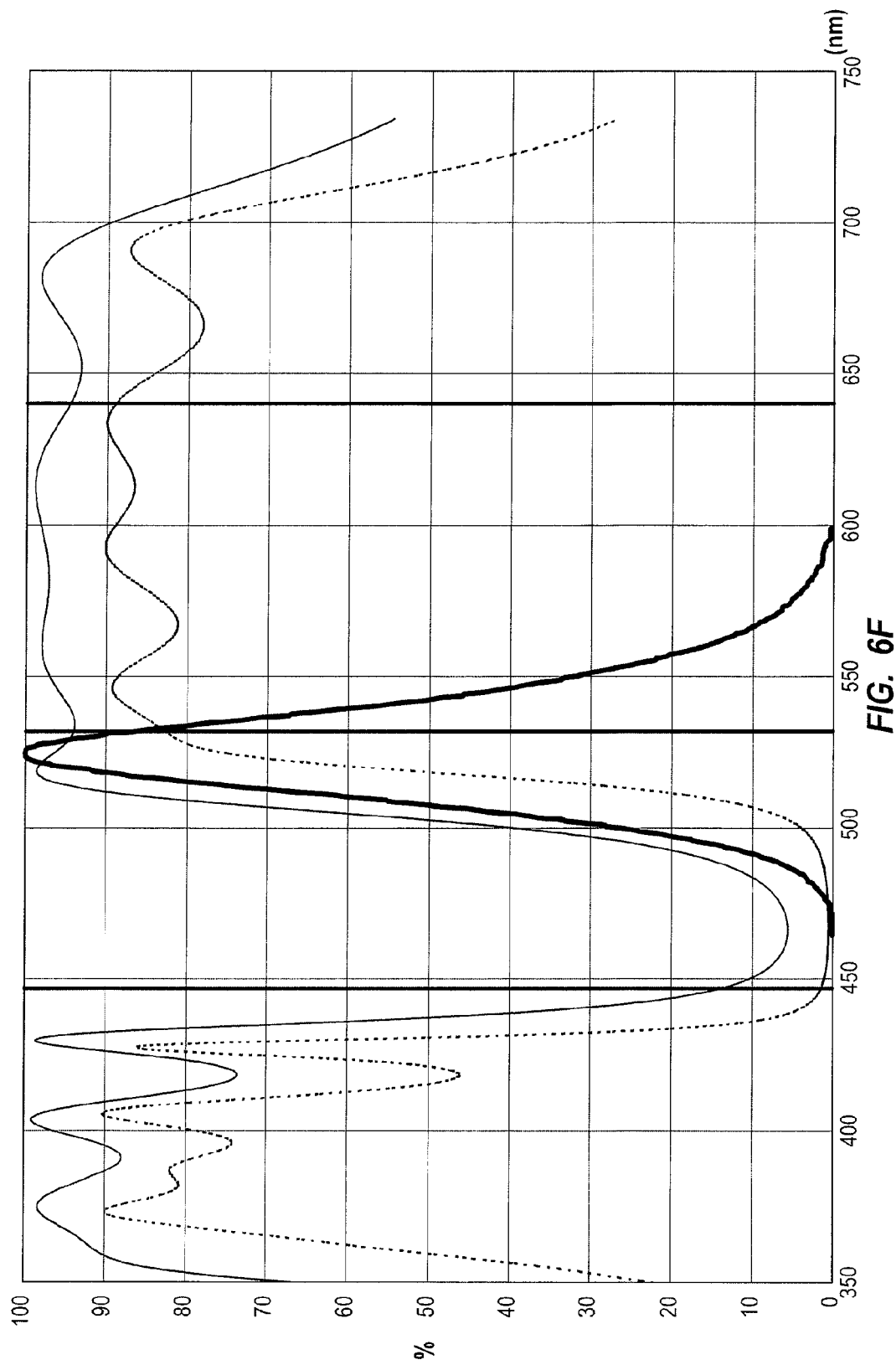
Figure 6G:
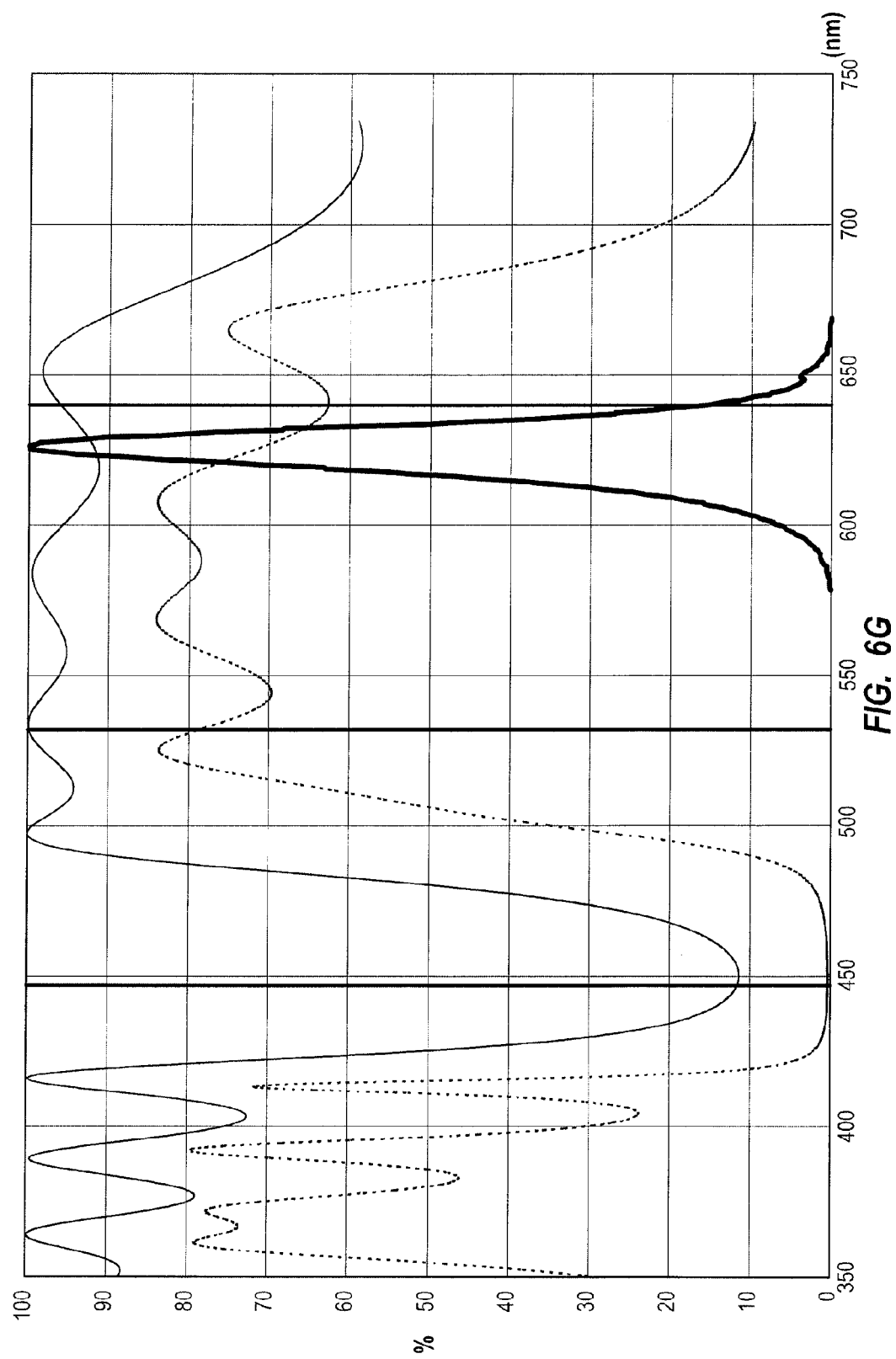
Figure 13:
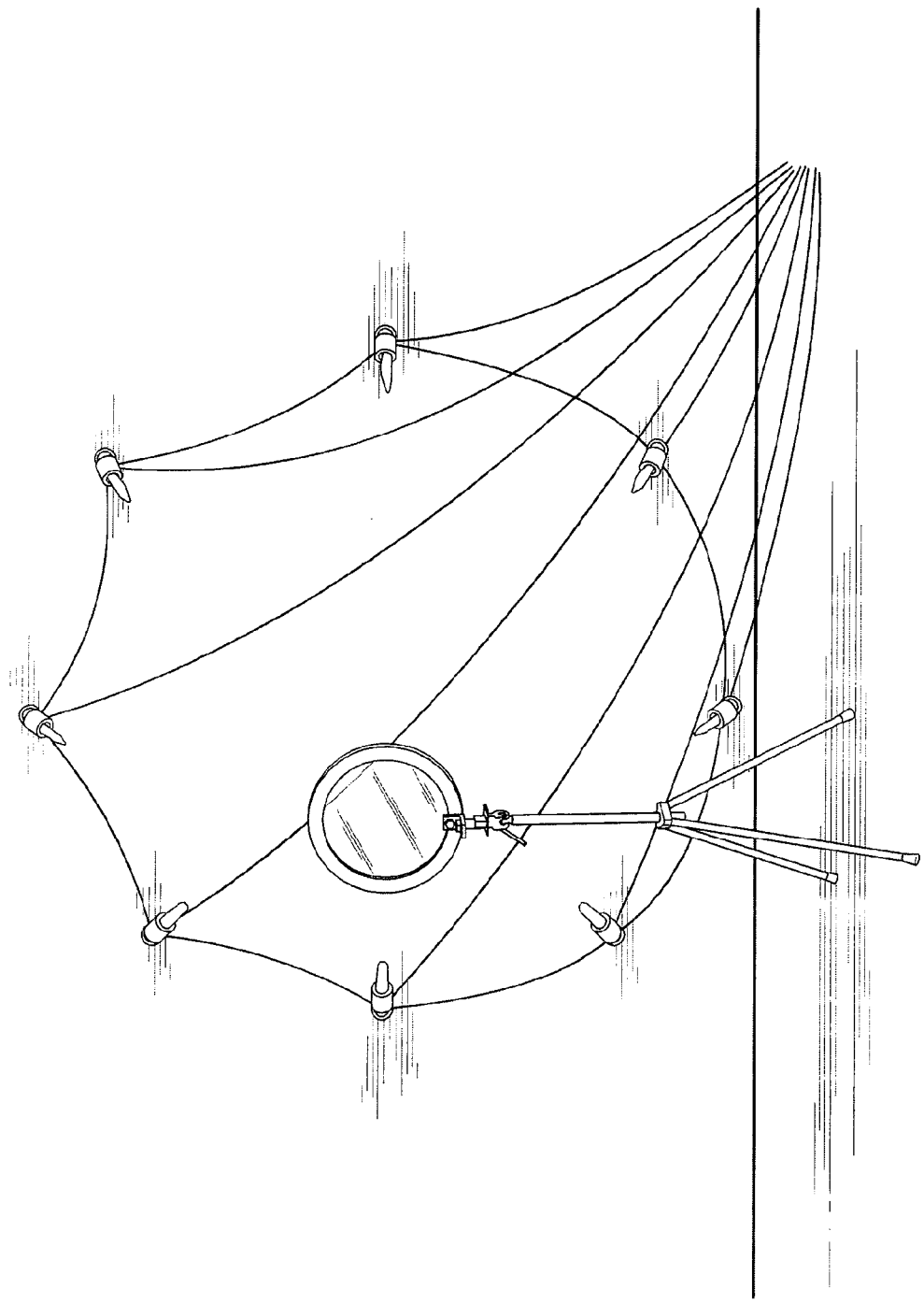

Rather than rotating the record/replay material as described above and elsewhere herein, it is instead possible to rotate the replay reference beam while the recording material stays generally stationary during recording (FIG. 4C) and during replay. This can be achieved by, for example, rotating the replay reference beam's optics, or by providing a plurality of replay reference beams disposed angularly around the replay material. If this is done, to maintain the correct rotational relationship between the recording material, the reference beam or beams, and the observer, the holographic content should undergo a rotation about the same axis as the replay reference or references rotate about or are disposed about, otherwise the holographic content will rotate (relative to the observer) between frames by the inter-frame angle. For example, if eight replay reference beams are provided at approximately 45° rotations about the z-axis, each of which can be turned on/off in sequence (FIG. 13) then in this manner an animated hologram can be produced which corresponds visually to the animated hologram which would have been seen using a single stationary replay reference beam and rotating the replay material 45° between frames. Potential disadvantages of this scheme include the cost and complexity of providing multiple replay reference beams or a rotating replay reference beams, and the greater volume occupied by said beams or beam (this disadvantage can be reduced by folding the paths of said beams or beams using one or more flat or curved mirrors in a manner analogous to the folding of a Model-22 Voxbox display as described herein). Advantages of this scheme include the lack of moving parts, especially if multiple replay beams are used. Even if a rotating replay reference beam is used, this can be achieved by providing a comparatively small rotating light source which is reflected off stationary folding optics, and in either case the replay holographic material itself can be substantially stationary which can avoid the complexities (described below) of bringing replay light and sensing and control signals to a rotating holographic material.

A further advantage of multiple replay references is that the on-duration of each such reference can be longer than for a pulsed reference used with a rotating hologram because (as described below) such rotation results in a radially-dependent extra blurring of the holographic content: as a result, replay with multiple replay references can be much brighter and/or can use much dimmer light than replay with a rotating hologram.

A further advantage of multiple replay references is that frames of the recorded hologram can more easily be replayed in reverse order, random order, or other cyclical orders (such as, for example, frames 1, 2, 3, 4, 4, 3, 2, 1) for a variety of aesthetic, artistic, or story-driven effects.

A potential disadvantage of rotating replay references and of multiple replay references is that the angular relationship between the observer and replay reference is different for each frame. As a result, the window as described above rotates between frames (though this is not noticeable if said window is substantially circular). Further, if as a result there is a mismatch between the vergence of the recording reference beam and one or more of said replay reference beams then a degree of the swing-out effect described above is observed for each such replay reference beam, and in general this will cause a cyclical rotational offset in the position of and a cyclical distortion of the shape of the replayed holographic content: these swing-out effects can be substantially eliminated by pre-distortion of the holographic content as described herein.

A further potential disadvantage of rotating replay references and of multiple replay references is that the residual reference (as described above) respectively rotates or exits in multiple directions rather than always exiting in one direction. This can still be blocked by the Sa filter as described above, or by suitably placed baffles or occlusive surfaces, or can be used for aesthetic or artistic effect.

These two motion scenarios—rotating hologram, and rotating/multiple replay reference beam(s)—are visually equivalent. A third scenario is also possible in which the observer rotates between frames, the singular replay reference is stationary, and the holographic material rotates to match the observer. Again, the equivalence is obvious, and generally all replay scenarios depended on maintaining a substantially fixed angular relationship between the orientation of the observer and the orientation of the holographic content while changing the angular relationship between the active replay reference and the holographic content. Hybrids of these scenarios are also possible and can be advantageous, for example, the observer can be stationary while the hologram oscillates back and forth through a range of rotational angles and a plurality of angularly disposed replay references is used. Hereafter for simplicity, generally only the scenario of the rotating hologram is described and the equivalent scenarios involving rotating replay reference, multiple replay references, and rotating observers are not further described but will be understood by those skilled in the relevant art via their obvious rotational equivalences.

For example, the present inventors have recorded series angularly multiplexed holograms of this nature in Agfa 8E56 recording material (which has an approximately 6 µm emulsion thickness) at approximately a 532 nm recording wavelength with approximately a 56.3° reference beam angle, and have observed that a rotation of approximately 30° between exposures is sufficient to allow a series of twelve such holograms to be recorded and replayed with substantial or complete independence. If this hologram is spun slowly around an axis perpendicular to its plane and continuously exposed to a replay reference beam at approximately a 532 nm replay wavelength with approximately a 56.3° reference beam angle then the twelve holograms are seen in the series of their recording (or in reverse series if the spin is in the reversed direction), with each hologram fading and twisting out of view before the next (or prior) in series fades and twists into view. If now the replay reference beam as described is interrupted except when the rotating holographic material is close to the rotation angles of 0°, 30°, 60°, and so on through 300°, and 330° then the twisted and fainter views of the series of holograms are not seen and instead a series of twelve discreet clear and independent holograms is seen with no holographic reconstruction visible between these angles when the replay reference is not present.

In certain embodiments, a short repeating holographic movie may be achieved by spinning such a recording (or its replay reference beam) at an increased speed while flashing short pulses of replay reference in synchronization. So, for example, if the material is spun at a constant rate of, for example, approximately 2 Hz and the reference is pulsed in synchronization at the same rate and with short pulses of approximately 1 ms duration and each hologram in the recorded series represents the same scene or object but with the scene changing or object moving such that the twelve recorded holograms represent or depict twelve sequential steps in a cyclical motion or other smooth looping change of the scene or object depicted then a moving holographic image of the scene or object is perceived, approximately ½ second in duration and repeating approximately every ½ second. Flicker fusion prevents the appearance of flicker, and short-range apparent motion provides smooth motion.

By the term "short-range apparent motion" we mean the phenomenon commonly referred to as "persistence of vision"; see "The Myth of Persistence of Vision Revisited", Joseph Anderson and Barbara Anderson, Journal of Film and Video, Vol. 45, No. 1 (Spring 1993), 3-12.

At an insufficient replay rate, flicker and a jerkiness or lack of smooth motion becomes evident. The present inventors have demonstrated that this is tolerable (in that a satisfactory illusion of continuous motion is perceived) even at rotation rates as low as 16 holograms-per-second (i.e., a 16/12≈1.3 Hz net rotation rate for the 12 hologram demonstration discussed herein), and that at sufficiently high rotation rates no flicker or discontinuity or jerkiness is perceived: experimentally, anything in excess of 24 holograms-per-second, or ≈a 2 Hz net rotation rate for the 12 hologram demonstration discussed herein, is generally sufficient. The present inventors have determined that the minimum desired frame rate depends somewhat on the image content (larger and brighter areas and volumes within the holographic image generally benefit from higher rates), the overall or average brightness of the holographic image relative to ambient light, if any, and to some extent the color or colors of the holographic image and the duration of the replay reference pulses. The minimum and desirable rates are found to vary somewhat between observers and even for a single observer under different observing conditions.

This is not "pulsed holography" as that term is generally used, in which very short, typically sub nanosecond, pulsed exposures are used to record holograms of moving objects. In the present demonstration, with, for example, an approximately 1 ms pulse duration and an approximately 2 Hz net rotation rate, the rotating material rotates through an angle of approximately 0.72° during each pulse. This would be far too much motion to permit the recording of a hologram, but such a magnitude of motion during the replay of a hologram produces only a mild blurring of the replay such that points in the holographic image which are reconstructed by areas of the hologram which are away from the center of rotation are blurred by about 0.72° which, experimentally, has been found by the present inventors to present little or no visual disturbance and in fact may even contribute to the desirable sense of smooth and continuous motion.

In the present inventors' 12-frame exemplar, reference pulses of 1 ms duration at a repetition rate of 16 pulses per second represents a pulse duty cycle of $^{16}/_{1000}$ or approximately 1.6%, so the holographic movie using these parameters is on average only about 1.6% as bright as is any one of the constituent holograms continuously replayed with an otherwise similar but continuous reference beam. In practice the present inventors have observed that this hologram appears somewhat brighter than expected.

It is advisable to avoid at all times (including during idle periods and spin-up and spin-down periods) flicker rates which risk inducing epilepsy in susceptible observers.

Thicker holographic recording materials generally exhibit greater Bragg selectivity, so that more rotationally multiplexed holograms can be recorded within thicker materials at correspondingly reduced inter-hologram angles. For example, a recording material with an approximately 60 μm thickness permits approximately 120 holograms to be recorded and replayed at angular separations of approximately 3°. Such a material can replay a movie at 24 frames-per-second even when spun at a net rotation rate of just $\frac{1}{5}^{th}$ Hz or 72° per second. In this case a replay reference pulse duration of 10 ms at a rate of 24 pulses per second produces the same 0.72° of rotational blur which has been determined experimentally to be tolerable or even beneficial, and this corresponds to a 24% duty cycle so the moving holographic image appears approximately one quarter as bright as would a single continuously replayed image and has a net duration or cycle time of approximately 5 seconds.

This brightness estimation assumes that 120 such holograms are recorded such that each is approximately as bright and approximately as contrasty as would be one hologram recorded in the same material and with substantially the same recording, processing, and replaying parameters. Thick holographic materials are available, for example in the form of DCG and photopolymer materials, or may be created by swelling the gelatin emulsion of a silver halide emulsion of a material such as Agfa 8E56, and in certain cases such materials offer an available index modulation capacity which far exceeds that desired or even usable for a single holographic recording so that series of tens, hundreds, or even thousands of such exposures can be recorded using such materials. Further, the recording geometry and other parameters used for such a series recording can be optimized experimentally or by design to maximize the brightness and contrast of each hologram in the series, and to minimize any undesirable trend for the average brightness or contrast of such holograms to vary through the series: this may include determining formulae or empirical relationships via which one or more of the recording parameters, such as beam ratio or exposure duration or the delay between exposures, is or are varied through the exposure series.

By such methods and using such materials as described above it is possible to produce holographic movies containing as many as 1,000 frames corresponding to movies or movie loops with total durations of approximately one minute at acceptable (in terms of flicker) frame rates and with acceptable brightness given the availability of sufficiently bright reconstruction sources as, for example, the laser sources incorporated in Mitsubishi's aforementioned L65-A90 RPTV (approximately 3.8 average Watts of red at approximately 640 nm, approximately 3.0 average Watts of green at approximately 532 nm, and approximately 4.85 average Watts of blue at approximately 447 nm). Such reconstruction sources are eminently suitable for the replay of color holographic stills and movies made using the color aspect and the motion aspect of the present invention.

The present inventors have demonstrated an exemplar of such a color holographic movie loop by generating component red, blue, and green holograms using the color aspect of the present invention wherein each said component color hologram also implements the motion aspect of the present invention with 12 holographic images or frames, and replaying this color motion film/filter stack by mounting it in a rotating holder in the replay geometry previously described for color hologram replay via the means of the present invention and using the aforementioned Samsung/Luminus LED-based reconstruction source operated in pulsed mode.

In generating holographic images for high-frame-count movies it may be advantageous to use refreshable, erasable, reusable, or real-time holographic recording materials such as thermoplastics, certain photopolymers, or electro-holography materials and to then copy these multiple single hologram images into an angle multiplexed composite recorded in a more permanent holographic material such as a silver halide or DCG which may itself then optionally be recopied any number of times into any suitable holographic material to produce multiple final holographic films for the motion aspect of the present invention. This two or three step procedure avoids the expense of using large numbers of pieces (or large areas) of holographic material for recording first-generation master images because the refreshable, erasable, reusable, or real-time material may be reused for a subsequent movie, yet its second-generation copy image can be stored long-term for direct use or for re-copying into usable third-generation parts on demand. Another circumstance where a refreshable, erasable, reusable, or real-time holographic recording material, or a rapidly photo-processable holographic recording material, may be desirable is when the on-site production of holograms via the systems and methods of the present invention is desirable for speed or economy, for example if rapid turn-around of such holograms is beneficial, for example to enhance their utility in a surgical procedure where, for example, recently acquired tomographic scan data, such as interventional magnetic resonance or computed tomography scans, may be viewed as one or more holographic virtual images superimposed upon the corresponding scanned regions of the patient's anatomy and pathology.

There is also utility to a low-frame-count (e.g., two to ten or a few tens) angular multiplexed series hologram, such as for example the twelve frame demonstration of the present inventors, even if it is rotated slowly or is rotatable between image positions but is generally left in one such position for a comparatively long period (seconds through minutes or even months for example). Such a intermittently rotated hologram can display a number of independent (or related) holographic images in arbitrary order, such as for example four different advertisements each of which is visible to an observer or to observers for a period of a few seconds or a few minutes (sufficient time to perceive and absorb the message, meaning, or other intent of the image), with the four advertisements being shown one at a time, in any preferred or random order. Commercially, this example permits one holographic advertising device to portray four different advertisements, sharing the capital and operating costs of the display device between four different advertisements or advertisers. As another example, a twelve image version may contain one holographic image for each month of the year and may be switched to the appropriate image each month either via a timed rotational mechanism controlled by a calendrical clock or via manual intervention in the form of, for example, an on-site store employee who can unlock, remove if desired, rotate, replace if desired, and relock a cartridge, holder, or cassette as previously described said cartridge, holder, or cassette including the film or films carrying the twelve different holographic images. The monthly alterations in the displayed holographic image so achieved may involve the use of entirely different images each month, or some part or parts of the images may be made to be the same in each monthly image while some other part changes, such as for example text spelling out the name of the month.

More generally, such hologram alternators containing as few as two holographic images or as many as tens, hundreds, or thousands, wherein the changes between images are slight or complete, have utility for a multitude of applications. In the case of such alternators including tens or more of images, the mechanical and other implementation details used for motion holograms (which is expanded upon below) may beneficially be used, or other means may be substituted recognizing that intermittent or slower rotation or angular repositioning may be all that is desired. In the case of such alternators including small numbers of images, such as two through a few tens, it may be satisfactory to provide a manual means of rotating or repositioning the film/filter (or in the case of single color versions, film or films alone) such as, for example a rotatable front mechanism with index marks, ratcheting, or other registering means to indicate or enforce the correct angular positioning. Alternatively a jukebox-style or similar mechanism may be provided to store a plurality of cartridges, holders, or cassettes as previously described, and exchange them as and when desired on the front of an illumination mechanism as previously described, or, if flexible holograms are recorded on a roll, or are attached to a belt or carrier roll, said holograms may be spooled through a loose assembly of filters in a multiple-film film gate incorporating the filters. If flexible angle-dependent filters, such as holographic dichroic filters, are attached to or spooled with said flexible holograms they may be spooled through a more conventional film gate which does not itself contain the principal angle-dependent filters of the present invention.

In general, any of the features described herein for the color aspect of the present invention may also be used with the motion and/or the occlusion aspects of the present invention, and vice versa. For example, combining other elements or effects (such as, for example, flickering light sources or combining with shaped surrounds, other holograms, text, graphics, mists, static or moving objects, etc) may be achieved with a motion hologram or a static hologram. A particular example is combining a permanently or intermittently moving hologram or holograms with one or more non-moving or substantially static holograms, so that, for example, a large non-moving hologram may fully or partially surround or enclose or be spatially associated with one or more smaller moving holograms so that the moving or changing aspects of the resulting composite display are embedded within a larger stationary but potentially still holographic region.

For example, in the case of movies, or in the case of alternators in which a series of related images are shown comparatively rapidly, the intent is generally to tell a "story" or otherwise communicate to the observer a sequential development of the content of the imagery as the movie plays out or loops or the alternator switches images: to achieve such an aim, the previewing environment previously described should ideally be extended to include motion content so that, for example, an operator, designer, or client using such a previewing environment and desirous of telling such a story or making such a communication in a certain way can preview or "storyboard" how their story or communication develops when, for example, seen by different observers at different viewing positions or following different paths through space. This goes beyond the general experience (as previously referred to) of theater designers, sculptors of static sculptures, architects of static structures, and stereoscopic cinematographers and videographers in that the scenes and objects to be created or imaged and the observer viewing the created scenes or objects may move or otherwise change.

As another example, all the systems and methods previously described to control such image variables as brightness, color balance, white point, and contrast, and to activate, deactivate, or otherwise control or modify additional elements incorporated within, around, or adjacent to the holographic image or images, may advantageously in the case of a movie or alternator as previously described be extended or adapted to incorporate the element of time so that, for example, each frame of a movie can have its brightness adjusted relative to other frames in a progressive, planned, environment-driven, or arbitrary manner so that the movie or other story or communication flows smoothly or with such gradual or sudden changes as may be desired. This can be achieved by including mechanisms which store or generate suitable control values or states for whatever in the display device controls or causes each such image variable or additional element. Such stored values, or the procedures to generate them on the fly, can be communicated to the display device via any conventional data communications means such as, for example, via a USB data storage device or a WiFi communication, and such communication means or devices can be incorporated within or can accompany or be delivered with or for use with interchangeable films, cartridges, holders, or cassettes as previously described. And all such movie-related image variables and additional elements can be simulated or otherwise incorporated in the aforementioned preview environment so that the operator, designer, or client using such an environment can judge and influence their various effects.

Figure 14:
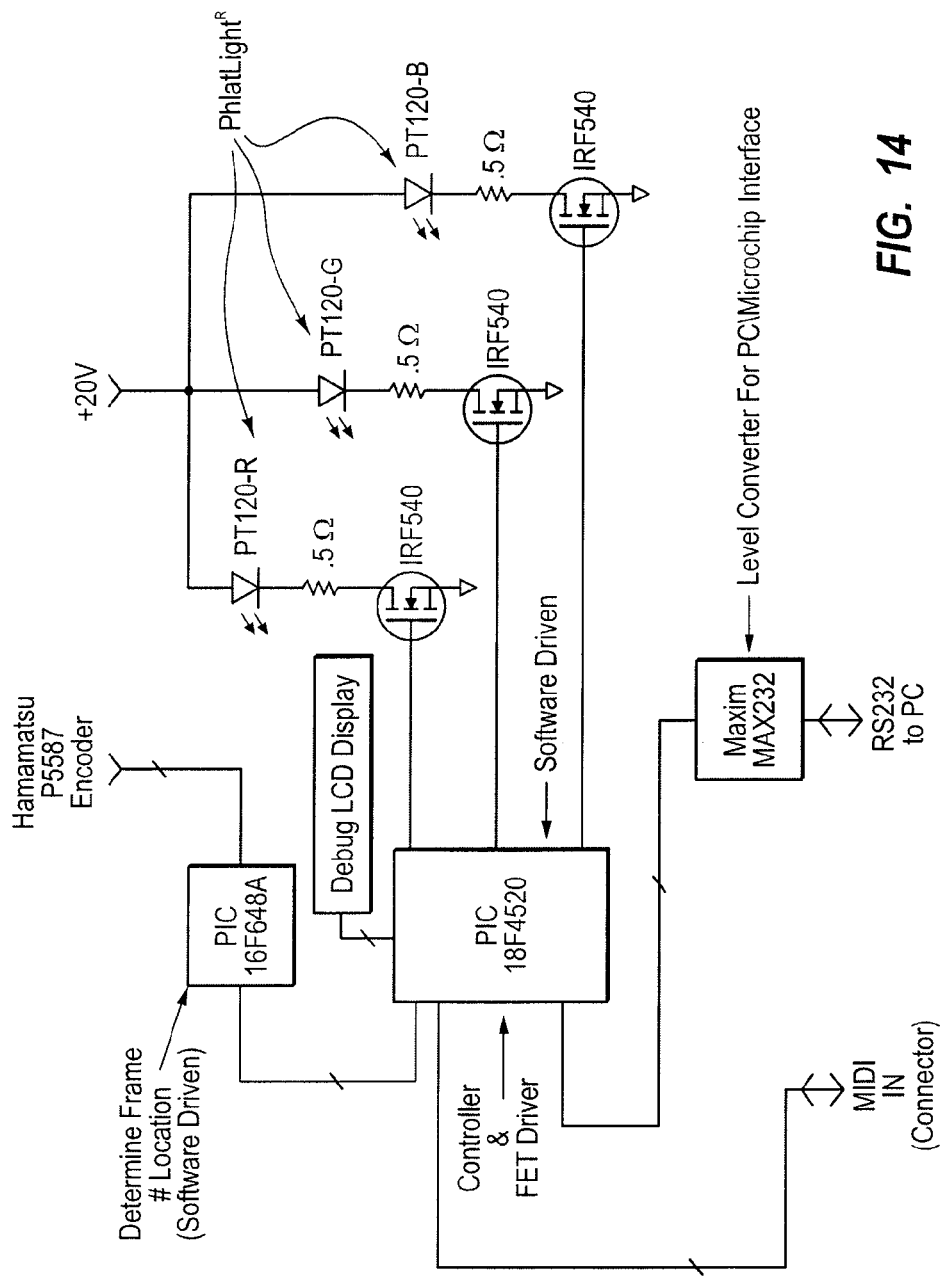

For example, in the present inventors' color motion demonstration (FIG. 14) a serial communication from a control computer via an RS232 port is used to deliver on-the-fly brightness control parameters for each frame of the movie loop, and a pattern or twelve black (absorptive) and twelve white (reflective) approximately evenly-spaced marks is applied around the periphery of the rotating mechanism with a stationary infra-red opto sensor [P5588, Hamamatsu Photonics, K.K., Hamamatsu City, Japan] positioned to read these marks as they fly by (one white mark being approximately twice the length of the others to act as a zero or home indicator) and a single chip microcontroller [PIC18F4520, Microchip Technology Inc., Chandler, Ariz.] is used to switch on and off the Luminus LEDs in response to the detection of the peripheral index marks (including the zero marker), for motor-speed estimation and slip detection, and for LED PWM durations and timings derived by the microcontroller from brightness and phase values provided for each color of each frame by the control computer which are buffered (along with MIDI note and volume triggers for pre-generated custom sound files each of which is stored in and replayed by an external Roland Fantom X6 Workstation Keyboard [Roland Corporation U.S., Los Angeles, Calif.]) from the control computer by the microcontroller using a ring buffer and a CTS/RTS communications protocol. Similarly, one or more additional or alternative peripherally distributed control track or tracks may optically, mechanically, or magnetically store and provide control values or signals for the control of other image variables or additional elements as described above.

While a sound track or triggers for sound effects may be provided in this manner, or may be delivered by other means and synchronized by control signals derived in this manner, if the rotation mechanism undergoes significant changes in angular velocity, either variably within acceptable limits or as a result of a controlled increase, decrease, or modulation in rotation rate, then said sound track or the sound effects triggered by said triggers generally benefits from retiming, for example in the case of a sound track by being pitch shifted so that even though played slower or faster it does not appear to undergo undesirable changes in pitch, or in the case of said triggers by having the current, desired, or anticipated rotation rate communicated to the sound source or its controller so that the sound effects can similarly be shortened or lengthened (and if desired pitch shifted) to maintain the desired synchronization of sound and image.

It is advantageous in the case of motion holograms for the provided sound, if any, to be spatialized at least in stereophonic sound but preferably in a surround-sound like system such as 5.1 or better theater sound. This is incorporated in the present inventors' motion demonstration, and even quite small inconsistencies between the visual movie action and its corresponding sound track or sound effects can detrimentally reduce the observer's perception of continuity, smoothness, and consistency. For this reason, the previewing environment previously described can also incorporate the simulation of the sound environment of the intended movie including its own spatialized sound and any known, predicted, or anticipated environmental or ambient sounds at the eventual location of the motion display device.

Other effects which can advantageously be incorporated in the display device, and hence for the previously described reasons in the simulation environment, include: running all or part of a movie in reverse (which can include a different sound track or sound effects, not just a reversal or repeat of the corresponding forwards sound track or sound effects); pre-rolling and post-rolling sound or other non-holographic effects or holographic effects exploiting one or more of the individual movie frames or one or more additional frames which are used for this purpose instead of or as well as forming part of one or more movie sequence where such pre/post-rolling may for example be used to extend the perceived duration of a movie or movie loop by extending the story or other communication beyond the limited actual duration of the holographic movie; reusing one or more frames of a movie or movie sequence (or even an entire movie or movie sequence) with altered timings, coloring, or other such modifications as can be obtained through alterations to the illumination sequence or the brightness (including PWM) values used for each color illuminant or the additional elements including, for example, the use of different sound tracks so that for example a "talking head" with certain lip motions and facial expressions can be synchronized with one of several different sound tracks and hence can be perceived as making one of several different speeches or other utterances; deliberately introducing flicker, pulsation, or other modulation or instability in one or more of the frames, either through the use of an additional element such as, for example, an effects wheel placed in the optical path which can be rotated to introduce one or more modifying elements into the optical path between the illumination source or sources and the holographic images (such modifying elements and resultant effects can include, for example, diffusers to soften the holographic image, prismatic elements to distort or move the holographic image, and arrays of such optical elements to alter different regions of the holographic image in different ways or to different extents), and any such modifying elements can comprise an array or progression of sub-elements or can consist of an array or progression of a mixture of such elements so as to achieve either a gradual modification to the holographic imagery or a modification which varies spatially within the holographic image) or through the modulation of the brightness of the illumination source or sources (LEDs and in general lasers can typically if necessary or desirable be intensity modulated or pulsed at rates which exceed the flicker-fusion rate).

In the case of a rapidly rotating holographic motion display implementing the present invention it is advisable to ensure that the front cover window on the film/filter stack is replaced or supplemented by a stationary safety window which is spaced in front of the film/filter stack or otherwise provided front window and which is of sufficient rigidity and strength as to prevent said safety window itself from contacting the rotating mechanism or any other rapidly moving element of the display device even if subjected to accidental or deliberate pressure, blows, shocks, or impacts so that the observer and other people, animals, and moving objects cannot too easily damage, or stall the rotation of, the display device or themselves be damaged by it. The optical and acoustic effects of any such safety window can be incorporated in the aforementioned simulation environment.

In unsupervised or exposed locations, such as in a bar, it is also advisable to house or package the entire display device (whether a motion device, an alternator, or a simple still image device) in such a fashion that it cannot easily be harmed by exposure to liquids or projectiles likely to be found in such environs or, when contacted by such liquids or projectiles, present any significant risk to other people, animals, materials, or objects in said environs such as for example any electrical risk, and it is also advisable that in such environs the display device (of whatever kind) should be immobilized, for example by being anchored or attached at least temporarily to walls, floors, ceilings, or other substantially immobile objects so it can neither be easily moved without authorization and tooling, nor easily stolen, nor easily be used as a projectile or other manner of weapon.

Rotation of the film/filter stack or other elements (such as the aforementioned cartridge, holder, or cassette) of a motion hologram display as envisaged by the present invention can be achieved in several ways. Generally slow rotation, as is generally desirable for higher-frame-count (and hence comparatively slowly rotating) movies or by simple image alternators, can easily be achieved using for example some combination of driven-roller mechanisms or belt drives (toothed or plain) or gearing mechanisms or idler rollers making contact with one or more external or internal surfaces of the rotating part.

For such rotational mechanisms it is generally difficult to support and drive the rotating mechanism upon an axis passing through its rotation axis because in general for a compact display this location is occupied by the illumination source and by associated beam folding and forming optics (it is possible to include all (or a sufficient subset of) such components within a drum-like rotating mechanism which may have a rear axle or other mounting mechanism in-line with its axis of rotation, however such an approach typically increases the rotating mass, and hence the angular momentum, which can be a disadvantage, and in such approaches it is typically difficult to bring electrical connections, for power, control, and sensing, into the inner volume of the rotating drum unless slip connectors are used, which can be costly and unreliable, whereas bringing light into such a drum from external illuminants can be achieved using windows or gaps within the body of said drum-like mechanism). Rather, it is generally advisable to provide both support and drive mechanisms disposed around the periphery of the rotating part of the device such that they do not substantially occupy, block, or otherwise interfere with the space on and around the rotation axis.

An exemplary demonstration of the slow-rotation version of the present invention (or of the non-rotating still image or the alternating image version), can be achieved by modifying a commercially available RPTV, such as the aforementioned LED-powered Samsung HL-T5087S or the aforementioned laser-powered Mitsubishi L65-A90, making minimal modifications to said RPTV's front screen materials so as to incorporate the film/filter stack and optionally the rotation mechanism of the present invention. Specifically, such an RPTV provides a scanned and color modulated spot which sweeps out a large collimated beam following a Fresnel lens immediately prior to a diffuser which diffuses light from this spot-formed beam to a wide horizontal and vertical distribution of potential observer positions. If a hole is cut in this diffuser, and the present invention's film/filter stack is inserted into said hole then said film/filter stack, instead of the normal diffuser is, over the area of said hole, and is illuminated by the collimated scanning-spot derived beam. Said illumination then forms the desired illuminant for the present invention's holograms, including the movie version if suitable films and a rotation mechanism are inserted in to the hole in the RPTV's diffuser. Outside this hole, normal television images can be seen in the normal way: inside this hole the holographic image (or, in the case of the movie or alternator versions, holographic images) is seen and its (or their) brightness, white point, and color balance depend on what video signal would otherwise have been shown across the said hole. For example, if that portion of the video signal is caused to be pure white (by, for example, inserting a suitably shaped and positioned white area into the video signal feeding the RPTV) then all the component color holograms are replayed resulting in the originally intended composite color holographic image (or movie). If instead of a white area the insertion into the video signal is an area of pure red, blue, or green then only the corresponding color holographic imagery is seen. Other colors in the video signal result in altered color balances in the holographic imagery, and black corresponds to no holographic imagery. A wide range of special effects may be created in the holographic images so produced by varying the color and brightness of the insert into the video signal (which may easily be achieved using recorder pre-generated video signals, or by generating the insert signal on the fly) both temporally and spatially.

Rapidly rotating devices, as are generally desirable for low-frame-count movies, may be supported and driven by such elements as have previously been described for slow-speed rotation, but at such higher speeds other elements may be advantageous such as for example supports in the form of air bearings, electromagnetic lifting devices, or high-speed ball-bearings or roller-bearings, and driving elements such as surface acoustic wave (SAW) drives, air jets acting upon turbine-like blades or flat surfaces of the kind and disposition which are used for air-turbines of various sorts, or electromagnetic devices such as for example linear induction motors. Any such high speed rotational driving and support mechanism may be designed to fail safely if, for example, its electrical or air supply fails, is interrupted, or disturbed, or if wear and tear leads to damage or significant changes in operating parameters. Allowance may also be made for accelerating any such mechanism up to speed before use, and for decelerating it to a stop or to a slower maintenance speed after use, and for restraining any rotation during for example shipping, assembly, and storage. The large angular momentum of a rapidly rotating device can be reduced by the use of counter-rotating balance wheels or weights, or by spinning some functional components clockwise and others counterclockwise.

Figure 15:
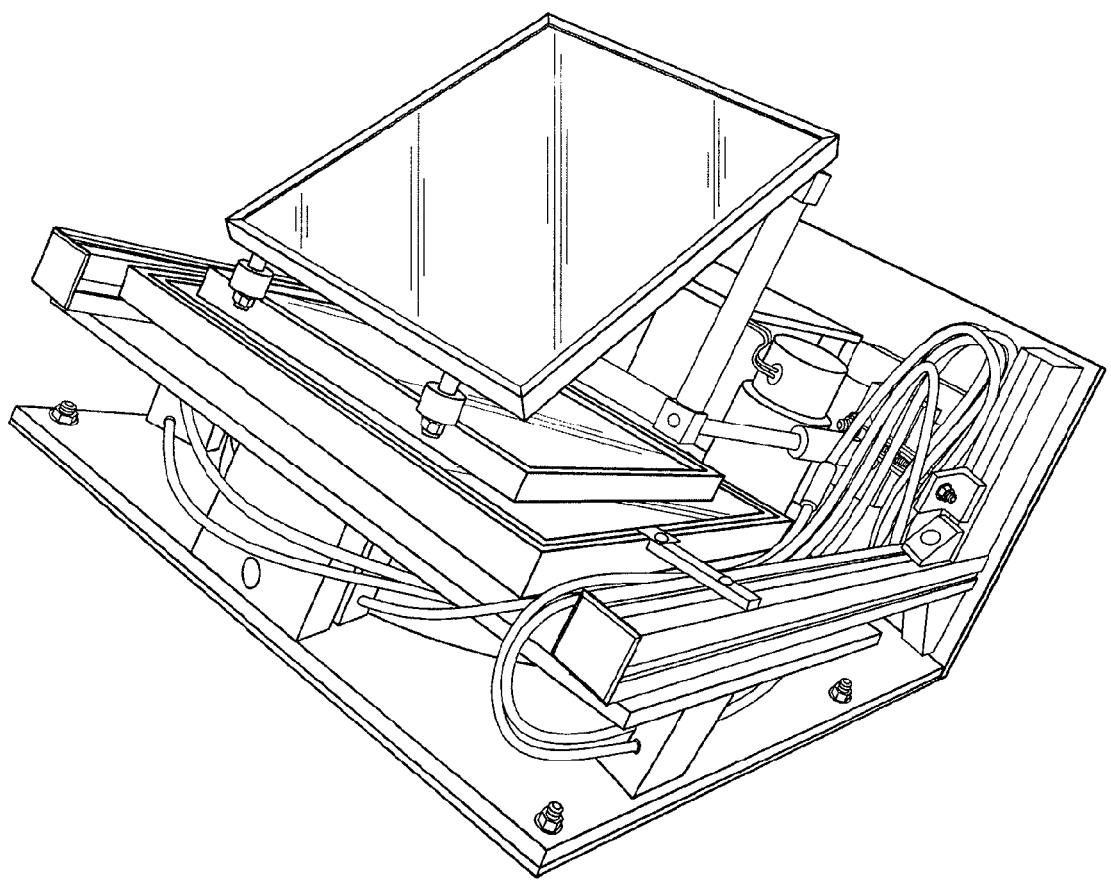

A low-frame-count holographic movie display which benefits from a high-speed rotation mechanism has been demonstrated by the present inventors. As described above, the component color holograms for this demonstration each included twelve holographic images at 30° angular increments. Twelve images would generally be considered too few for a movie or even a loop, however by mounting the said film/filter stack in a rapidly rotating mechanism the present inventors have created a device in which any one of the twelve images may be brought into the correct position for holographic replay in at most $\frac{1}{16}$th of a second and hence a 16 holograms-per-second average frame rate may be achieved with said frames being displayed in any order rather than just in the sequential order of their actual angular disposition within said films. In other words, random access to each frame is provided, and via the aforementioned control computer, RS232 communication path, and on-board microcontroller with its CTS/RTS protocol and ring buffer, movie sequences may be selected in which frames were shown in specially selected orders to achieve a visually meaningful and entertaining story (FIG. 15).

Some exemplars of the present invention contemplate many more holographic exposures than a single instance of a hologram recorded per Hart would generally involve. Typically for the color aspect of the present invention, each slice as envisaged in Hart is exposed three times, once for each primary color, though in practice the present inventors have determined that some scenes or objects may contain certain colors in certain regions only so that fewer exposures may be sufficient for certain colors, especially when the occlusion aspect of the present invention is used. Typically for the motion aspect of the present invention tens or hundreds of frames are recorded, each involving tens or hundreds of slices. It is desirable to implement certain improvements and modifications to the apparatus and method as taught in Hart to better accommodate the use of larger numbers of exposures, and to improve production speed, capacity, and reliability. Several examples follow.

For example, roll film and roll holders/dispensers or cut sheet dispensers can be used in place of manual film handling. Printed labels bearing human-readable or machine-readable identifiers can be attached to films and log books to permit film tracking and to reduce the likelihood of mix ups. Such film identifiers in a visual form may also be exposed as part of a slice (or as an additional exposure) recorded in each composite hologram photographically or holographically as a reliable identifier which cannot easily or accidentally be removed. If recorded as an additional exposure, this holographic or photographic record of the identifier can fall within part of the area which otherwise could be occupied by image content in one or more recorded slices, or it may fall outside this area in an adjacent area otherwise not used for recording slice data. Automation and programmable hardware can be used to reduce the likelihood of operator error and to detect incorrect, undesirable, or unexpected system states. A "script" defining the positions, exposures, beam ratios, and other operating parameters for each exposure in a composite hologram can be automatically generated, for example by the software system or systems used to generate slice images, and such scripts and log files can be maintained with the slice images to permit accurate repetition of hologram generation and can be archived and analyzed for QA/QC purposes and to facilitate the preparation and comparison of holograms produced with different parameters. Quality and reliability can further be enhanced by incorporating an on-line densitometer or densitometer array into the film processor following its developer tank, stage, or bath to monitor the optical density (transmission or reflection) of the developed film: unexpected variations in this density can be diagnostic of, and can be used to monitor and control, under/over exposure, developer exhaustion/contamination, and incorrect developer formulation or replenishment. A similar densitometer or densitometer array following the bleach tank, stage, or bath (if used) can similarly monitor, control, and diagnose over exposure, bleach exhaustion/contamination, and incorrect bleach formulation or replenishment; or films can be removed from the processor between tanks, stages, or bath and checked with a separate densitometer.

As another example, fringe-sensing techniques generally can permit the detection of excessive motion or other disturbances during exposures, and can detect laser mode-hoping even when this is not accompanied by significant laser power changes. Fringe-locking techniques (and pulsed holography) generally can permit exposures to be made despite the presence of otherwise excessive motion or other disturbances.

As another example, some or all of the various beam-blocks, shutters, and shunts of Hart can be replaced or augmented by optical power meters which can be used to establish correct settings to achieve desired beam ratios and exposure durations prior to (or during) each exposure, which said settings may otherwise be pre-computed from power measurements taken prior to the introduction of or uncovering of unexposed recording materials, or may be pre-computed or computed as needed from pre-measured or otherwise calibrated characteristic curves for the optical, mechanical, and electrical/electronic components involved and knowledge of the pixel content and disposition of each slice. It is advantageous to use three or more shutters in the kind of system described in Hart, such that one shutter is placed soon after the laser and is usually closed except during exposures, and other shutters are placed in locations where they can be used to block or unblock a specific beam, such as the reference or the object beam, so that, for example, ratios between beam powers can be measured conveniently. Only one of these shutters needs to be able to achieve accurate exposure durations so long as at least this shutter is in a location where it can be used to block or unblock the laser beam before it has been separated into reference and object beams. If multiple shutters are used in this manner in such a system with limited or no computer automation so that the shutters are generally opened and closed manually, then it is advantageous to wire the shutter controllers together and to a switch (such as for example a foot switch) so that each click of said switch cycles the shutters between useful states such as all-open, all-closed, open for reference only, and open for object only, and this can conveniently be achieved with the Uniblitz D122 and T132 shutter controllers [Vincent Associates, Rochester, N.Y.] used by the present inventors in a hologram copying system generally as described in Hart.

The step of copying a master hologram, as taught in Hart and in the present disclosure, includes that a suitable beam ratio and exposure time be determined and approximately achieved for each exposure. The present inventors have determined that, for example, the following empirical values work well for the beam ratio and the exposure energy for copying into materials similar to Agfa 8E56: Beam ratio k=2, Exposure energy E=70 µJ/cm². The present inventors have determined that these values can be used in conjunction with a measured or estimated reference beam power at (and normal to) the recording material Pr (in µW/cm²) and a measured or estimated object beam power at (and normal to) the recording material Po (in µW/cm²) to calculate a suitable effective exposure duration $t_{effective}$ (in seconds) for each sequential exposure recorded in materials similar to Agfa 8E56 using, for example, the following formula: $t_{effective}=E/(Po+Pr)$.

In the case of an image-planed or nearly image-planed copy (i.e., one in which the recorded holographic image straddles or is closely adjacent to the copy film plane) these object and reference beam power values should ideally be determined for the "hot-spot" (i.e., that point or vicinity on or near the surface of the copy recording material at which the highest object beam power is found). The object light generally recorded during mastering is more diffuse and is generally much more uniform at the recording film plane, and can generally be adequately characterized at the center of said film plane or at any other convenient location where the power of the diffused object light has a reasonably constant known or calculable relationship to the power at the center of said film plane. Similarly, the reference light recorded during mastering is generally quite uniform at the recording film plane and can generally be adequately characterized at the center of the recording film plane or at any other convenient location where the power of the reference light has a reasonably constant known or calculable relationship to the power at the center of the recording film plane.

For power measurement, one or more photosensors such as photodiodes or other light measuring or estimating devices or mechanisms may conveniently be located at convenient locations in the immediate vicinity of the recording film plane. A particularly advantageous such location is directly behind the recording film at or close to the center of the platen or other film holding device or mechanism: a photosensor in this location can be used prior to the introduction of photosensitive material, or, if the photosensitive material has a reasonable degree of transparency to the recording light (as does Agfa 8E56), such a photosensor may be used during a exposure as a power monitor or to rapidly set the beam ratio at the start of an extended exposure or to determine the desired exposure duration or cut-off time. Any such photosensor may be filtered so that it has little or no sensitivity to light not used to record the hologram (such as, for example, a photographic safelight) while retaining sufficient sensitivity to measure or estimate the power of the recording light: for example, the present inventors have determined that the photodiode from a Newport 918-SL sensor [Newport Corporation, Irvine, Calif.] placed behind an VG-14 filter [SCHOTT North America, Inc., Elmsford, N.Y.] and attached to a Newport 853 optical power meter works well for materials like the Agfa 8E56 recording material in conjunction with R20 safelights [Encapsulite International Inc., Sugar Land, Tex.], and any slight leakage sensed through the VG-14 filter can be allowed for as a calibration-offset when using metered values. Photosensors may also be located around the periphery of the recording material, where they may be used to check the pointing/uniformity of the reference beam, and the object and reference powers if the readings from two or more such photosensors are suitably averaged and calibrated.

The present inventors have determined that a suitable actual exposure duration $t_{actual}$ (in seconds) for copying to materials like Agfa 8E56 may be calculated using, for example, the empirical fifth-order polynomial formula disclosed above for mastering on Agfa 8E56 which compensates for reciprocity failure over approximately the range from $t_{effective}=0.02$ seconds to $t_{effective}=50$ seconds. As with mastering, excessive exposure durations may be limited using reference-boost, and the other noise-reduction techniques described herein for mastering may also be used for reduced-noise copying.

The present inventors have also determined that for sequential multiple-exposure mastering in materials like Agfa 8E56 as disclosed in Hart and herein these measurements, calculations, and related steps should generally be conducted with accuracies in the range of 5 to 20% to avoid undesirable effects such as significantly reduced signal or signal-to-noise ratio, whereas for single-exposure copying in materials like Agfa 8E56 greater leeway may be assumed such that copy beam ratios of as much as 4 or as little as 1 and copy beam exposure energies between 25 and 100 $\mu J/cm^2$ generally produce acceptable results in the context of the present invention. Multiple-exposure copying, as disclosed herein for the motion aspect of the present invention, is in many ways similar to multiple-exposure mastering and generally similar accuracies are desirable, and the best results have been obtained with ratios of approximately 2 and energies of approximately 70 $\mu J/cm^2$.

The present inventors find it advantageous to use vacuum platens to hold holographic recording materials during their exposure. For the color and motion aspects of the present invention, but also more generally, such platens or other film holding mechanisms are advantageously fitted with registration pins or surfaces or other means to achieve the accurate and repeatable positioning and orientation of recording material. For the motion aspect of the present invention such platens or other film holding mechanisms are advantageously fitted with rotating and indexed mechanisms such as pointers, indents, guides, cams, kinematic mounts, and motor-driven or manually driven rotating mechanisms to facilitate the accurate and rapid and reliable rotation, positioning, and orientation of recording materials.

Figure 16:
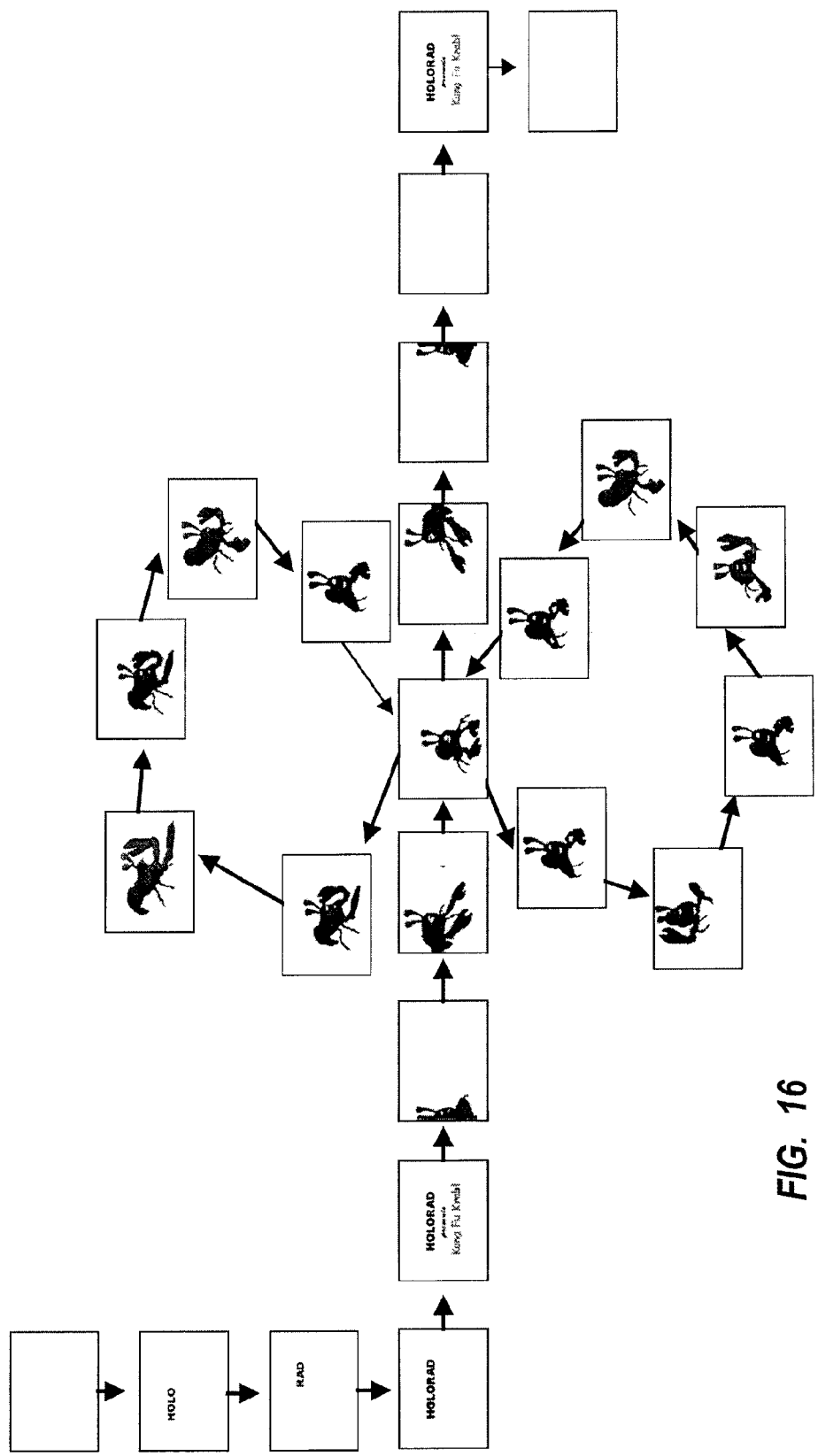

As an exemplary motion demonstration, the present inventors created a colorful animated crab-like character (FIG. 11), a three-dimensional cartoon character created and animated in Maya using about 5,500 texture-mapped polygons orthogonally rendered without specularity in a diffusely-lit environment without a background) and selected a series of eleven poses (FIG. 16) for this character which may be strung together in a number of different orders to cause the character to appear to make meaningful actions. For example, one such string of frames starts with the crab character in a neutral pose, facing forwards with claws lowered. This image is followed by one in which the crab appears to have started to jump upwards and swung his or her claws outwards with corresponding semi-realistic changes in the orientation and position of the crab's other bodily parts including the mouth, tail, and eyes. A further image in this series has the crab at the top of its jump. This image is followed with one more image as the crab descended back towards the neutral pose, and the overall sequence is completed with a repeat of the neutral pose. Similar sequences have been stitched together in a simulation environment which included stereophonic sound effects, enabling the crab character to perform a variety of actions such as, for example, entering or exiting stage left or stage right, twisting, jumping, and performing a karate chop. Short sequences of just three or four frames like this don't look choppy because for a credible motion (such as a character jumping) there is frame-to-frame content coherence ("coherence" in the Computer Graphics sense rather than the optical sense) to a sufficient degree that the visual perception is generally that of motion-blur rather than looking strobe-like.

Each of the eleven images was slabbed, sliced, feathered, shelled, had its back-faces culled, and was otherwise prepared for holographic recording as described above.

After recording, processing, and assembly into a suitable film/filter stack and display device, the holographic images are replayed in scripted or pseudo-random orders under the control of the external computer to tell respectively either a canned story or to show an arbitrarily active crab for an indefinite duration. The twelfth hologram position is used for an introductory/credit image with three-dimensional text and is shown at the start and end of the story or arbitrary crab-like activities.

For this motion demonstration's rotary motion mechanism the present inventors designed and had fabricated a high-precession "wheel" (FIG. 17) of approximately 18.2 inches diameter CNC milled out of a 2 inch thick plate of 6061-T6 aluminum with smooth radial and axial bearing surfaces which were post-polished and hard-anodized and mated to three radial air bearings [C325003, New Way Air Bearings, Aston, Pa.] and six axial air bearings [S102501, New Way Air Bearings] to provide stiff support with very little friction when operated using dry filtered compressed air at approximately 80 psi from a Husky Q19 compressor [Campbell Hausfeld, Harrison, Ohio] fed through a filter chain consisting of an SMC AW20 moisture/particle filter, an SMC AFM20 bulk oil filter, and an SMC AFD20 fine oil mist filter

Figure 17:
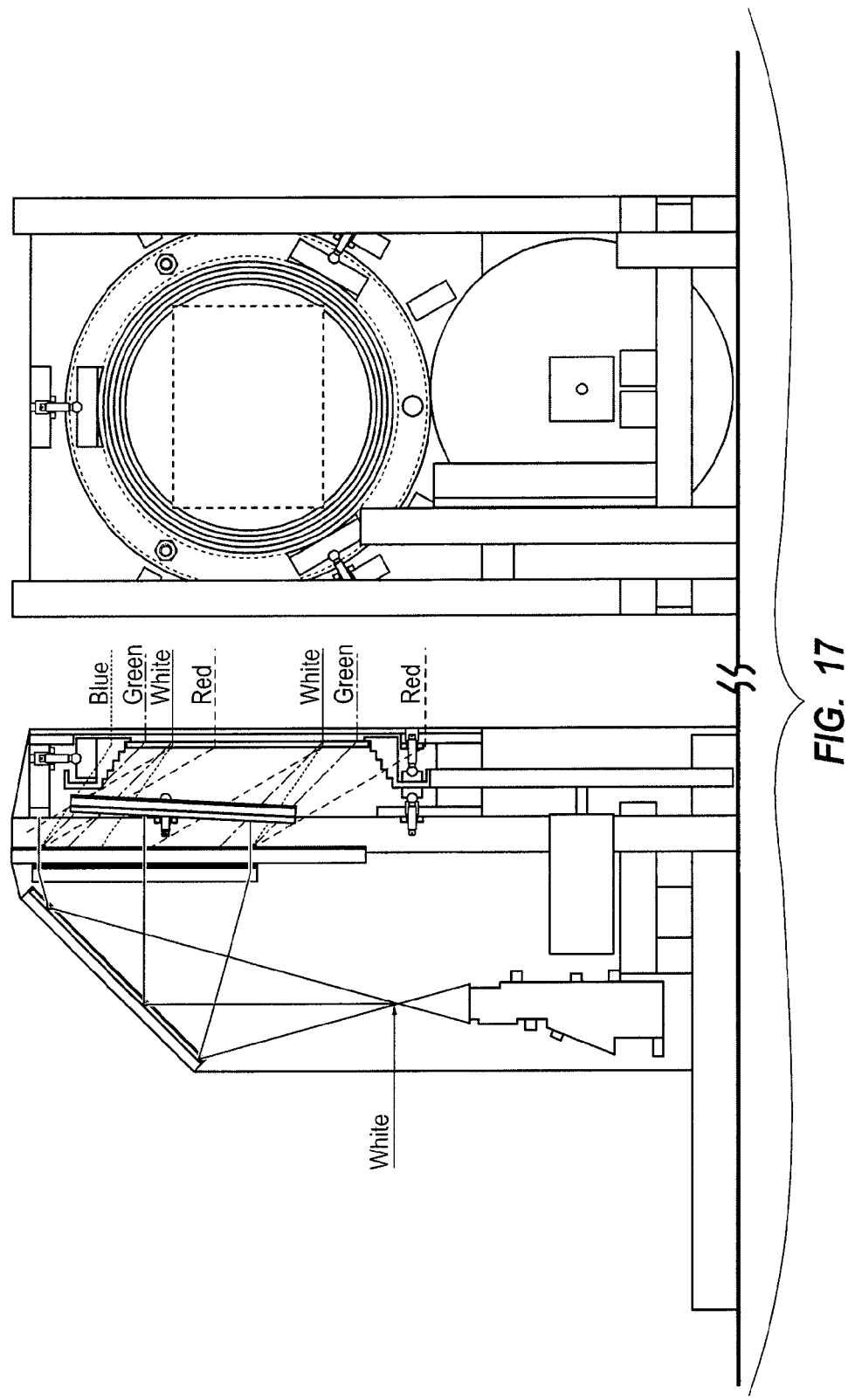

[SMC Corporation of America, Indianapolis, Ind.]. A further radial bearing surface is incorporated in this wheel which is used to drive the wheel's rotation via friction contact with a custom-made large smooth plastic drive wheel of approximately 12 inches diameter (FIG. 17), itself driven by a variable speed DC motor [59835K62, McMaster-Carr Supply Company, Los Angeles, Calif.]. Speed of rotation is monitored with a peripheral track of black and white marks as previously described, and controlled by varying the current to the drive motor using a variable DC power supply [Mastech HY3050E, Acifica, Inc., San Jose, Calif.] operating in constant-current mode at approximately 8 Amps. Contact force between the aluminum wheel and the drive wheel is adjusted via a lockable turn-buckle mechanism. Spin-up and spin-down times are on the order of minutes, and operational speed may thus be monitored and maintained manually without significant deviations from the intended speed, any slight variations being sensed via the microcontroller through the monitoring mechanism so that it adjusts the illuminant flash timings to match. A circular hole was cut through the center of the wheel with provision made (in the form of a lip and holding blocks) to retain a film/filter stack at the wheel's front, sandwiched between two approximately ⅛ inch thick transparent acrylic disks, and the rear inner side of the wheel was given a stepped profile to permit angled replay reference light to illuminate a significant portion of the central region of said film/filter stack (FIG. 17). It may however be more advantageous to design such a wheel so that its film/filter stack can be removed and replaced from the front.

Care is taken to achieve good registration between the images on each film as they were holographically recorded, and between the films as they were assembled into the film/filter stack: any significant misregistration in the case of a motion hologram as described in the context of the motion aspect of the present invention can lead to a noticeable and generally detrimental visual oscillation in which as the wheel spins the artifacts due to misregistration vary cyclically from one edge of the imagery to the opposite edge, and if the center of rotation in the wheel is not well aligned with the center of rotation in the holograms then the entire imagery has superimposed upon it a circular translation in the plane of the films (though this later effect may not be particularly noticeable for rapidly-animated parts of the imagery, it may cause a potentially significant blurring of any stationary or slowly-animated parts).

The wheel with its bearings and drive is mounted substantially vertically onto a framework of custom cut 45 mm square-profile aluminum extrusion [FMS, Bosch Rexroth Corporation, Hoffman Estates, Ill.] to which also is attached the Samsung/Luminus illumination source (as previously described, but with the LEDs operating in series, pulse-width modulated at approximately 23.2 Volts provided by a Mastech HY3050E DC power supply [Precision Mastech Enterprises Co., Kowloon, Hong Kong] operating in constant-voltage mode) and a fold mirror to direct light from this source on to a stationary assembly of a 10.5 inch square 19 inch focal length acrylic Fresnel lens [catalog item #51, Fresnel Technologies, Inc., Fort Worth, Tex.] and other materials repurposed from a Model-22 Voxbox display including a holographic grating and two sheets of 3M LCF all substantially as previously described above in the discussion of the demonstration of the color aspect of the present invention (FIG. 17). The whole optomechanical assembly is normally enclosed within black-painted approximately ⅛ inch plywood skins attached to the FMS framework, with an approximately circular hole in the front skin into which is fitted the front of the aluminum wheel behind a ¼ inch thick transparent acrylic plate for safety. Two sheets of LCF are used with an air gap of approximately ¼ inch between them because the present inventors have observed that a single sheet of LCF used in this manner is often inadequate due to the presence of pinholes and other defects and non-uniformities (problems which are easily avoided in the manufacture of Voxblock material as described below) and because if 3M LCF is adjusted to optimally transmit the green replay reference then the red replay reference, which in this demonstration device generally passes through at a steeper angle, is in part reflected off the top side of the slats within said LCF and propagates towards the hologram observer resulting in a comparatively bright red background upon which the hologram is observed (this problem does not occur with Voxblock material): a second sheet of LCF is disposed to catch this reflected red light and it is unlikely that pinholes or uniformities in one sheet are aligned with similar defects in the other sheet so that the combination of two sheets can render such defects substantially less significant. The LCFs, the grating, the Fresnel, and the fold mirror were all held in tiltable frames (black Sectional Metal Frame Kit [Michaels, Irving, Tex.]) so that the effect of tilting them in various combinations can be investigated and a satisfactory optimum tilting was determined experimentally. In a design such as this the different dispersion-compensated reference angles for each color reference beam cause the area over which all such beams are available to light hologram films to shrink as any gap between the diffraction grating and said films is increased. Hence it is advantageous to minimize any such gap, which in this demonstration is achieved by inserting the entire LCF assembly into the wheel's central opening and positioning the diffraction grating as close to the rear of the wheel as is felt to be adequately safe.

Figure 18:
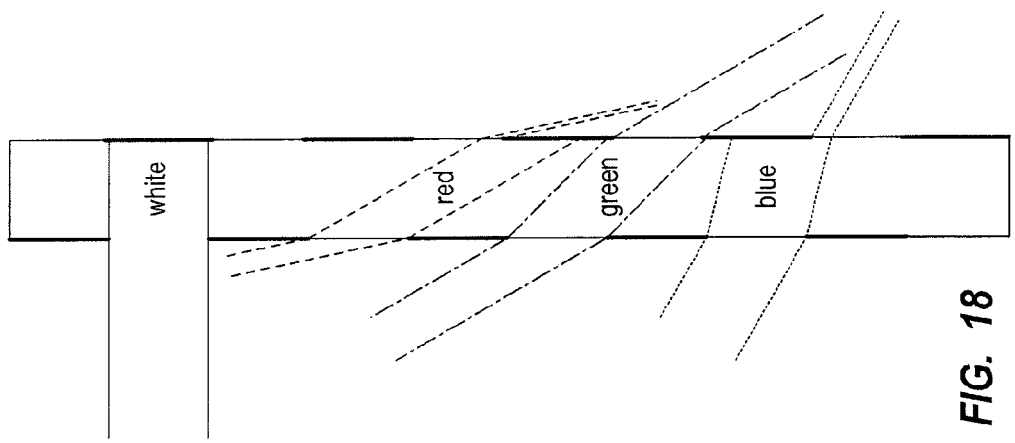

The inherent advantages of Voxblock material when compared with 3M's LCF arise because of their very different internal structures. LCF is constructed somewhat like a miniaturized venetian blind. The slats of this internal structure are substantially opaque (though often inadequately opaque due to inadequate optical density within the slats and the occasional presence of pinholes, rips, or other defects in these slats) and, in 3M's angled LCF materials, these slats are positioned at a somewhat tilted angle (and, unfortunately, generally rather an inconstant angle, typically specified as ±8°) with respect to the outer surfaces of the LCF sheet so that light can pass through at an angle between the slats relatively unimpeded, but light which falls substantially normally incident upon the sheet is intercepted by the slats and is substantially absorbed (though a portion of it, especially of the red component of such light in the case of LCF used to implement Bazargan's device, reflects and scatters off the slats and escapes through the LCF sheet at unintended and somewhat scattered angles). Voxblock material consists of two planar layers, which are separated by a thin and substantially constant thickness of substantially transparent material, and which each bear a pattern of parallel opaque lines with substantially transparent spaces between these lines (FIG. 18 shows an example in cross-section). The opaque lines on each layer run substantially parallel to those on the other layer but are offset so that when the combined layers are viewed normally (i.e., from a direction perpendicular to their plane) the opaque lines in one layer lie over and thus cover the transparent lines in the other layer, and vice versa. The opaque lines are slightly wider than the transparent lines, so the combined effect of the two layers is to block essentially all light incident normally upon either layer (ignoring a very small proportion of such light which diffracts around the edges of the lines), whereas light incident on either layer at off-normal angles can in part pass through the transparent lines of both layers and thus be transmitted through the Voxblock. The average transmittance of light through a sheet of such Voxblock cannot exceed one half because at least one half of it may be intercepted by the opaque lines. But in practice Voxblock suitable for the present invention is very easy to make (as is described below) whereas 3M's LCF appears to be very difficult to make to the extent that when one allows for its variations inter-sheet and intra-sheet, and the resulting use of two sheets in the context of certain embodiments, it is the experience of the present inventors that the actual transmittance of Voxblock in the context of the present invention is generally quite similar to that of LCF.

Voxblock may easily be manufactured by first using a conventional printing or photographic technique, such as, for example, inkjet printing or laser printing, to print or record on to a thin substantially transparent plastic sheet a first pattern of parallel substantially opaque lines. A suitable sheet thickness is, for example, approximately $6/1000$ inch, and sheets of suitable polyester of this thickness are easily available with high uniformity and excellent optical quality [e.g., Mylar®, DuPont Teijin Films U.S. Limited Partnership, Hopewell, Va.]. A suitable width for the opaque lines is, for example, approximately $12/1000$ inch, and a suitable width for the transparent spaces between the opaque lines is also, for example, $12/1000$ inch. Next, under photographic darkroom conditions, a sheet of photographic film is laminated or otherwise fastened or sandwiched on to the un-printed side of the first sheet, using, for example, an optical quality lamination adhesive which is pressure or thermally activated or optically activated by a wavelength range of light which does not create a latent image in the photographic film, and with the photosensitive layer on the outside. A suitable photographic film is a very high-contrast ("lith") negative film coated on an approximately $6/1000$ inch thick polyester substrate such as, for example, Camera 2000 CGP [Eastman Kodak Company, Rochester, N.Y.]. Next, the opaque lines printed upon the first sheet are contact printed into the photographic film using substantially collimated light incident substantially normally upon the first sheet, and the laminated sandwich comprising the first sheet and the photographic sheet is photochemically processed so that the exposed areas of the photographic sheet become substantially opaque and the unexposed areas of the photographic sheet stay substantially transparent. The desirable small overlap between the printed lines on the first sheet and the photographically created lines on the second sheet naturally occurs due to diffraction of a small proportion of the collimated light around the printed lines, but the photographically printed lines have quite sharp edges because of the inherent high contrast of lith film. Any pinholes or other somewhat transparent defects in the printed pattern are automatically matched to slightly larger corresponding substantially opaque areas in the photographically created negative image of the printed pattern, and similarly any substantial deviation from parallelism in the printed lines is automatically substantially matched in the negative image: hence substantial errors and defects in the original line pattern can be tolerated. If the optical density of the original line pattern is unsatisfactory an intermediate contact copy of it can be made in positive or negative lith film without the lamination step, and the copied pattern (or negative thereof) on this intermediate film exhibits the high optical density characteristic of lith films so that this intermediate copy can be used in place of the first film.

The angle dependent behavior of Voxblock made in this way can easily be calculated, allowing for the refraction of light into and out of the various layers, and can be tuned for a wide range of performance characteristics by varying the line width and spacing and by selecting photographic films, plastic sheets, and lamination materials of different thicknesses, or, if desired, by reversing the first sheet so that its printed surface is towards the inside of the sandwich. An experimental sheet of Voxblock can easily be manufactured in which the performance varies across the sheet, and such a sheet was used to select optimal Voxblock manufacturing parameters for the present inventors' applications.

Voxbox displays with larger illuminated areas than the approximately 12 inch by approximately 13½ inch area of the Model-22 can be constructed using larger optics at the front, including a larger Fresnel lens collimator, a larger diffraction grating, and a larger Voxblock sheet, or a plurality of these front optics can be assembled in a tiled array built up from smaller parts or a mix of small and large parts such, for example, a large collimator followed by a first layer consisting of one or more tiled arrays of smaller diffraction gratings followed by a second layer consisting of one or more tiled arrays of Voxblock sheets. In the case of tiled front materials, the rear part of such a Voxbox display can be a large monolithic system in which a single light source illuminates the front materials, or these rear parts also can be tiled such that an array of multiple light sources lights the front material. This later case can be equivalent to a tiling of multiple entire Voxbox displays to construct a large illuminated area from a collection of smaller illuminated areas each provided by one small Voxbox display, in which case it is generally advantageous to construct said small Voxbox displays with narrow, vestigial, or absent unlit edges so that a joint-free illumination can be achieved and it may be advantageous to share electrical, control, and cooling means between the collection of smaller Voxbox displays.

Via their color motion demonstration the present inventors have made certain observations and conclusions, such as for example the previously detailed values for minimal and sufficient flicker rate. To achieve these rates without the crab seeming to move unreasonably rapidly, the present inventors implemented the following additional features: in general, frame sequences are selected in which each frame (and hence each pose of the crab) is repeated two or more times (experimentally, even four or five repetitions can be used judiciously without the crab appearing to have frozen or died); to smooth out such repeating patterns in motion sequences, sometimes one or more repeats of the previous image in a sequence is inserted, and the resulting blurring of the crab's motion provides a beneficial smoothing effect to the overall motion; to provide an extended duration to the crab's story it is desirable to have also a no-crab frame which is displayed when the crab is off stage (as is indicated to the observer by corresponding off-stage stereophonic sound effects and music) and since this was not anticipated in the design of the eleven crab frames, a frame of the crab's enter-stage-left sequence is used in which fortuitously almost no crab is visible. It is generally not sufficient to simply disable the illumination to achieve an empty frame because such an unlit frame typically looks very different from the background of the other frames which typically contain at least some noise light, however a fade-down-to-black and a fade-up-to-black is practical in which the illumination is respectively ramped down or up while, for example, a neutral image is displayed such as the crab character's neutral pose or the textual frame.

In addition the present inventors have determined that it is possible to flash or pulse the three color illumination sources either all together, or in an interleaved pattern wherein only one color is on at any particular time, the interleaved color pulses either occurring back-to-back or being timed to be evenly distributed throughout the rotation of the motion mechanism. In the later case (even distribution of single-color pulses) the flicker rate seems to be increased, which is beneficial, however in general this timing sequence introduces a problem in that an additional fixed rotational displacement is included between the three color films (an approximately 3° addition for the G films and approximately 6° for the B film in the present inventors' demonstration) so that each individual color image is correctly in place when its illuminant flashes, but, since in this demonstration example a full 30° of rotation is desired for an image to pass from visible to invisible and the next image to pass from invisible to invisible, such a timing sequence results in colored ghost images which appear to lead and lag the intended image.

To avoid sudden large changes in frame rate, even if the next frame in an image sequence is also the next frame disposed angularly upon the film, it is advisable to make one full rotation plus one frame to get to that next frame (in our case, that is to rotate 390°). Similarly, if the next frame in the image sequence is one half way around the film it can be accessed upon either a half or one-and-a-half rotations. In this way the angular increment between frames as displayed may be constrained to always be between one half and one full rotation and hence to vary by a factor of only at most 2:1, whereas if this procedure is not adopted the frame rate could vary by as much as, in our example, 12:1 which results in a stuttering appearance for the holographic motion.

The present inventors distributed twelve frames for the crab movie angularly upon hologram films in an actual (rather than an as accessed) order such that wherever possible the immediately preceding and following images adjacent to any particular image are such as to form a reasonable sequence of actions for the crab character, even if not one of the sequences that would be performed when the crab is animated as intended. This ensures that in so far as an off-axis observer is able to see such previous or following images, which possibility depends upon various factors including the inter-frame angular separation, the degree of Bragg selectivity available, the holographic viewing angles of each frame, and the position of any such observer, the sequence of actions seen in any such off-axis sequence also tells a sensible story.

As described above, accessing twelve frames on a device rotating at something like 16 to 24 Hz without incurring unacceptable degrees of rotational blurring (which blurring should be included as an effect in the simulation environment) necessarily results in a low duty cycle for the illuminants and hence a comparatively dim image. One way to address this dimness is to decelerate the rotating mechanism as it approaches the desired position for a frame and then accelerate it back up to speed to seek the next frame. This involves extreme rates of acceleration and deceleration unless it is achieved using an optical image rotator, however a number of mechanisms may be used disposed around the rotating mechanism to accelerate and decelerate an additional (ideally lower mass) second moving element which itself holds the film/filter stack of the present invention. Suitable mechanisms can include, for example, any of a variety of mechanical linkages and cam-based mechanisms which can impart non uniform motion when driven by a uniform motion, for example Zeeman's Catastrophe machine (ZCM) or the "reciprocating rectilinear motion" device probably due to Henry T Brown (described in his 1868 book "Five Hundred and Seven Mechanical Movements") or a spring or spring-like mechanism operating in an approximation of simple harmonic motion.

Occlusion

Summary: Embodiments include fully or selectively removing "hidden surfaces" from multiple-slice holographic imagery.

As described above, component holograms produced in the context of the present invention may incorporate features such as back-face culling, shelling, and feathering to minimize or hide or conceal the effects of volume pileup between multiple recorded slices, with a caveat that in some cases, such as the clinical data anticipated in Hart, it may be advantageous to achieve the ghostly appearance (in which inner objects and details and the rear parts of objects and details may be seen through outer and front objects and details) which in the general case results from volume pileup, and a second caveat that comparatively uniform and well placed volume pileup which results from, for example, shelling, can be advantageous in brightening the holographic image. In Computer Graphics terminology, the presence of volume pileup may be described as a failure to achieve hidden surface removal (also known in optics terminology as occlusion) at least from those viewpoints into the resulting hologram from which said volume pileup is noticeable. As a third aspect the present invention includes systems and methods for substantially or completely eliminating or mitigating the potentially undesirable effects of volume pileup, and the corresponding dark banding (as described above) which occurs where slices should, but do not appear to, touch or overlap, while generally retaining the present invention's other advantages.

Lack of occlusion in the holograms of the present invention as so far described results from the fact that, as so far described, during the recording of each sequential exposure substantially the whole of the front of the diffusing screen of Hart is visible across substantially the whole of the recording surface of the recording material, and hence parts of the recorded images which desirably should not be visible from one or more regions of the recording material (i.e., which should be occluded or hidden by other parts of the composite holographic image when seen through said region or regions of the recording material) are visible. This may be prevented, and hence occlusion may selectively be introduced into the holograms, by providing a mechanism or means by which light from those parts of a constituent slice which should not be recorded over a certain region or regions of the recording material are blocked from reaching said region or regions of the recording material by the interposition of a selectively present or removed substantially opaque material or by providing a mechanism or means by which light from those parts of a constituent slice is altered such that even though it does reach said region or regions of the recording material it is not (or is not substantially) there recorded, for example because the provided occlusion mechanism or means has changed its direction, intensity, wavelength, or polarization to such a degree that it does not significantly or sufficiently interfere with the reference beam in said region or regions of the recording material.

Figure 19:
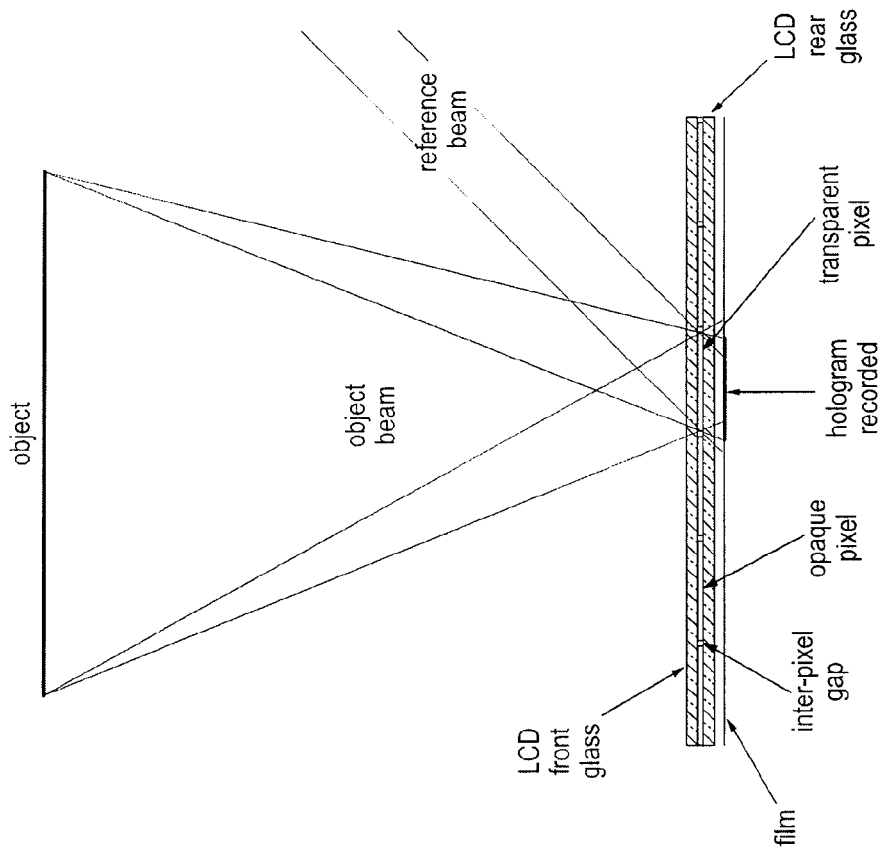

An example mechanism of the opaque kind is a patterned or shaped mask which closely overlays the recording material, blocking the object and/or reference light from reaching those regions where object light is not to be recorded. An example of the altering mechanism is a patterned or shaped polarization-controlling waveplate which rotates the polarization and/or intensity of the object and/or reference light destined to reach those regions where object light is not to be recorded. Such mechanisms may be provided by, for example, interposing a pixelated or otherwise patterned transmissive LCD screen between the diffusing screen and the recording material wherein the pixels or other patterns of said LCD may be electrically or otherwise switched between a substantially transparent and a substantially opaque state (an opaque kind of mechanism) or between states which impart a variable (including potentially a negligible) alteration in the transmission of polarized light (an altering mechanism). Such an LCD screen may thus selectively prevent recording over any desired region or regions of the recording material in a switchable and addressable manner (FIG. 19).

Suitable LCDs include, for example, the series of large grayscale LCDs manufactured by NEC such as, for example, the NL205153BM21-01 [NEC Electronics America, Inc, Santa Clara, Calif.], or such grayscale LCDs as are used in RGB-LED (or laser) illuminated color-sequential direct-view LCD monitors and televisions such as, for example, the Sony XBR8 [Sony Corporation of America, New York, N.Y.]. Alternatively LCD panels in which each sub-pixel has a specific color (such as red green and blue or red green blue and white) may be used, though in general with a single color of laser light used to record holograms through such a color-filtered LCD light is substantially transmitted through only one or two of the sub-sets of pixels (for example the green or the green and white sub pixels if a green laser is used). In any case, parallax effects dictate that any such LCD should ideally be positioned close to the recording material so that any given pixel of the LCD can influence both the object and the off-axis reference light for a pixel-sized region of the recording material.

For any particular opaque shape or pattern, the effect of such an LCD may be emulated by a mechanical mask such as, for example, a sheet of black card cut into the desired shape or pattern. Similarly, for any particular altering shape or pattern, the effect of such an LCD may be emulated by an optical mask such as, for example, a sheet of plastic waveplate material cut into the desired shape or pattern. Such mechanical or optical masks may be prepared or provided as needed for each sequential exposure, and may be interchanged for each such exposure manually or via an automatic mechanism.

A recording material with for example a very high index modulation capacity (such as DCG) or a very non-linear response (such as a silver-halide emulsion processed to a very high contrast) may record individual masked exposures sufficiently well even if only the reference beam is so masked. This can be achieved, for example, using a small transmission or reflection LCD panel inserted upstream into the reference beam in which case this mask need not be positioned close to the recording material. Such spatial modulators of beam intensity or polarization can also be used to adjust the local brightness or polarization of the reference and/or object beam across the surface of the recording material to better match the effective power of the reference and object beams at the recording surface to more closely achieve the desired beam ratio and exposure energy from point to point across the recording surface during mastering and/or copying.

To implement the occlusion aspect of the present invention it is necessary to calculate or otherwise determine the specific shape or pattern of masking of the recording material desired for each sequential exposure and the specific image content which is to be recorded for each such sequential exposure through each such shape or pattern of masking. For example, the desired image content may be computed by executing a conventional computer-graphics visibility algorithm for each addressable pixel or pattern offered by the exemplary LCD, such visibility algorithms including, for example, a ray-tracing algorithm or a painter's algorithm. The corresponding masking or alteration desired for any specific exposure is then just the collection of those LCD pixels or other sub-areas for which the visibility algorithm indicates identical or sufficiently similar image content. Alternatively the image content may be treated as comprising small subdivisions such as, for example, flat polygonal subdivisions or NURBS (and said content may even have been created in this fashion), and each such subdivision may be computationally projected onto the area of the recording material defining two areas or regions of the recording material, specifically a first area or region in which the subdivision is to be visible, and a second area or region in which it is not to be visible (or, in the case of double-sided subdivision, a first area where one side of the subdivision is to be visible and a second area in which the other side of the subdivision is to be visible). Such tilings of the area of the recording material may then be combined to compute a suitable set of masks for each exposure along with a list or other collection of polygon faces which are to be visible through each so calculated region of the mask.

Figure 20:
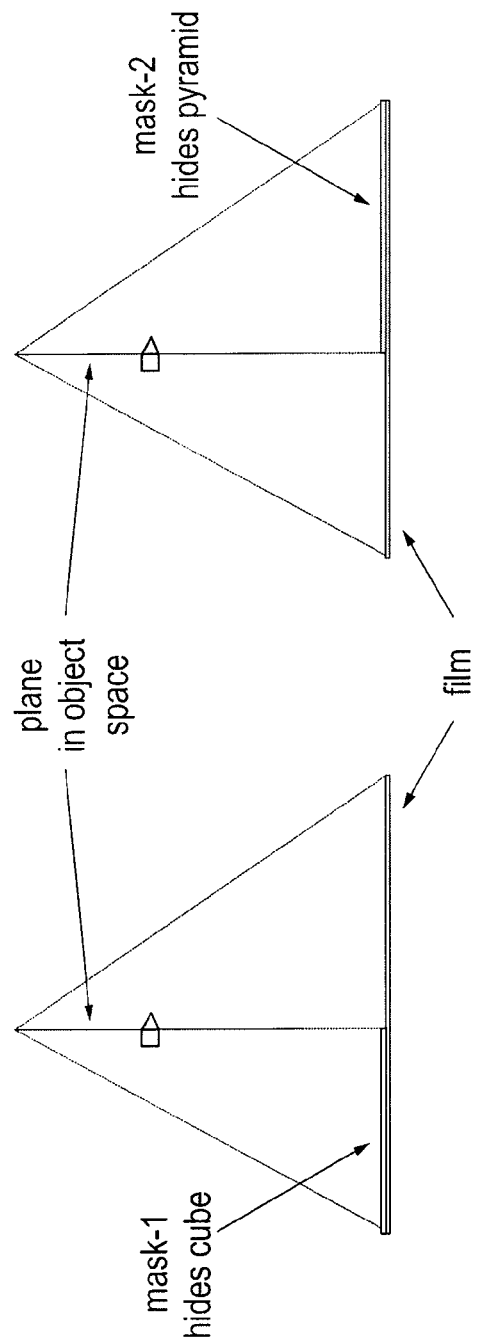

A very simple case is a double-sided plane in the holographic content which has a first pattern on its first side and a second (different) pattern on its other side. If this plane is positioned perpendicularly to the holographic recording material, then a first region of said recording material should see and record only the first pattern on the first side of the plane, and the remainder of the holographic material (forming a second region) should see and record only the second pattern on the second side of the plane (FIG. 20). A correct holographic recording of this content can be obtained by masking said second region of the recording material while recording content showing only said first pattern on said first side of the plane, and then masking said first region of the recording material while recording content showing only said second pattern on said second side of the plane.

In the most general case every pixel of the exemplary LCD acts as a separate mask in which every other pixel is suitably blocked or altered and every such pixel uses a separate exposure for each recorded z-depth in the composite hologram for which said exposure a different selection of image content is projected on the diffusing screen. Thus an LCD pixelated as X by Y pixels when combined with Z discrete image depths may use as many as X*Y*Z masks and image-content calculations and exposures. However the present inventors have determined that in general there is a great degree of similarity between the image content for each such exposure, and such "coherence" (in the computer graphics sense) may be exploited to reduce the number and/or accuracy of computations used, and in general the LCD pixels may be grouped into a smaller number of larger regions over which the same or substantially the same sub-set of image content polygons are substantially to be visible, which also may be exploited to reduce the number and/or accuracy of computations used and to reduce the number of exposures that are used.

Figure 21:
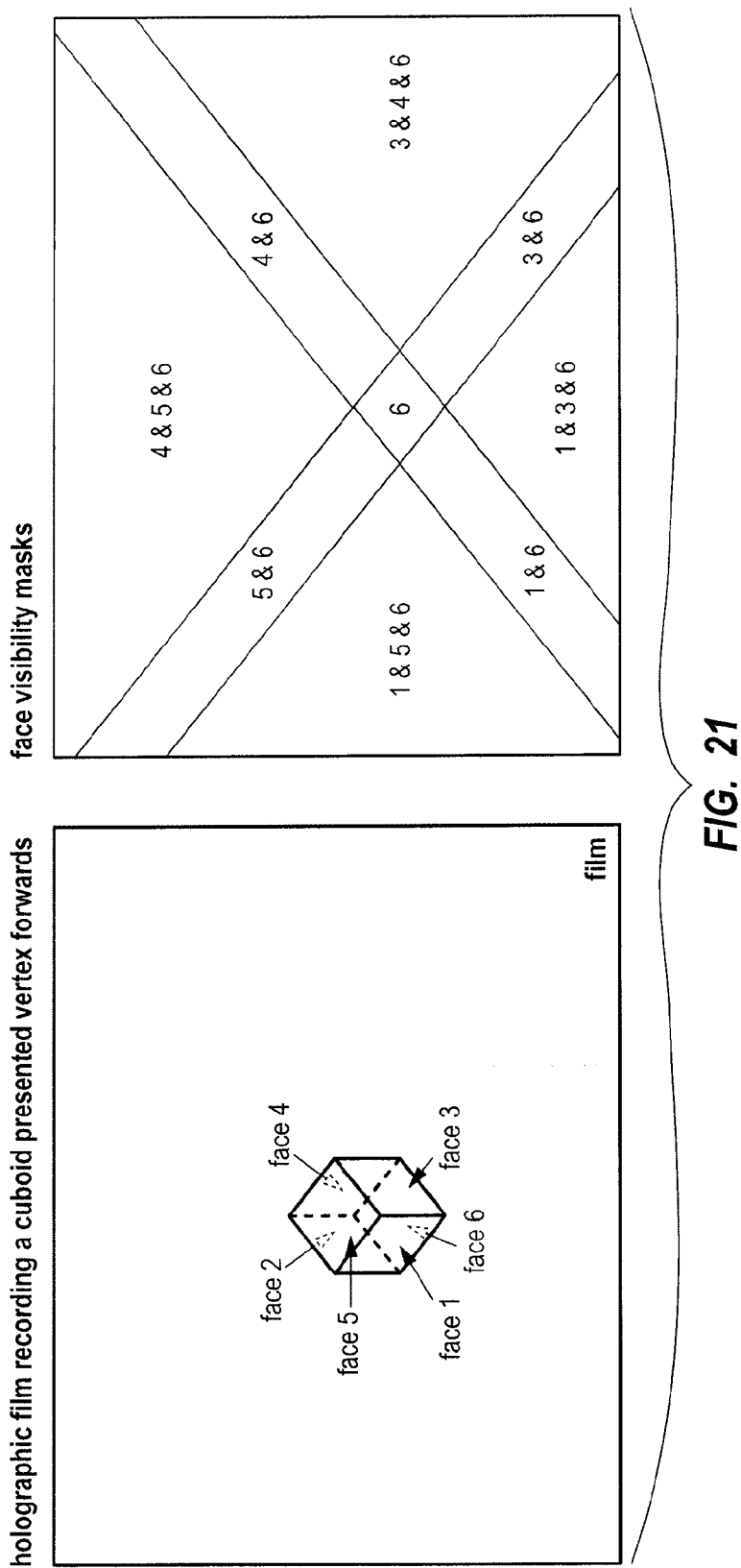

An example of intermediate complexity may help clarify the scope and extent of these reduced computations and exposures. Consider a hologram of a cube or other six-faced rectilinear three-dimensional object. Irrespective of how it is to be oriented relative to the recording material, at most five of its faces are visible from said recording material, and commonly only three faces are so visible. The three-dimensional position of each such face defines a line separating two sub areas of the recording material as described above for the single-plane example. Hence in the case in which five faces are so visible, the area of the recording material may be divided into at most nine sub regions (FIG. 21). Hence at most nine masks are sufficient rather than X*Y masks, and for each such mask at most Z exposures are used since any given combination of faces visible to any such masked area may occupy fewer than the entire available Z depth values. Rather than using X*Y*Z masks and exposures, this example uses at most nine masks and at most 9*Z exposures of the recording material and hence at most 9*Z images have to be calculated for the diffusion screen. Hence the computational cost and the number of exposures used for this special case is only approximately nine times what would be used without occlusion. In general the present inventors have estimated that holograms of many desired objects and scenes may be produced with satisfactory occlusion using only a few tens or hundreds of times as many visibility computations and exposures as would be used for a hologram of the same object or scene recorded without occlusion. Further, back-face culling, shelling, and feathering as described above can be combined with occlusion to further reduce the number of computations and exposures. The methods described above in the context of the motion aspect of the present invention for efficiently and cost effectively making many exposures can also be used for this occlusion aspect of the present invention.

A further advantage of the occlusion aspect of the present invention is that it permits the recording of holograms which exhibit or simulate partial transparency, and viewpoint-dependent changes of content or its appearance such as, for example, specular reflections and glints (which are generally seen via the stereoscopic disparity between such specularity as seen from the viewpoints of each eye).

Given that in general the pixels of a masking LCD as described above can be switched much more rapidly than the diffusion screen of the present invention can be moved between discrete z-values, in general it is faster to proceed with the occlusion aspect of the present invention in a depth-last fashion such that the diffuser to recording material separation is set to a first z-value, each occluded exposure for that said first z-value is made, and then the diffuser to recording material separation is set to a second z-value for each occluded exposure for that said second z-value, and so forth for each desired z value. On the other hand a depth first approach may be more desirable if, for example, a manually interchanged set of occlusion masks is utilized in which case changing through the set of z-values in depth-first series may well be achieved more rapidly or more conveniently than the act of changing between such masks repeatedly for each z-value.

Although the present invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims. While the steps outlined above represent a specific embodiment of the invention, practitioners will appreciate that there are any number of mechanisms and processes and computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, desired, or essential features or elements of any or all the claims of the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, acts, or equivalents for performing the functions in combination with other claim elements as specifically claimed.

We claim:

1. A method for producing and replaying a composite color hologram, the method comprising:
    recording a first hologram containing primarily content of a first primary color of an intended composite hologram;
    recording a second hologram containing primarily content of a second primary color of the intended composite hologram;
    recording a third hologram containing primarily content of a third primary color of the intended composite hologram;
    transmitting, using a first filter, at least a portion of wavelengths close to the first primary color at a broad range of angles about an intended viewing angle of the intended composite hologram;
    blocking, using the first filter, at least a portion of wavelengths close to the second primary color at a broad range of angles about an intended viewing angle of the intended composite hologram;
    blocking, using the first filter, at least a portion of wavelengths close to the third primary color at a broad range of angles about an intended viewing angle of the intended composite hologram;
    blocking, using the first filter, at least a portion of wavelengths close to the first primary color at angles close to a replay reference angle of the second hologram for the first primary color;
    blocking, using the first filter, at least a portion of wavelengths close to the first primary color at angles close to a replay reference angle of the third hologram for the first primary color;
    transmitting, using the first filter, at least a portion of wavelengths close to the second primary color at angles close to a replay reference angle of the second hologram for the second primary color;
    transmitting, using the first filter, at least a portion of wavelengths close to the third primary color at angles close to a replay reference angle of the third hologram for the third primary color;
    transmitting, using a second filter, at least a portion of wavelengths close to the first primary color at a broad range of angles about an intended viewing angle of the intended composite hologram;
    transmitting, using the second filter, at least a portion of wavelengths close to the second primary color at a broad range of angles about an intended viewing angle of the intended composite hologram;
    blocking, using the second filter, at least a portion of wavelengths close to the third primary color at a broad range of angles about an intended viewing angle of the intended composite hologram;
    transmitting, using the second filter, at least a portion of wavelengths close to the third primary color at angles close to the replay reference angle of the third hologram for the third primary color;
    blocking, using the second filter, at least a portion of wavelengths close to the second primary color at angles close to a replay reference angle of the third hologram for the second primary color;
    assembling the holograms and filters as the intended composite hologram in the order first hologram, first filter, second hologram, second filter, third hologram; and replaying the composite hologram using a light source of the first primary color incident upon the assembly only at angles close to a replay reference angle of the first hologram for the first primary color,
a light source of the second primary color incident upon the assembly only at angles close to the replay reference angle of the second hologram for the second primary color, and a light source of the third primary color incident upon the assembly only at angles close to the replay reference angle of the third hologram for the third primary color.

2. The method of claim 1, wherein recording the first hologram comprises recording with a relative x-scale of approximately 1.0, a relative y-scale of approximately 1.0, and a relative z-scale of approximately 1.0, recording the second hologram comprises recording with a relative x-scale approximately 1.0, a relative y-scale of approximately 1.0, and a relative z-scale of approximately $\lambda b/\lambda g$, and recording the third hologram comprises recording with a relative x-scale of approximately 1.0, a relative y-scale of approximately 1.0, and a relative z-scale of approximately $\lambda r/\lambda g$, wherein $\lambda r$, $\lambda g$, and $\lambda b$ are respectively the dominant wavelengths of the red, green, and blue holograms as replayed.

3. The method of claim 1, wherein the replaying the composite hologram further comprises replaying a green light source for the first hologram at a replay reference angle Refg, replaying a blue light source for the second hologram at a replay reference angle Refb of approximately $\arcsin(\sin(\text{Refg})*\lambda b/\lambda g)$ and replaying a red light source for the third hologram at a replay reference angle Refr of approximately $\arcsin(\sin(\text{Refg})*\lambda r/\lambda g)$, wherein $\lambda r$, $\lambda g$, and $\lambda b$ are respectively the dominant wavelengths of the red, green, and blue holograms as replayed, and wherein the replay reference angles are measured with respect to a normal to a surface.

4. The method of claim 1, wherein at least two of the first hologram, the second hologram, and the third hologram are recorded with substantially the same recording reference beam wavelength.

5. The method of claim 1, wherein at least two of the first hologram, the second hologram, and the third hologram are recorded with substantially the same recording reference beam angle.

6. The method of claim 1, wherein at least two of the first hologram, the second hologram, and the third hologram are replayed with substantially the same replaying reference beam angle.

7. The method of claim 1, wherein at least one of the filters is a dichroic filter.

8. The method of claim 1, wherein at least one of the filters is a holographic filter.

9. The method of claim 1, wherein at least one of green content, blue content, or red content is spatially distorted prior to its recording such that it substantially overlaps with at least one other of the green content, the blue content, and the red content during the replaying of the composite hologram.

10. The method of claim 1, wherein at least one of a green light source, a blue light source, or a red light source is temporally modulated during the replaying of the composite hologram.

11. The method of claim 1, wherein at least one of a green light source, a blue light source, or a red light source is spatially modulated during the replaying of the composite hologram.

12. A system for producing and replaying a composite color hologram, the system configured to:
record a first hologram containing primarily content of a first primary color of an intended composite hologram;
record a second hologram containing primarily content of a second primary color of the intended composite hologram;
record a third hologram containing primarily content of a third primary color of the intended composite hologram;
transmit, using a first filter, at least a portion of wavelengths close to the first primary color at a broad range of angles about an intended viewing angle of the intended composite hologram;
block, using the first filter, at least a portion of wavelengths close to the second primary color at a broad range of angles about an intended viewing angle of the intended composite hologram;
block, using the first filter, at least a portion of wavelengths close to the third primary color at a broad range of angles about an intended viewing angle of the intended composite hologram;
block, using the first filter, at least a portion of wavelengths close to the first primary color at angles close to a replay reference angle of the second hologram for the first primary color;
block, using the first filter, at least a portion of wavelengths close to the first primary color at angles close to a replay reference angle of the third hologram for the first primary color;
transmit, using the first filter, at least a portion of wavelengths close to the second primary color at angles close to a replay reference angle of the second hologram for the second primary color;
transmit, using the first filter, at least a portion of wavelengths close to the third primary color at angles close to a replay reference angle of the third hologram for the third primary color;
transmit, using a second filter, at least a portion of wavelengths close to the first primary color at a broad range of angles about an intended viewing angle of the intended composite hologram;
transmit, using the second filter, at least a portion of wavelengths close to the second primary color at a broad range of angles about an intended viewing angle of the intended composite hologram;
block, using the second filter, at least a portion of wavelengths close to the third primary color at a broad range of angles about an intended viewing angle of the intended composite hologram;
transmit, using the second filter, at least a portion of wavelengths close to the third primary color at angles close to the replay reference angle of the third hologram for the third primary color;
block, using the second filter, at least a portion of wavelengths close to the second primary color at angles close to a replay reference angle of the third hologram for the second primary color;
assemble the holograms and filters as the intended composite hologram in the order first hologram, first filter, second hologram, second filter, third hologram; and
replay the composite hologram using a light source of the first primary color incident upon the assembly only at angles close to a replay reference angle of the first hologram for the first primary color,
a light source of the second primary color incident upon the assembly only at angles close to the replay reference angle of the second hologram for the second primary color, and a light source of the third primary color incident upon the assembly only at angles close to the replay reference angle of the third hologram for the third primary color.

13. An article of manufacture including a computer readable medium having instructions stored thereon that, if executed by a computing device, cause the computing device to perform operations comprising:
   recording a first hologram containing primarily content of a first primary color of an intended composite hologram;
   recording a second hologram containing primarily content of a second primary color of the intended composite hologram;
   recording a third hologram containing primarily content of a third primary color of the intended composite hologram;
   transmitting, using a first filter, at least a portion of wavelengths close to the first primary color at a broad range of angles about an intended viewing angle of the intended composite hologram;
   blocking, using the first filter, at least a portion of wavelengths close to the second primary color at a broad range of angles about an intended viewing angle of the intended composite hologram;
   blocking, using the first filter, at least a portion of wavelengths close to the third primary color at a broad range of angles about an intended viewing angle of the intended composite hologram;
   blocking, using the first filter, at least a portion of wavelengths close to the first primary color at angles close to a replay reference angle of the second hologram for the first primary color;
   blocking, using the first filter, at least a portion of wavelengths close to the first primary color at angles close to a replay reference angle of the third hologram for the first primary color;
   transmitting, using the first filter, at least a portion of wavelengths close to the second primary color at angles close to a replay reference angle of the second hologram for the second primary color;
   transmitting, using the first filter, at least a portion of wavelengths close to the third primary color at angles close to a replay reference angle of the third hologram for the third primary color;
   transmitting, using a second filter, at least a portion of wavelengths close to the first primary color at a broad range of angles about an intended viewing angle of the intended composite hologram;
   transmitting, using the second filter, at least a portion of wavelengths close to the second primary color at a broad range of angles about an intended viewing angle of the intended composite hologram;
   blocking, using the second filter, at least a portion of wavelengths close to the third primary color at a broad range of angles about an intended viewing angle of the intended composite hologram;
   transmitting, using the second filter, at least a portion of wavelengths close to the third primary color at angles close to the replay reference angle of the third hologram for the third primary color;
   blocking, using the second filter, at least a portion of wavelengths close to the second primary color at angles close to a replay reference angle of the third hologram for the second primary color;
   assembling the holograms and filters as the intended composite hologram in the order first hologram, first filter, second hologram, second filter, third hologram; and
   replaying the composite hologram using a light source of the first primary color incident upon the assembly only at angles close to a replay reference angle of the first hologram for the first primary color,
   a light source of the second primary color incident upon the assembly only at angles close to the replay reference angle of the second hologram for the second primary color, and a light source of the third primary color incident upon the assembly only at angles close to the replay reference angle of the third hologram for the third primary color.

* * * * *